United States Patent
Ryu

(10) Patent No.: US 12,375,178 B2
(45) Date of Patent: Jul. 29, 2025

(54) CONTROL DEVICE, COMPENSATION DEVICE, PROGRAM, AND CONTROL METHOD

(71) Applicants: MEIJI UNIVERSITY, Tokyo (JP); SoftBank Corp., Tokyo (JP)

(72) Inventor: Shiro Ryu, Tokyo (JP)

(73) Assignees: MEIJI UNIVERSITY, Tokyo (JP); SoftBank Corp., Tokyo (JP)

( * ) Notice: Subject to any disclaimer, the term of this patent is extended or adjusted under 35 U.S.C. 154(b) by 0 days.

(21) Appl. No.: 18/893,993

(22) Filed: Sep. 24, 2024

(65) Prior Publication Data
US 2025/0015894 A1    Jan. 9, 2025

Related U.S. Application Data

(63) Continuation of application No. PCT/JP2023/023210, filed on Jun. 22, 2023.

(51) Int. Cl.
*H04B 10/2569* (2013.01)
*H04B 10/079* (2013.01)
*H04B 10/2507* (2013.01)

(52) U.S. Cl.
CPC ... *H04B 10/2569* (2013.01); *H04B 10/07951* (2013.01); *H04B 10/2572* (2013.01)

(58) Field of Classification Search
CPC .......... H04B 10/2569; H04B 10/07951; H04B 10/2572
USPC .......................................................... 398/20
See application file for complete search history.

(56) References Cited

U.S. PATENT DOCUMENTS

| | | |
|---|---|---|
| 4,442,350 A | 4/1984 | Rashleigh |
| 5,058,986 A | 10/1991 | Nayar |
| 5,363,103 A | 11/1994 | Inkol |
| 5,576,883 A | 11/1996 | Morkel |

(Continued)

FOREIGN PATENT DOCUMENTS

| | | |
|---|---|---|
| JP | H07281215 A | 10/1995 |
| JP | H0918409 A | 1/1997 |

(Continued)

OTHER PUBLICATIONS

M. Nakazawa et al., Editor, High spectral density optical communication technologies, Springer-Verlag, 2010. Preface and pp. 32-43.

(Continued)

*Primary Examiner* — Amritbir K Sandhu

(57) ABSTRACT

A control device which controls an operation of a compensation device which compensates for birefringence and/or polarization mode dispersion, which is received by signal light having propagated through an optical transmission line, by digital signal processing using a finite impulse response filter includes: a detection signal reception unit which receives a detection signal which is a signal indicating a detection result of a detection device which optically detects polarization fluctuation in the optical transmission line; and a setting unit which decides a setting regarding an update frequency or an update interval of the number of taps of the finite impulse response filter or an update frequency or an update interval of a tap coefficient of the finite impulse response filter, based on the detection result of the detection device.

20 Claims, 40 Drawing Sheets

(56) References Cited

U.S. PATENT DOCUMENTS

| | | | |
|---|---|---|---|
| 5,661,433 | A | 8/1997 | LaRosa |
| 5,905,767 | A | 5/1999 | Fujimura |
| 6,111,910 | A | 8/2000 | Cui |
| 6,249,518 | B1 | 6/2001 | Cui |
| 6,590,520 | B1 | 7/2003 | Steele |
| 9,755,864 | B1* | 9/2017 | Ali Shah .......... H04L 25/03885 |
| 2006/0163457 | A1 | 7/2006 | Katsifolis |
| 2006/0285117 | A1 | 12/2006 | Shen |
| 2007/0149148 | A1 | 6/2007 | Yoshikawa |
| 2008/0025733 | A1 | 1/2008 | Nazarathy |
| 2008/0031633 | A1 | 2/2008 | Hoshida |
| 2008/0085115 | A1 | 4/2008 | Turukhin |
| 2009/0129787 | A1 | 5/2009 | Li |
| 2009/0129788 | A1 | 5/2009 | Seimetz |
| 2009/0214201 | A1 | 8/2009 | Oda |
| 2010/0021179 | A1 | 1/2010 | Kikuchi |
| 2010/0045999 | A1 | 2/2010 | Tanimoto |
| 2010/0159861 | A1 | 6/2010 | Becker |
| 2011/0235485 | A1 | 9/2011 | Mikami |
| 2012/0106984 | A1 | 5/2012 | Jones |
| 2013/0121691 | A1 | 5/2013 | Oda |
| 2013/0221211 | A1 | 8/2013 | Witzens |
| 2013/0229662 | A1 | 9/2013 | Ogawa |
| 2015/0116153 | A1 | 4/2015 | Chen |
| 2016/0020853 | A1 | 1/2016 | Akiyama |
| 2016/0241341 | A1* | 8/2016 | Endo ................. H04B 10/6162 |
| 2017/0019203 | A1 | 1/2017 | Asm |
| 2017/0041067 | A1 | 2/2017 | Goto |
| 2017/0180057 | A1 | 6/2017 | Hirai |
| 2018/0183542 | A1 | 6/2018 | Yoshida |
| 2018/0351650 | A1 | 12/2018 | Togo |
| 2019/0137355 | A1 | 5/2019 | Nakatani |
| 2020/0052793 | A1* | 2/2020 | Hamaoka .......... H04B 10/6165 |
| 2020/0106521 | A1* | 4/2020 | Ye ..................... H04B 10/0775 |
| 2021/0218476 | A1 | 7/2021 | Masuda |
| 2021/0231467 | A1 | 7/2021 | Awwad |
| 2022/0131620 | A1 | 4/2022 | Matsuda |
| 2022/0221583 | A1 | 7/2022 | Rolland |
| 2022/0303021 | A1* | 9/2022 | Nomura .............. H04B 10/614 |
| 2023/0119766 | A1 | 4/2023 | Sato |
| 2024/0121007 | A1* | 4/2024 | Sato ................... H04B 10/6161 |
| 2024/0214067 | A1* | 6/2024 | Ryu .................... H04B 10/077 |

FOREIGN PATENT DOCUMENTS

| | | | | |
|---|---|---|---|---|
| JP | 2006352892 | A | 12/2006 | |
| JP | 2008527549 | A | 7/2008 | |
| JP | 2009198364 | A | 9/2009 | |
| JP | 2010032257 | A | 2/2010 | |
| JP | 2012105039 | A | 5/2012 | |
| JP | 2014068072 | A | 4/2014 | |
| JP | 2017028359 | A | 2/2017 | |
| JP | 2018174413 | A | * 11/2018 | |
| JP | 2018207181 | | 12/2018 | |
| JP | 2019020276 | A | 2/2019 | |
| JP | 2020170902 | A | * 10/2020 | ......... H04B 10/0799 |
| JP | 2021002743 | A | * 1/2021 | ......... H04B 10/2507 |
| JP | 2023521427 | A | 5/2023 | |
| KR | 20110081417 | A | 7/2011 | |
| WO | 2013136716 | A1 | 9/2013 | |
| WO | WO-2018079598 | A1 | * 5/2018 | ......... H04B 10/2507 |
| WO | 2020054393 | A1 | 3/2020 | |
| WO | 2021038677 | A1 | 3/2021 | |
| WO | 2021205786 | A1 | 10/2021 | |
| WO | WO-2023120676 | A1 | * 6/2023 | ............ H04B 10/07 |

OTHER PUBLICATIONS

International Search Report and (ISA/237) Written Opinion of the International Search Authority for International Patent Application No. PCT/JP2021/048423, mailed by the Japan Patent Office on Mar. 22, 2022.

International Search Report and (ISA/237) Written Opinion of the International Search Authority for International Patent Application No. PCT/JP2022/047485, mailed by the Japan Patent Office on Feb. 21, 2023.

V. Bobrovs, S. Spolitis, and G. Ivanovs, "Latency causes and reduction in optical metro networks," Proc. of SPIE vol. 9008, 9008-11, 2014.

International Search Report and (ISA/237) Written Opinion of the International Search Authority for International Patent Application No. PCT/JP2023/023210, mailed by the Japan Patent Office on Aug. 8, 2023.

Office Action issued for related Chinese Application 202280058568. 1, issued by The State Intellectual Property Office of People's Republic of China on Jun. 24, 2024.

International Search Report and Written Opinion (ISA/237) of the International Search Authority for International Patent Application No. PCT/JP2024/019947, mailed by the Japan Patent Office on Jul. 2, 2024.

Keiji Okamoto et al., Ultrafast sampling of complex polarization components for characterizing polarization mode dispersion, Proceedings of the IEICE general conference, Mar. 7, 2007, p. 518, IEEE.

International Search Report and Written Opinion (ISA/237) of the International Search Authority for International Patent Application No. PCT/JP2024/019955, mailed by the Japan Patent Office on Aug. 13, 2024.

Ryu, Shiro. Polarization Fluctuation Measurement with Optical Delay Interferometer. Proceedings of the 2023 Communication Society Conference of the Institute of Electronics, Information and Communication Engineers, 2. Sep. 5, 2023, p. 170. ISSN 1349-1415.

J. P. Gordon and L. F. Mollenauer, "Phase noise in photonic communications systems using linear amplifiers," Optics Letters, vol. 15, No. 23, pp. 1351-1353, 1990.

S. Ryu, "Signal linewidth broadening due to nonlinear Kerr effect in long-haul coherent systems using cascaded optical amplifiers," IEEE Journal of Lightwave Technology, vol. 10, No. 10, pp. 1450-1457, 1992.

J. Cheng et al., "Relative phase noise induced impairment in M-ary phase shift-keying coherent optical communication system using distributed fiber Raman amplifier," Optics Letters, vol. 38, No. 7, pp. 1055-1057, 2013.

S. Zhang et al., "Bit-error rate performance of coherent optical M-ary PSK/QAM using decision-aided maximum likelihood phase estimation," Optics Express, vol. 18, No. 12, pp. 12088-12103, 2010.

T. Pfau et al., "Hardware-efficient coherent digital receiver concept with feedforward carrier recovery for M-QAM constellations," IEEE Journal of Lightwave Technology, vol. 27, No. 8, pp. 989-999, 2009.

M. Nakazawa et al., Editor, High spectral density optical communication technologies, Springer-Verlag, pp. 32-35, 2010.

K. Kikuchi, "Effect of 1/f-type FM noise on semiconductor-laser linewidth residual in high-power limit," IEEE Journal of Quantum Electronics, vol. 25, No. 4, pp. 684-688, 1989.

J. Gamet and G. Pandraud, "C- and L-band planar delay interferometer for DPSK decoders," IEEE Photonics Technology Letters, vol. 17, No. 6, pp. 1217-1219, 2005.

K. Voigt et al., "Performance of 40-GB/s DPSK demodulator in SOI-technology," IEEE Photonics Technology Letters, vol. 20, No. 8, pp. 614-616, 2008.

T. Kominato at al., "Ring resonators composed of GeO2-doped silica waveguides," IEEE Journal of Lightwave Technology, vol. 10, No. 12, pp. 1781-1788, 1992.

S. Suzuki et al., "Integrated-optic double-ring resonators with a wide free spectral range of 100 Ghz," IEEE Journal of Lightwave Technology, vol. 13, No. 8, pp. 1766-1771, 1995.

W. Bogaerts et al., "Silicon microring resonators," Laser and Photonics Reviews, vol. 6, No. 1, pp. 47-73, 2012.

P.M. Krummrich, E.-D. Schmidt, W. Weiershausen, and A. Mattheus, "Field trial results on statistics of fast polarization changes in long haul WDM transmission systems," OFC2005, paper OThT6, Mar. 2005.

(56) References Cited

OTHER PUBLICATIONS

M. Boroditsky, M. Brodsky, N.J. Frigo, P. Magill, and H. Rosenfeldt, "Polarization dynamics in installed fiberoptic systems," 2005 IEEE Leos Annual Meeting, paper TuCC1, Oct. 2005.
R. Ulrich and A. Simon, "Polarization optics of twisted single-mode fibers," Applied Optics, vol. 18, No. 13, pp. 2241-2251, Jul. 1979.
K. Kikuchi, "Digital coherent optical communication systems: fundamentals and future prospects," IEICE Electronics Express, vol. 8, No. 20, 1642-1662, 2011.
C. Fougstedt, P. Johannisson, L. Svensson, and P. Larsson-Edefors, "Dynamic equalizer power dissipation optimization," OFC2016, paper W4A.2, 2016.
D. Cardenas, D. Lavery, P. Watts and S. J. Savory, "Reducing the power consumption of the CMA equalizer update for a digital coherent receiver," OFC2014, paper Th4D.5, 2014.
P.M. Krummrich and K. Kotten, "Extremely fast (microsecond timescale) polarization changes in high speed long haul WDM transmission systems, "OFC2004, paper FI3, 2004.
M. Freiberger, D. Templeton, and E. Mercado, "Low latency optical services," OFC/NFOEC 2012, paper NTu2E.1, 2012.
Office Action issued for related U.S. Appl. No. 18/589,426, issued by the US Patent and Trademark Office on Nov. 1, 2024.

\* cited by examiner

| No. | TIME | OUTPUT VALUE OF OPTICAL RECEIVER | VARIATION FREQUENCY | MOVEMENT ANGLE | MOVEMENT ANGULAR VELOCITY | SUCCESS OR FAILURE OF EACH CONDITION ||||| POLARIZATION FLUCTUATION |
| --- | --- | --- | --- | --- | --- | --- | --- | --- | --- | --- | --- |
| | | | | | | CON-DITION 1 | CON-DITION 2 | CON-DITION 3 | CON-DITION 4 | CON-DITION 5 | |
| ... | ... | ... | ... | ... | ... | ... | ... | ... | ... | ... | ... |
| k | : | *** | * | * | *** | SATISFIED | NOT SATISFIED | SATISFIED | SATISFIED | SATISFIED | DETECTION |
| ... | ... | ... | ... | ... | ... | ... | ... | ... | ... | ... | ... |

FIG.21

CONTROL DEVICE, COMPENSATION DEVICE, PROGRAM, AND CONTROL METHOD

The contents of the following patent application(s) are incorporated herein by reference: NO. PCT/JP2023/023210 filed in WO on Jun. 22, 2023.

BACKGROUND

1. Technical Field

The present invention relates to a control device, a compensation device, a program, and a control method.

2. Related Art

Non-Patent Documents 1 to 5 disclose that optical transmission characteristics deteriorate due to generation of phase noise in signal light via, for example, the Kerr effect. Non-Patent Document 6 discloses that optical phase noise from which a 1/f noise component disclosed in Non-Patent Document 7 is removed is derived by subtracting a moving average value of an optical phase from a measured phase of a reception signal. Non-Patent Documents 8 and 9 disclose that a DPSK signal is demodulated by using a delay interferometer. Non-Patent Documents 10 to 12 disclose that input/output characteristics of an optical ring resonator are steeper than input/output characteristics of an optical delay interferometer.

Non-Patent Documents 13 and 14 disclose that high-speed polarization fluctuation of about 10 kHz or more can occur in a coherent optical communication system. Non-Patent Document 15 discloses that there is a proportional relationship between the value of an applied voltage of a fiber stretcher and the values of a lateral pressure and birefringence generated.

Non-Patent Documents 16 to 18 disclose a coherent optical communication system using an FIR filter. Non-Patent Document 19 discloses that the speed of the maximum polarization fluctuation occurring in an actual optical fiber transmission line is about 45,000 rotations/s as the movement angle of a trajectory on the Poincare sphere. Non-Patent Documents 20 and 21 disclose that a delay time of a transponder that performs optical reception, identification and reproduction, and optical transmission is 4 to 30 ns in an intensity modulation-direct detection method.

PRIOR ART DOCUMENT

Non-Patent Documents

Non-Patent Document 1: J. P. Gordon and L. F. Mullenauer, "Phase noise in photonic communications systems using linear amplifiers," Optics Letters, Vol. 15, No. 23, pp. 1351-1353, 1990.

Non-Patent Document 2: S. Ryu, "Signal linewidth broadening due to nonlinear Kerr effect in long-haul coherent systems using cascaded optical amplifiers," IEEE Journal of Lightwave Technology, Vol. 10, No. 10, pp. 1450-1457, 1992.

Non-Patent Document 3: J. Cheng et al., "Relative phase noise induced impairment in M-ary phase shift-keying coherent optical communication system using distributed fiber Raman amplifier," Optics Letters, Vol. 38, No. 7, pp. 1055-1057, 2013.

Non-Patent Document 4: S. Zhang et al., "Bit-error rate performance of coherent optical M-ary PSK/QAM using decision-aided maximum likelihood phase estimation," Optics Express, Vol. 18, No. 12, pp. 12088-12103, 2010.

Non-Patent Document 5: T. Pfau et al., "Hardware-efficient coherent digital receiver concept with feedforward carrier recovery for M-QAM constellations," IEEE Journal of Lightwave Technology, Vol. 27, No. 8, pp. 989-999, 2009.

Non-Patent Document 6: M. Nakazawa et al., Editor, High spectral density optical communication technologies, Springer-Verlag, 2010.

Non-Patent Document 7: K. Kikuchi, "Effect of 1/f-type FM noise on semiconductor-laser linewidth residual in high-power limit," IEEE Journal of Quantum Electronics, Vol. 25, No. 4, pp. 684-688, 1989.

Non-Patent Document 8: J. Gamet and G. Pandraud, "C- and L-band planar delay interferometer for DPSK decoders," IEEE Photonics Technology Letters, Vol. 17, No. 6, pp. 1217-1219, 2005.

Non-Patent Document 9: K. Voigt et al., "Performance of 40-Gb/s DPSK demodulator in SOI-technology," IEEE Photonics Technology Letters, Vol. 20, No. 8, pp. 614-616, 2008.

Non-Patent Document 10: T. Kominato at al., "Ring resonators composed of GeO2-doped silica waveguides," IEEE Journal of Lightwave Technology, Vol. 10, No. 12, pp. 1781-1788, 1992.

Non-Patent Document 11: S. Suzuki et al., "Integrated-optic double-ring resonators with a wide free spectral range of 100 GHz," IEEE Journal of Lightwave Technology, Vol. 13, No. 8, pp. 1766-1771, 1995.

Non-Patent Document 12: W. Bogaerts et al., "Silicon microring resonators," Laser and Photonics Reviews, Vol. 6, No. 1, pp. 47-73, 2012.

Non-Patent Document 13: P. M. Krummrich, E.-D. Schmidt, W. Weiershausen, and A. Mattheus, "Field trial results on statistics of fast polarization changes in long haul WDM transmission systems," OFC2005, paper OThT6, March 2005.

Non-Patent Document 14: M. Boroditsky, M. Brodsky, N. J. Frigo, P. Magill, and H. Rosenfeldt, "Polarization dynamics in installed fiberoptic systems," 2005 IEEE LEOS Annual Meeting, paper TuCC1, October 2005.

Non-Patent Document 15: R. Ulrich and A. Simon, "Polarization optics of twisted single-mode fibers," Applied Optics, Vol. 18, No. 13, pp. 2241-2251 July 1979.

Non-Patent Document 16: K. Kikuchi, "Digital coherent optical communication systems: fundamentals and future prospects," IEICE Electronics Express, Vol. 8, No. 20, 1642-1662, 2011.

Non-Patent Document 17: C. Fougstedt, P. Johannisson, L. Svensson, and P. Larsson-Edefors, "Dynamic equalizer power dissipation optimization," OFC2016, paper W4A.2, 2016.

Non-Patent Document 18: D. Cardenas, D. Lavery, P. Watts and S. J. Savory, "Reducing the power consumption of the CMA equalizer update for a digital coherent receiver," OFC2014, paper Th4D.5, 2014.

Non-Patent Document 19: P. M. Krummrich and K. Kotten, "Extremely fast (microsecond timescale) polarization changes in high speed long haul WDM transmission systems, "OFC2004, paper FI3, 2004.

Non-Patent Document 20: M. Freiberger, D. Templeton, and E. Mercado, "Low latency optical services," OFC/NFOEC 2012, paper NTu2E.1, 2012.

Non-Patent Document 21: V. Bobrovs, S. Spolitis, and G. Ivanovs, "Latency causes and reduction in optical metro networks," Proc. of SPIE Vol. 9008, 9008-11, 2014.

BRIEF DESCRIPTION OF THE DRAWINGS

FIG. 21 schematically shows an example of a data table 2100.

DESCRIPTION OF EXEMPLARY EMBODIMENTS

Figure 1:
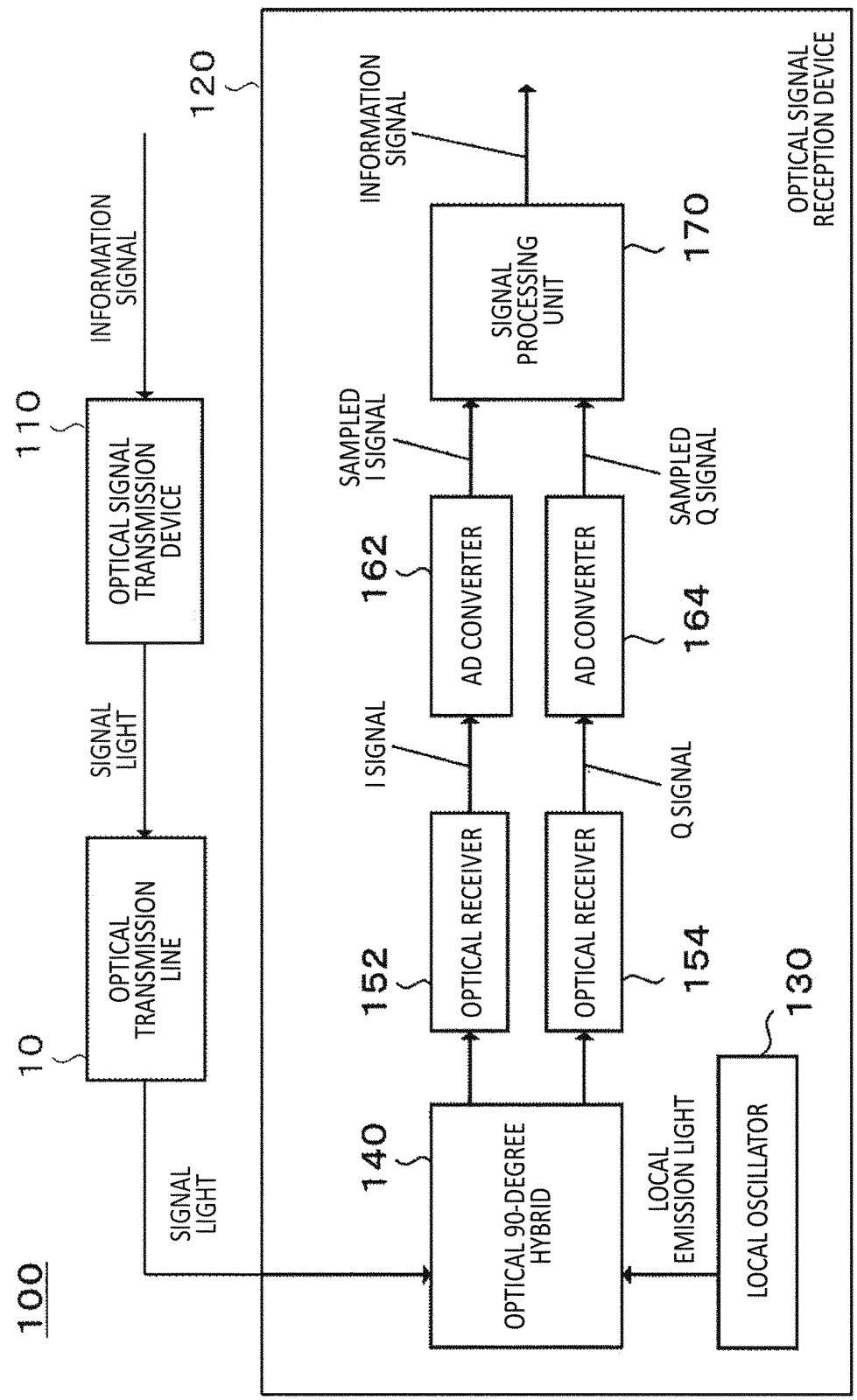
FIG. 1 schematically shows an example of a system configuration of the communication system 100.

Hereinafter, the present invention will be described through embodiments of the invention, but the following embodiments do not limit the invention according to claims. In addition, not all of the combinations of features described in the embodiments are essential to the solution of the invention. Note that in the drawings, the same or similar parts are assigned with same reference signs, and duplicated descriptions may be omitted.

In an optical transmission system, optical phase noise and phase variation such as polarization fluctuation may occur in a reception signal. Examples of the cause of the phase variation in the reception signal include a nonlinear optical effect, vibration of an optical fiber, twisting of the optical fiber, variation of stress applied to the optical fiber, laser linewidth or laser phase fluctuation, phase variation of an optical electric field caused by a lightning strike, and the like. Depending on a situation of phase variation of light, a bit error may occur in the optical transmission system. As the optical transmission system, an optical transmission system adopting a coherent optical communication system is exemplified.

According to the present embodiment, for example, an example of (i) a device or method for evaluating the presence or absence and/or degree of optical phase noise, (ii) a device or method for evaluating the presence or absence and/or degree of polarization fluctuation, and (iii) a device or method for evaluating the presence or absence and/or degree of optical phase noise and polarization fluctuation is described. According to the present embodiment, the presence or absence of at least one of the optical phase noise or the polarization fluctuation and/or the degree of at least one of the optical phase noise or the polarization fluctuation can be evaluated with relatively high accuracy. Accordingly, it is possible to improve operation efficiency, maintenance efficiency, and the like of the optical transmission system.

(I. Measurement Principle of Optical Phase Noise)

First, a measurement principle of the optical phase noise will be described. Details of a measurement device and a measurement method for optical phase noise based on the above-described measurement principle will be described later with reference to FIGS. 1 to 15.

Conventionally, the optical phase noise (may be simply referred to as phase noise) has been estimated by linearly approximating variation of an optical phase with respect to time t. For example, when the phase of signal light having propagated through an optical transmission line is measured, the measured value of the phase of the signal light in i-th (i is an integer of 1 or more and N or less) sample point among N (N is a positive integer) sample points (may be referred to as samples) is approximated by using following Expression 1.

$$\varphi(i) = \theta(i) + at + b \qquad \text{(Expression 1)}$$

Where, ϕ(i) is the measured value of the phase of the signal light at the i-th sample point, θ(i) is the phase noise at the i-th sampling point, and a and b are constants.

For example, by deciding the above-described constants a and b in advance by a least squares method, phase noise θ(i) can be estimated from the measured value of the phase of the signal light. However, in practice, a variation of a low-frequency component (may be referred to as a 1/f noise component) exists in the frequency variation of laser, and thus the value of the phase noise θ(i) cannot be accurately estimated by using above-described approximate Expression 1.

As described in Non-Patent Document 6, the optical phase noise from which the 1/f noise component is removed can be derived by subtracting the moving average value of the optical phase from the measured phase of the reception signal. Specifically, the phase noise θ(i) is derived by using following Expression 2. Note that, in Expression 2, m and l indicate integers. The value of l is appropriately set.

$$\theta(i) = \varphi(i) - \frac{1}{2l+1} \sum_{m=-l}^{l} \varphi(i+m) \qquad \text{(Expression 2)}$$

However, the phase noise is known to be a Wiener process, and the phase noise follows a Gaussian distribution with a variance that diverges in proportion to time t. Therefore, according to the method described in Non-Patent Document 6, for example, there are problems that the variance becomes negative when the time t is short, and an approximate curve cannot be accurately decided due to the influence of a measurement error.

According to the example of the present embodiment, the influence of a nonlinear phase noise on the transmission of the optical signal can be more accurately evaluated by evaluating the statistical distribution of the differential phase. Examples of the nonlinear phase noise include (i) a self-phase modulation phenomenon, (ii) a cross-phase modulation phenomenon, (iii) a phenomenon in which the intensity noise of pump light generates phase noise in signal light via the Kerr effect in a fiber Raman amplifier, and the like.

The differential phase means a phase difference before and after a sample point (may be referred to as a sample(s)). A differential phase @diff (i) at the i-th sample point is expressed by following Expression 3.

$$\phi_{diff}(i) = \varphi(i+1) - \varphi(i) \qquad \text{(Expression 3)}$$

Where, ϕ(i+1) is the measured value of the phase of the signal light at the (i+1)-th sample point, (i) is the measured value of the phase of the signal light at the i-th sample point, and i is an integer of 1 or more and (N−1) or less.

For example, the variance or standard deviation of the phase noise in one symbol time is derived by setting a sampling frequency to the same value as a symbol rate and measuring the differential phase at the same time interval as a symbol time. Note that the setting of the sampling frequency is not limited to the above-described embodiment. For example, the sampling frequency is set to be equal to or higher than the symbol rate. In this case, the differential phase is calculated by using a sample corresponding to an appropriate time interval, so that the differential phase can be measured at the same time interval as the symbol time. The time interval between temporally adjacent samples (for example, a time interval between the (i+1)-th sample and the i-th sample) may be referred to as a sample time interval Δt.

For example, in coherent heterodyne detection, phase noise θ(t) is expressed as θ(t)=ϕ$_S$ (t)−ϕ$_L$ (t) by using a phase ϕ$_S$(t) of signal light and a phase ϕ$_L$ (t) of local oscillator light (may be referred to as local emission light). Since the phase noise generating in the optical transmission line is included in ϕ$_S$ (t), the above-described expression indicates that θ(t) also includes the phase noise generating in the optical transmission line.

When modulation for communication is not applied to the optical signal, the phase component at the i-th sample point is derived by following Expression 4.

$$\varphi(i) = \tan^{-1}\{i_Q(i)/i_I(i)\} \qquad \text{(Expression 4)}$$

Where, ϕ(i) is the phase component at the i-th sample point, $i_I$ (i) is the output current of the light receiving element to which the I signal component at the i-th sample point is input, and $i_Q$ (i) is the output current of the light receiving element to which the Q signal component at the i-th sample point is input.

On the other hand, when the modulation for communication is applied to the optical signal, the phase component at the i-th sample point is calculated by eliminating the modulation component. For example, in the case of M-phase phase modulation, the modulation component can be eliminated by calculating the M-th power of the reception signal. M is a positive integer.

For example, in the case of an optical signal subjected to QPSK modulation, a reception signal $I_{QPSK}$(t) expressed as a complex number is expressed by following Expression 5.

$$I_{QPSK}(t) = i_{I,QPSK}(t) + ji_{Q,QPSK}(t) \qquad \text{(Expression 5)}$$

In the above-described expression, $i_{I,QPSK}$ (t) indicates an output current corresponding to an I signal component obtained by coherent heterodyne detection of an optical signal subjected to the QPSK modulation. $i_{Q,QPSK}$(t) indicates an output current corresponding to a Q signal component obtained by coherent heterodyne detection of an optical signal subjected to the QPSK modulation.

Here, since the QPSK modulation is a four-phase phase modulation method, when the reception signal $I_{QPSK}$ (t) is raised to the fourth power, following Expression 6 is established between the phasor angle of the fourth power of the reception signal $I_{QPSK}$ (t) and the phase noise θ(t).

$$\arg\{I_{QPSK}(t)\}^4 = 4(2\pi f_c t + \theta(t)) \qquad \text{(Expression 6)}$$

In the above-described expression, $f_c$ indicates a difference ($f_S$-$f_L$) between a frequency $f_S$ of the signal light and a frequency $f_L$ of the local emission light, and is called a beat frequency.

Following Expression 7 is derived by dividing both sides of Expression 6 by 4 (corresponding to M described above). Accordingly, the phase noise θ(t) from which the modulation component is removed is derived.

$$\arg\{I_{QPSK}(t)\}^4/4 = 2\pi f_c t + \theta(t) \quad \text{(Expression 7)}$$

When Expressions 1 and 7 are considered, a relationship among a differential phase $\phi_{diff}$(i) at the i-th sample point, a phase noise θ(i+1) at the (i+1)-th sample point, a phase noise θ(i) at the i-th sample point, and a sample time interval Δt is expressed by following Expression 8.

$$\phi_{diff}(i) = \varphi(i+1) - \varphi(i) = \theta(i+1) - \theta(i) + 2\pi f_c \Delta t \quad \text{(Expression 8)}$$

As described above, since the phase noise θ(i) follows the Gaussian distribution, the differential phase $\phi_{diff}$(i) which is the difference thereof also follows the Gaussian distribution. In addition, the average value of θ(i) is 0. Therefore, the average value of the differential phases $\phi_{diff}$(i) is 2πfcΔt, and when the standard deviation of the phase noise θ(i) of the signal light is $\sigma_{sig}$, the variance $\sigma_M^2$ of the differential phases $\phi_{diff}$(i) is $2 \times \sigma_{sig}^2$.

Therefore, when the standard deviation om of the measurement result of the differential phase $\phi_{diff}$ (i) is derived, the standard deviation $\sigma_{sig}$ of the phase noise of the signal light having propagated through the optical transmission line is derived by following Expression 9.

$$\sigma_{sig} = \sigma_M / \sqrt{2} \quad \text{(Expression 9)}$$

Accordingly, according to the present embodiment, it can be seen that the phase noise of the signal light can be derived more accurately. For example, according to the present embodiment, the possibility that the influence of an uncertain element caused by the length of the moving average time is mixed in the measured value as in the method of subtracting the moving average value of the optical phase from the measured phase of the reception signal is significantly reduced.

Further, when the transmission influence is considered, it is desirable to consider the influence of the spectral linewidth of the local emission light. In this case, a relationship among a standard deviation $\sigma_{RX}$ of the phase noise of an optical signal (may be referred to as a reception signal) received by the optical reception device, a standard deviation $\sigma_{LO}$ of the phase noise due to the spectral linewidth of the local emission light, and a standard deviation $\sigma_{sig}$ of the phase noise of the signal light is expressed by following Expression 10.

$$\sigma_{RX}^2 = \sigma_{sig}^2 + \sigma_{LO}^2 \quad \text{(Expression 10)}$$

As described above, the standard deviation $\sigma_{sig}$ of the phase noise of the signal light is derived by using the standard deviation om of the measurement result of the differential phase $\phi_{diff}$ (i) of the signal light. In a procedure similar to that of the standard deviation $\sigma_{sig}$ of the phase noise of the signal light, the standard deviation $\sigma_{LO}$ of the phase noise due to the spectral linewidth of the local emission light is derived by following Expression 11 using the standard deviation $\sigma_{ML}$ of the measurement result of the differential phase of the local emission light.

$$\sigma_{LO} = \sigma_{ML} / \sqrt{2} \quad \text{(Expression 11)}$$

Accordingly, the standard deviation $\sigma_{RX}$ of the phase noise of the reception signal is derived by using Expressions 9 to 11. The standard deviation $\sigma_{RX}$ of the phase noise of the reception signal is used for applications such as evaluation and monitoring of the transmission influence.

(Measurement Method of Differential Phase)

In an embodiment, the differential phase $\phi_{diff}$(i) at each of N sample points is derived by signal processing of digital data obtained by converting the light to be measured (may be referred to as target light) into an electric signal and then sampling and quantizing the electric signal. For example, the time-series data of the phase of the target light is generated at the same or substantially the same time interval as the symbol time. The differential phase $\phi_{diff}$ (i) is derived by calculating a difference between two pieces of data temporally adjacent in the time-series data.

In another embodiment, first, the target light is branched into first light and second light. Next, a delay time difference τ between the first light and the second light is adjusted. Specifically, the delay time difference τ is adjusted to satisfy 2πfτ=2nπ+π/2. Here, f is the frequency of the target light, and n is a positive integer. Next, the first light and the second light in which the delay time difference τ is adjusted undergo multiplex interference. Thereafter, the multiplexed light is photoelectrically converted, sampled, and quantized to derive the differential phase $\phi_{diff}$ (i).

As described above, the differential phase is derived by a relatively simple procedure. In addition, the variance or standard deviation of the differential phase is also derived by relatively simple arithmetic processing. Therefore, according to the present embodiment, the load on the computer can be reduced.

(Evaluation Example of Phase Noise of Signal Light)

When the phase noise of signal light to be used for actual communication is evaluated, the optical signal has a spectral component due to modulation. Therefore, the modulation component may be mixed in the measurement result to affect the measurement of the optical phase noise.

In this regard, in an embodiment, a communication system 100 evaluates the phase noise by using an optical signal reception device 120, for example, in a commissioning test after the communication system 100 is constructed. In another embodiment, the communication system 100 provides a dedicated wavelength for measuring the phase noise during the operation period of the communication system 100, and constantly measures the phase noise of the light of the wavelength. For example, in an embodiment in which a differential phase is derived by signal processing of digital data, the phase noise is evaluated by measuring differential phases of an I component and a Q component of light of the above-described wavelength.

(II. Detection Principle of Phase Variation Caused by Polarization Fluctuation)

Next, a detection principle of the phase variation caused by the polarization fluctuation will be described. Details of a detection device and a detection method, based on the above-described detection principle, of the polarization fluctuation will be described later with reference to FIGS. 16 to 34.

The present inventors have found that the above-described differential phase (in particular, a differential phase measured by using an optical delay interferometer) can include the phase variation caused by the polarization fluctuation in addition to the optical phase noise. For example, in the coherent optical communication system described above, the amount of information to be transmitted can be increased by placing independent data signals in two orthogonal polarization modes of HE11x and HE11y, respectively. In the above-described communication system, coupling occurs in both modes in the transmission process of the optical fiber, and thus high-speed digital signal processing for separating the reception signal into the original orthogonal polarization modes is performed on a receiver side.

Conventionally, it has been considered that the polarization fluctuation is sufficiently slow compared with the speed of signal processing on the above-described receiver side. However, recent research shows that high-speed polarization fluctuation of about 10 kHz or more can occur. Similarly to the optical phase noise described above, such high-speed polarization fluctuation is accompanied by the phase variation of light. Therefore, a bit error may occur in the optical transmission system depending on the situation of the polarization fluctuation.

As a situation in which relatively high-speed polarization fluctuation occurs in the optical transmission system, (i) a case where the birefringence of the optical fiber varies due to, for example, application of a varying lateral stress to the optical fiber, (ii) a case where a polarization plane rotates at a high speed due to, for example, rapid twisting of the optical fiber, and the like are assumed. Therefore, in many cases, the phase variation based on the polarization fluctuation occurs suddenly.

In the measurement principle of the optical phase noise described above, statistical processing is performed in the process of deriving the phase noise of the signal light. Therefore, the sudden phase variation is hardly reflected in the measurement result of the phase noise of the signal light. In this regard, it is possible to more accurately evaluate the state of the optical transmission system and/or the optical signal by not only grasping the statistic such as the standard deviation but also detecting the phase variation caused by the sudden polarization fluctuation based on the measurement result in real time.

Assuming that $E_x(t)$ and $E_y(t)$ are orthogonal polarization modes of signal light propagating in a z direction, and that $k_x$ and $k_y$ are unit vectors in an x direction and a y direction, respectively, an electric field (may be referred to as a reception optical electric field) E(t) of light having propagating through an optical transmission line to be received is expressed by following Expression B-1.

$$E(t) = (E_x(t)\cos\{2\pi ft + \phi_n(t)\}k_x + E_y(t)\cos\{2\pi ft + \phi_n(t) + \delta(t)\}k_y) \quad \text{(Expression B-1)}$$

In Expression B-1, δ(t) indicates a phase difference between $E_x(t)$ and $E_y(t)$. $\phi_n(t)$ indicates the optical phase noise. f indicates the frequency of the signal light. E(t), $k_x$, and $k_y$ are vectors.

When it is assumed that the optical delay interferometer has no polarization dependency, an output current i of the optical receiver connected to the optical delay interferometer is expressed by following Expression B-2.

$$i = R\{E(t) + E(t - \tau)\} \cdot \{E(t) + E(t - \tau)\} \quad \text{(Expression B-2)}$$

In Expression B-2, τ indicates a delay time difference between two paths of the optical delay interferometer. R indicates the responsivity of the optical receiver. · indicates an inner product.

Considering that the optical receiver does not respond to the frequency of light, and ignoring the DC component of Expression B-2, the reception current i output from the optical receiver is expressed by following Expression B-3.

$$i = R[E_x(t)E_x(t-\tau)\cos\{\phi_n(t) - \phi_n(t-\tau) + 2\pi f\tau\} + \\ E_y(t)E_y(t-\tau)\cos\{\phi_n(t) - \phi_n(t-\tau) + \delta(t) - \delta(t-\tau) + 2\pi f\tau\}] \quad \text{(Expression B-3)}$$

In Expression B-3, when the delay time difference τ is adjusted to satisfy $2\pi f\tau = 2n\pi + \pi/2$ (n is a positive integer), the above-described reception current i is expressed by following Expression B-4.

$$i = -R[E_x(t)E_x(t-\tau)\sin\{\phi_n(t) - \phi_n(t-\tau)\} + \\ E_y(t)E_y(t-\tau)\sin\{\phi_n(t) - \phi_n(t-\tau) + \delta(t) - \delta(t-\tau)\}] \quad \text{(Expression B-4)}$$

When semiconductor laser output light is used as the signal light, the AM noise of the signal light is sufficiently small due to the property of the semiconductor laser output light. In this case, the above-described reception current i is expressed by following Expression B-5.

$$i = -R\big[E_x^2(t)\sin\{\phi_n(t) - \phi_n(t-\tau)\} + \\ E_y^2(t)\sin\{\phi_n(t) - \phi_n(t-\tau) + \delta(t) - \delta(t-\tau)\}\big] \quad \text{(Expression B-5)}$$

Here, when τ is sufficiently short, it can be assumed that $|\phi_n(t) - \phi_n(t-\tau)| \ll 1$ and $|\delta(t) - \delta(t-\tau)| \ll 1$. For example, when τ is one symbol time, it can be assumed that $|\phi_n(t) - \phi_n(t-\tau)| \ll 1$ and $|\delta(t) - \delta(t-\tau)| \ll 1$. In this case, the above-described reception current i is approximated by following Expression B-6.

$$i \approx -R\big[\{E_x^2(t) + E_y^2(t)\}\sin\{\phi_n(t) - \phi_n(t-\tau)\} + \\ E_y^2(t)\sin\{\delta(t) - \delta(t-\tau)\}\big] \quad \text{(Expression B-6)}$$

As shown in Expression B-6, the above-described reception current i includes a term $i_{pol}$ expressed by following Expression B-7 and caused by the polarization fluctuation in addition to the term caused by the phase noise of the signal light having propagated through the optical transmission line.

$$i_{pol} = -RE_y^2(t)\sin\{\delta(t) - \delta(t-\tau)\} \quad \text{(Expression B-7)}$$

According to Expression B-7, what the variation caused by the polarization fluctuation is added in addition to the phase noise is observed as the above-described reception current i. That is, the phase variation caused by the sudden polarization fluctuation can be detected based on the measurement result of the above-described reception current i in real time. As described above, the present inventor has found that the output current i of the optical receiver connected to the optical delay interferometer adjusted such that the delay time difference $\tau$ is $2\eta f\tau=2n\pi+\pi/2$ (n is a positive integer) is observed, and when sudden polarization fluctuation occurs in the signal light, the occurrence of the polarization fluctuation can be detected.

(A. Case where $\delta(t)$ Varies Slightly)

As described above, in Expression B-6, $\tau$ is a sufficiently short time, and the absolute value of the difference between $\delta(t)$ and $\delta(t-\tau)$ is sufficiently smaller than 1. At this time, the term $i_{pol}$ caused by the polarization fluctuation is approximated by following Expression B-8.

$$i_{pol} = -RE_y^2(t)\left\{\frac{d\delta(t)}{dt}\tau\right\} \quad \text{(Expression B-8)}$$

Here, in an actual device, when the output current i of the optical receiver connected to the optical delay interferometer is measured, the above-described output current i is amplified by, for example, an amplifier following the optical receiver. At this time, $i_{pol}$ expressed by Expression B-8 is integrated with respect to time t by the low-pass filter characteristics of the amplifier. When ideal integration is performed, the output current $i_{pol\_LPF}$ of the amplifier is expressed by following Expression B-9. The amplifier may be an example of an integration circuit.

$$i_{pol\_LPF} = -RE_y^2(t)\delta(t) \quad \text{(Expression B-9)}$$

Expression B-9 is established in a range where the above-described low-pass filter operates as the integration circuit. That is, Expression B-9 is established with respect to frequencies equal to or higher than the cutoff frequency of the low-pass filter. In this case, when the contribution of R is normalized in Expression B-9 by using a power ratio $\alpha$ ($0\le\alpha\le1$) of the orthogonal polarization signal defined by following Expressions B-10 and B-11, the normalized output current $i_{pol\_LPF\_norm}$ of the amplifier is expressed by following Expression B-12. Accordingly, $\delta(t)$ can be directly measured by using the optical delay interferometer.

$$Ex^2(t) = \alpha E^2 \quad \text{(Expression B-10)}$$

$$Ey^2(t) = (1-\alpha)E^2 \quad \text{(Expression B-11)}$$

$$i_{pol\_LPF\_norm} = -E_y^2(t)\delta(t) = -(1-\alpha)E^2\delta(t) \quad \text{(Expression B-12)}$$

Since the term caused by phase noise in Expression B-6 is a stochastic process, the term caused by the phase noise is not continuous in phase. Therefore, the integration effect in the amplifier does not act on the term caused by the phase noise. As a result, the term caused by the phase noise in Expression B-6 is output from the amplifier as it is in Expression B-6.

As shown in Expression B-6, the above-described reception current i is measured in a state where the term (may be referred to as a phase noise component) caused by the phase noise and the term (may be referred to as a polarization fluctuation component) caused by the polarization fluctuation are mixed, and thus the measurement of the phase noise component is preferably performed in a period in which the polarization fluctuation component is small. In this regard, for example, when the occurrence of the polarization fluctuation is detected, the measurement and/or analysis of the phase noise can be effectively performed by outputting an alarm, adding a flag indicating that the polarization fluctuation is detected to the measurement data of the reception current i, or recording the time when the polarization fluctuation is detected.

(B. Case where $\delta(t)$ Varies Greatly)

In this case, the condition that the absolute value of the difference between $\delta(t)$ and $\delta(t-\tau)$ is sufficiently smaller than 1 is not necessarily established. Therefore, Expression B-12 described above is not necessarily established. However, even in such a case, Expression B-7 is established. Therefore, when the output current i of the optical receiver connected to the optical delay interferometer is amplified, for example, by the amplifier following the optical receiver, $\delta(t)$ is integrated while being restricted by a sine function.

Here, since $\delta(t)$ varies between $-\pi/2\le\delta(t)\le\pi/2$, the value of $\sin\{\delta(t)-\delta(t-\tau)\}$ in the measurement result (which is a value of $i_{pol}$ expressed by Expression B-7) by the optical delay interferometer varies between $-1\le\sin\{\delta(t)-\delta(t-\tau)\}\le1$ at the maximum with respect to the variation of $\delta(t)$. In addition, a spectral component when the measurement result of $i_{pol}$ expressed by Expression B-7 is Fourier-transformed is an amplitude value of the variation.

(Trajectory on Poincare Sphere)

It is known that a point P ($S_1$, $S_2$, $S_3$) on a Poincare sphere expressed by using the Stokes parameters $S_0$, $S_1$, $S_2$, and $S_3$ indicates a polarization state of light. A relationship among $E_x(t)$ and $E_y(t)$, $\delta(t)$, and the Stokes parameters $S_0$, $S_1$, $S_2$, and $S_3$ is expressed by following Expressions B-13, B-14, B-15, and B-16.

$$S_0 = E_x^2(t) + E_y^2(t) = E^2 \quad \text{(Expression B-13)}$$

$$S_1 = E_x^2(t) - E_y^2(t) = S_0 \cos 2\chi \cos 2\psi \quad \text{(Expression B-14)}$$

$$S_2 = 2E_x(t)E_y(t)\cos\delta(t) = S_0 \cos 2\chi \sin 2\psi \quad \text{(Expression B-15)}$$

$$S_3 = 2E_x(t)E_y(t)\sin\delta(t) = S_0 \sin 2\chi \quad \text{(Expression B-16)}$$

In Expressions B-13, B-14, B-15, and B-16, x indicates ellipticity. $\psi$ indicates the azimuth of elliptical polarization. Expressions B-13, B-14, B-15, and B-16 express a relationship between Cartesian coordinates ($S_1$, $S_2$, $S_3$) and polar coordinates ($S_0$, $2\chi$, $2\psi$).

A sphere with a radius $S_0$ in the Cartesian coordinates ($S_1$, $S_2$, $S_3$) is referred to as a Poincare sphere, the longitude of the Poincare sphere indicates twice an azimuth $\psi$, and the latitude of the Poincare sphere indicates twice the ellipticity χ. For example, an angle of UOQ formed by an origin O (0, 0, 0) of the Cartesian coordinates, a point U (S$_1$, S$_2$, 0) on the Poincare sphere, and a point Q (S$_1$, 0, 0) on the Poincare sphere is 2ψ. Similarly, an angle of POQ formed by the origin O (0, 0, 0) of the Cartesian coordinates, the point U (S$_1$, S$_2$, 0) on the Poincare sphere, and a point P (S$_1$, S$_2$, S$_3$) on the Poincare sphere is 2χ.

Here, as shown in Expressions B-15 and B-16, the point P (S$_1$, S$_2$, S$_3$) on the Poincare sphere moves with the variation of δ(t) on a circumference R centered on the point Q (S$_1$, 0, 0). In this regard, a case is considered in which the point P on the Poincare sphere slightly has moved with the variation of δ(t) to a point P' on the circumference R. Assuming that dθ is an angle of POP' formed by the point P, the origin O, and the point P', and dδ is a minute shift of δ(t), a relationship between dθ and dδ is expressed by following Expression B-17. Note that do indicates an angle of PQP' formed by the point P, the point Q, and the point P'.

$$d\theta = \frac{2|E_x(t)E_y(t)|}{E} d\delta \qquad \text{(Expression B-17)}$$

As described above, the phase variation amount approximated by Expression B-8 is observed by measuring the output current i of the optical receiver connected to the optical delay interferometer. Assuming that dθ$_{DL}$ is a result of converting the above-described phase variation amount into dθ described above, dθ$_{DL}$ is expressed by following Expression B-18 using the power ratio α described above.

$$d\theta_{DL} = \frac{E_y^2(t)}{E} d\delta = (1-\alpha) E d\delta \qquad \text{(Expression B-18)}$$

Therefore, according to the method using the optical delay interferometer, the phase variation amount on the Poincare sphere to be measured is c (t) times the movement angle on the Poincare sphere. c (t) is expressed by following B-19.

$$c(t) = \frac{E_y^2(t)}{2|E_x(t)E_y(t)|} = \frac{|E_y(t)|}{2|E_x(t)|} \qquad \text{(Expression B-19)}$$

A relationship between c (t) and α described above is expressed by following Expression B-20. In this case, a may be more than 0 and less than 1. Note that, when α is 0 or 1, an electric field is concentrated on HE11x or HE11y, and the polarization becomes completely linear. Therefore, when α is 0 or 1, it is not necessary to consider the concept of polarization fluctuation.

$$c(t) = \frac{|E_y(t)|}{2|E_x(t)|} = \frac{1}{2}\sqrt{\frac{1-\alpha}{\alpha}} \qquad \text{(Expression B-20)}$$

As described above, according to the present principle, the phase variation amplitude width measured by the optical delay interferometer indicates an approximate value of a movement angle (that is, a phase change amount) of the trajectory on the Poincare sphere. The above-described phase variation amplitude width is obtained as the amplitude value of a frequency component which gives a peak in the Fourier transform result of the optical receiver output current.

(Outline of Communication System 100)

FIG. 1 schematically shows an example of a system configuration of the communication system 100. In the present embodiment, the details of the communication system 100 will be described by taking, as an example, a case where information signals are transmitted by the signal light output from the optical signal transmission device 110 propagating through the optical transmission line 10 to reach the optical signal reception device 120.

In the present embodiment, the optical transmission line 10 transmits light. As the optical transmission line 10, an optical fiber is exemplified.

In the present embodiment, the communication system 100 includes an optical signal transmission device 110 and an optical signal reception device 120. In the present embodiment, the optical signal reception device 120 includes a local oscillator 130, an optical 90-degree hybrid 140, an optical receiver 152, an optical receiver 154, an AD converter 162, an AD converter 164, and a signal processing unit 170.

In the present embodiment, the optical signal transmission device 110 generates an optical signal. The optical signal transmission device 110 generates a polarization-multiplexed optical signal, for example, by using an information signal to be transmitted and modulating an optical carrier wave. The optical signal may be a signal on which a symbol time series is superimposed. The optical signal transmission device 110 outputs light (may be referred to as signal light) constituting an optical signal. The signal light is transmitted to the optical signal reception device 120 via the optical transmission line 10.

In the present embodiment, the optical signal reception device 120 receives the signal light having propagated through the optical transmission line 10. The optical signal reception device 120 demodulates the received optical signal and generates an information signal.

While the signal light propagates through the optical transmission line 10, the signal light is subjected to various linear effects and nonlinear effects. When the signal light is subjected to the nonlinear effects, the phase of the signal light is affected. Therefore, the signal light having propagated through the optical transmission line 10 includes a phase noise component. In the present embodiment, the optical signal reception device 120 derives an index for evaluating the phase noise of the signal light. Accordingly, the optical signal reception device 120 can evaluate the phase noise of the signal light having propagated through the optical transmission line 10. The above-described index may be an index indicating the degree of phase noise of the signal light. As described above, according to the present embodiment, the degree of variability in the differential phase of the signal light is adopted as the above-described index. Examples of the index indicating the degree of variability include variance or standard deviation.

In the present embodiment, the local oscillator 130 outputs local oscillator light (as described above, may be referred to as local emission light). The local emission light output from the local oscillator 130 is input to the optical 90-degree hybrid 140.

In the present embodiment, the optical 90-degree hybrid 140 causes signal light having propagated through the optical transmission line 10 to interfere with the local emission light from the local oscillator 130, and outputs a plurality of optical signals in which the reception signal transmitted by the signal light is separated into a plurality of signal components. In the present embodiment, the optical 90-degree hybrid 140 mixes the signal light and the local emission light and outputs two optical signals having phases different by 90 degrees. The above-described two signals may be referred to as an I signal and a Q signal, respectively.

In the present embodiment, the optical receiver 152 converts an optical signal into an electric signal. The optical receiver 152 converts the I signal of the reception signal transmitted by the signal light into an electric signal. Accordingly, the I signal is converted from an optical signal to an electric signal. The optical receiver 152 outputs the electric signal corresponding to the I signal to the AD converter 162.

In the present embodiment, the optical receiver 154 converts an optical signal into an electric signal. The optical receiver 154 converts the Q signal of the reception signal transmitted by the signal light into an electric signal. Accordingly, the Q signal is converted from an optical signal to an electric signal. The optical receiver 154 outputs the electric signal corresponding to the Q signal to the AD converter 164.

In the present embodiment, the AD converter 162 converts the electric signal from an analog signal to a digital signal. The AD converter 162 converts the electric signal corresponding to the I signal into a digital signal. The AD converter 162 outputs, to the signal processing unit 170, a plurality of digital signals (may be referred to as a sampled I signal(s)) corresponding to a plurality of respective time points in a measurement period (may be referred to as an evaluation period) for deriving an evaluation index of phase noise. The time interval of the plurality of time points may be substantially constant.

The sampling rate of the AD converter 162 may be equal to or higher than the symbol rate of the reception signal. Accordingly, the sample time interval is set to be equal to or less than the length of the symbol time. The sampling rate of the AD converter 162 may be the same as the symbol rate of the reception signal. Accordingly, the sample time interval is set to the length of the symbol time.

In the present embodiment, the AD converter 164 converts the electric signal from an analog signal to a digital signal. The AD converter 164 converts the electric signal corresponding to the Q signal into a digital signal. The AD converter 164 outputs, to the signal processing unit 170, a plurality of digital signals (may be referred to as a sampled Q signal(s)) corresponding to a plurality of respective time points of the evaluation period. The time interval of the plurality of time points may be substantially constant.

The sampling rate of the AD converter 164 may be equal to or higher than the symbol rate of the reception signal. Accordingly, the sample time interval is set to be equal to or less than the length of the symbol time. The sampling rate of the AD converter 164 may be the same as the symbol rate of the reception signal. Accordingly, the sample time interval is set to the length of the symbol time.

In the present embodiment, the signal processing unit 170 demodulates the reception signal transmitted by the signal light to generate an information signal. In addition, in the present embodiment, the signal processing unit 170 evaluates the phase noise of the signal light having propagated through the optical transmission line 10. The signal processing unit 170 may monitor the phase noise of the signal light having propagated through the optical transmission line 10. Details of the signal processing unit 170 will be described later.

(Specific Configuration of Each Unit of Communication System 100)

Each unit of the communication system 100 may be implemented by hardware, may be implemented software, or may be implemented hardware and software. At least a part of each unit of the communication system 100 may be implemented by an analog circuit or may be implemented by a digital circuit. At least a part of each unit of the communication system 100 may be implemented by a single server or may be implemented by a plurality of servers. At least a part of each unit of the communication system 100 may be implemented on a virtual machine or a cloud system. At least a part of each unit of the communication system 100 may be implemented by a personal computer or a mobile terminal. Examples of the mobile terminal include a mobile phone, a smartphone, a PDA (registered trademark), a tablet, a notebook computer or a laptop computer, a wearable computer, and the like. Each unit of the communication system 100 may store information by using a distributed ledger technology such as a blockchain or a distributed network.

When at least a part of constituents constituting the communication system 100 is implemented by software, in an information processing apparatus having a general configuration, the constituents implemented by the software may be implemented by starting a program defining an operation regarding the constituents. The above-described information processing apparatus includes, for example: (i) a data processing apparatus including a processor such as a CPU or a GPU, a ROM, a RAM, a communication interface, or the like; (ii) an input apparatus such as a keyboard, a touch panel, a camera, a microphone, various sensors, or a GPS receiver; (iii) an output apparatus such as a display apparatus, a speaker, or an oscillator apparatus; and (iv) a storage apparatus (including an external storage apparatus) such as a memory or an HDD.

In the above-described information processing apparatus, the above-described data processing apparatus or storage apparatus may store a program. The above-described program may be stored in a non-transitory computer readable recording medium. The above-described program is executed by a processor to thereby make the above-described information processing apparatus execute actions defined by said program.

The program may be stored in a computer readable medium such as a CD-ROM, a DVD-ROM, a memory, or a hard disk, or may be stored in a storage apparatus connected to a network. The program may be installed in a computer constituting at least a part of the communication system 100 from a computer readable medium or a storage apparatus connected to a network. By executing the program, the computer may function as at least a part of each unit of the communication system 100.

A program for causing a computer to function as at least a part of each unit of the communication system 100 may include a module which defines an operation of each unit of the communication system 100. These programs or modules work on a data processing apparatus, an input apparatus, an output apparatus, a storage apparatus, or the like to cause a computer to function as each unit of the communication system 100 or cause the computer to execute an information processing method in each unit of the communication system 100.

The information processing described in the program functions as a specific means in which software relating to the program and various hardware resources of the communication system 100 cooperate with each other by the program being read into the computer. Then, the above-described specific means realizes calculation or processing of information in accordance with the use purpose of the computer in the present embodiment, thereby constructing the communication system 100 in accordance with the use purpose.

The above-described program may be a program for causing a computer to function as the optical signal reception device 120 or a part thereof. The above-described program may be a program for causing a computer to execute an information processing method in the optical signal reception device 120 or a part thereof. Examples of a part of the optical signal reception device 120 include an AD converter 162, an AD converter 164, a signal processing unit 170, and the like.

In an embodiment, the above-described information processing method may be an evaluation method of evaluating phase noise of signal light having propagated through an optical transmission line. The above-described evaluation method includes, for example, acquiring information indicating differential phases of input light at a plurality of respective time points included in the evaluation period. The above-described evaluation method includes deriving, as an index for evaluating the phase noise, a degree of variability in the differential phases at the plurality of respective time points. In the above-described evaluation method, the differential phase indicates, for example, a difference between the phases of input light at two temporally adjacent time points among the plurality of time points. In the above-described evaluation method, a time interval between the plurality of time points is, for example, substantially constant. The time interval of the plurality of time points is, for example, equal to or less than a length of a symbol time of a signal transmitted by the input light.

The communication system 100 may be an example of an optical communication system. The optical signal transmission device 110 may be an example of an optical transmitter. The optical signal reception device 120 may be an example of an evaluation device or an optical receiver. The local oscillator 130 may be an example of a local emission light source. The optical receiver 152 may be an example of a photoelectric conversion unit. The optical receiver 154 may be an example of the photoelectric conversion unit. The AD converter 162 may be an example of an analog-to-digital conversion unit. The AD converter 164 may be an example of the analog-to-digital conversion unit. The signal processing unit 170 may be an example of an evaluation device. The I signal may be an example of an optical signal of the I signal component. The sampled I signal may be an example of a first digital signal. The Q signal may be an example of an optical signal of a Q signal component. The sampled Q signal may be an example of a second digital signal. The target light may be an example of the input light. The light constituting various optical signals may be an example of the input light.

Example of Another Embodiment

In the present embodiment, for the purpose of facilitating understanding of the communication system 100, the details of the communication system 100 have been described by taking, as an example, a case where information signals are transmitted by the signal light output from the optical signal transmission device 110 propagating through the optical transmission line 10 to reach the optical signal reception device 120. However, the communication system 100 is not limited to the present embodiment. For example, various multiplexing technologies are known in the field of optical communication. In this regard, according to another embodiment, various multiplexing technologies can be applied to the above-described communication system 100.

Examples of the multiplexing technology include an optical wavelength multiplexing technology (may be referred to as a wavelength division multiplexing technology), a spatial division multiplexing technology, and the like. According to the optical wavelength multiplexing technology, a plurality of optical signals having different wavelengths can be transmitted simultaneously by using a single optical fiber. Examples of the spatial division multiplexing technology include a technology using a multi-core optical fiber in which a plurality of cores are arranged in a single clad, a technology using a multi-mode optical fiber designed to allow a plurality of modes of light to propagate therethrough, and the like.

Figure 2:
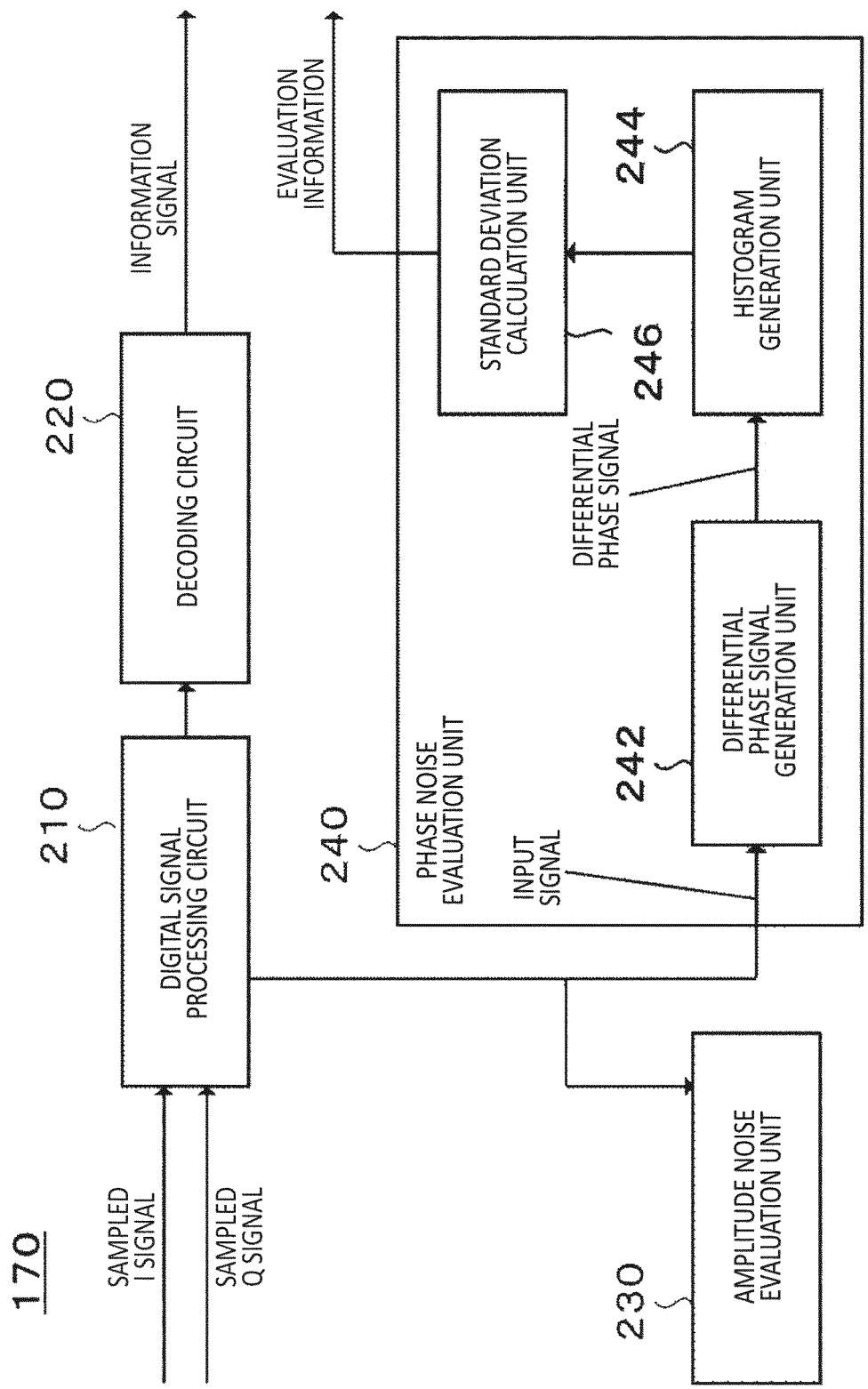
FIG. 2 schematically shows an example of an internal configuration of a signal processing unit 170.

FIG. 2 schematically shows an example of an internal configuration of the signal processing unit 170. In the present embodiment, the signal processing unit 170 includes a digital signal processing circuit 210, a decoding circuit 220, an amplitude noise evaluation unit 230, and a phase noise evaluation unit 240. In the present embodiment, the phase noise evaluation unit 240 includes a differential phase signal generation unit 242, a histogram generation unit 244, and a standard deviation calculation unit 246.

In the present embodiment, the digital signal processing circuit 210 receives the sampled I signal from the AD converter 162. The digital signal processing circuit 210 receives the sampled Q signal from the AD converter 164. The digital signal processing circuit 210 executes various kinds of digital signal processing for demodulating or compensating the reception signal by using the I signal and the Q signal. In the present embodiment, the decoding circuit 220 executes error correction processing, decoding processing, or the like. Accordingly, the information signal is extracted from the reception signal.

In the present embodiment, the amplitude noise evaluation unit 230 evaluates the amplitude noise of the signal light having propagated through the optical transmission line 10. The amplitude noise evaluation unit 230 derives various indexes for evaluating the amplitude noise of the signal light having propagated through the optical transmission line 10. Examples of the above-described index include an optical signal-to-noise ratio and the like. The optical signal-to-noise ratio is measured by using at least one of the sampled I signal and the sampled Q signal. For example, when the optical signal-to-noise ratio of the signal light is measured by using the sampled I signal, the I signal is input to the amplitude noise evaluation unit 230. Various known methods can be adopted as a measurement method of the optical signal-to-noise ratio. For example, the amplitude noise evaluation unit 230 includes an average value calculation unit, a histogram generation unit, and a standard deviation calculation unit. Accordingly, the amplitude noise of the signal light is measured.

In the present embodiment, the phase noise evaluation unit 240 evaluates the phase noise of the signal light having propagated through the optical transmission line 10. The phase noise evaluation unit 240 derives various indexes for evaluating the phase noise of the signal light having propagated through the optical transmission line 10. As described above, the degree of variability of the differential phase is exemplified as the above-described index. Examples of the index indicating the degree of variability include variance, standard deviation, and the like.

In the present embodiment, an example of the phase noise evaluation unit 240 will be described by taking, as an example, a case where the phase noise evaluation unit 240 derives the standard deviation of the differential phase in the evaluation period as the index indicating the degree of variability of the measured differential phase. However, the phase noise evaluation unit 240 is not limited to the present embodiment. It should be noted that, in another embodiment, the phase noise evaluation unit 240 may derive the variance of the differential phase in the evaluation period as the index indicating the degree of variability of the differential phase.

In the present embodiment, for example, the differential phase signal generation unit 242 acquires, from the digital signal processing circuit 210, I signal data and Q signal data (may be referred to as an input signal) at each of N (N is a positive integer) sample points in the evaluation period. The N sample points correspond to a plurality of respective time points included in the evaluation period.

The differential phase signal generation unit 242 decides the phase of the signal light measured at each of the N sample points based on the I signal data and the Q signal data at each of the N sample points. The phase of the signal light at the i-th (i is an integer of 1 or more and (N−1) or less) sample point is decided, for example, according to Expression 4 described above.

The differential phase signal generation unit 242 calculates the value of the differential phase at each of the N sample points based on the measured value of the phase of the signal light at each of the N sample points. The value $\phi_{diff}$ (i) of the differential phase at the i-th sample point is calculated, for example, according to Expression 3 described above.

According to Expression 3, a difference between the phases of the signal light at two temporally adjacent time points among the plurality of time points is calculated. The differential phase signal generation unit 242 can acquire information indicating the differential phases of the signal light at the plurality of respective time points included in the evaluation period.

The differential phase signal generation unit 242 may remove the modulation component and generate information indicating the differential phase at each of the N sample points. For example, the differential phase signal generation unit 242 removes the modulation component included in the reception signal based on a plurality of sampled I signals and Q signals. As described above, in the case of the M-phase phase modulation, the modulation component can be eliminated by calculating the M-th power of the reception signal.

In the present embodiment, the histogram generation unit 244 acquires, from the differential phase signal generation unit 242, information (may be referred to as a differential phase signal(s)) indicating (N−1) differential phases. The histogram generation unit 244 generates a histogram of (N−1) differential phases. The histogram generation unit 244 outputs, to the standard deviation calculation unit 246, information indicating the generated histogram.

In the present embodiment, the standard deviation calculation unit 246 calculates the standard deviations of the (N−1) differential phases. For example, the standard deviation calculation unit 246 executes fitting to a normal distribution on the histogram generated by the histogram generation unit 244. In addition, the standard deviation calculation unit 246 calculates the standard deviation of the above-described normal distribution.

The standard deviation calculation unit 246 may derive the calculated standard deviation as the index for evaluating the phase noise of the signal light. As shown in Expression 6, the square of the standard deviation of the phase noise of the signal light is expressed as ½ times the square of the standard deviation of the differential phase. The standard deviation calculation unit 246 may derive the standard deviation of the phase noise of the signal light according to Expression 9 based on the standard deviations of the (N−1) differential phases.

In addition, as shown in Expression 7, the square of the standard deviation of the phase noise of the reception signal is expressed as a square root of the sum of the square of the standard deviation of the phase noise of the signal light and the square of the standard deviation of the phase noise due to the spectral linewidth of the local oscillator light. The standard deviation calculation unit 246 may derive the standard deviation of the phase noise of the reception signal according to Expressions 9 to 11 based on the standard deviations of the N differential phases.

The standard deviation calculation unit 246 may generate information for evaluating the phase noise of the signal light (may be referred to as evaluation information). Examples of the information for evaluating the phase noise of the signal light include information indicating the standard deviation of the N differential phases, the standard deviation of the phase noise of the signal light, and/or the standard deviation of the phase noise of the reception signal.

The phase noise evaluation unit 240 may be an example of an evaluation device. The differential phase signal generation unit 242 may be an example of a differential phase information acquisition unit. The histogram generation unit 244 may be an example of the differential phase information acquisition unit. The standard deviation calculation unit 246 may be an example of an index derivation unit.

Figure 3:
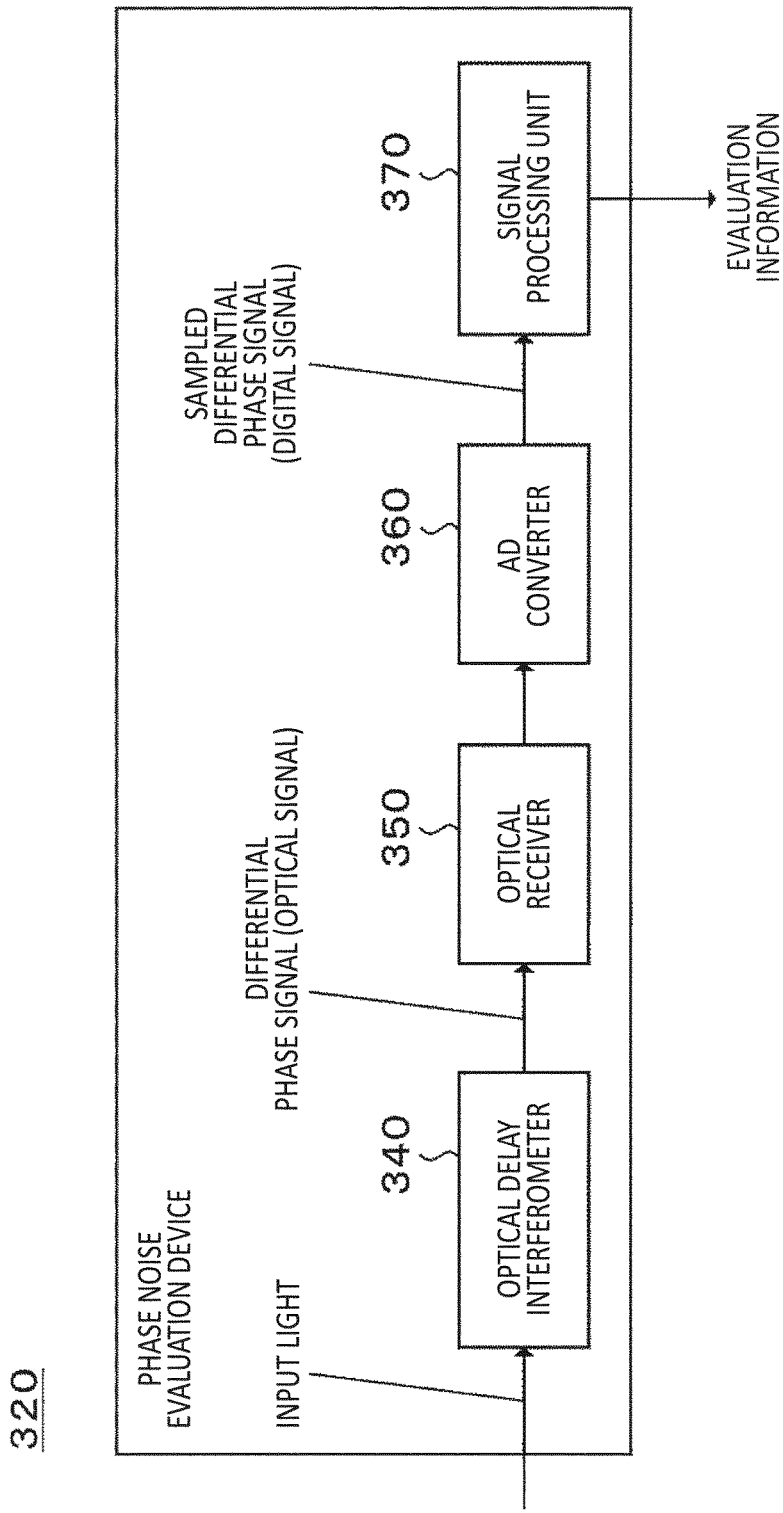
FIG. 3 schematically shows an example of a system configuration of a phase noise evaluation device 320.

FIG. 3 schematically shows an example of a system configuration of a phase noise evaluation device 320. In the present embodiment, the phase noise evaluation device 320 includes an optical delay interferometer 340, an optical receiver 350, an AD converter 360, and a signal processing unit 370.

In the communication system 100 described with reference to FIGS. 1 and 2, the optical signal reception device 120 executes high-speed A/D conversion and digital signal processing, so that the standard deviation of the differential phase is calculated in an evaluation institution. The present embodiment is different from the optical signal reception device 120 described with reference to FIGS. 1 and 2 in that high-speed arithmetic processing on an electric signal in the optical signal reception device 120 is executed at an optical level.

In the present embodiment, the phase noise evaluation device 320 outputs, as an index for evaluating the phase noise of the input light, the degree of variability of the differential phase of light input to the phase noise evaluation device 320 (may be referred to as input light). Accordingly, the phase noise evaluation device 320 can evaluate the phase noise of the input light.

The above-described input light may be the signal light having propagated through the optical transmission line 10 or may be the output light of the optical 90-degree hybrid 140. The phase noise evaluation device 320 is attached to, for example, the optical signal reception device 120, and a part of the signal light having propagated through the optical transmission line 10 is input thereto.

In signal light to be used for actual communication, an optical signal has a spectral component due to modulation. Therefore, the modulation component may be mixed in the measurement result, and it may be difficult to measure the optical phase noise.

In this regard, in an embodiment, for example, the phase noise evaluation device 320 is attached to the communication system 100 in order to evaluate the phase noise in a commissioning test after the communication system 100 is constructed. In another embodiment, the phase noise evaluation device 320 is attached to the communication system 100 in order to provide a dedicated wavelength for measuring the phase noise and constantly measure the phase noise of the light of the wavelength during the operation period of the communication system 100. For example, in an embodiment in which a differential phase is derived by signal processing of digital data, the phase noise is evaluated by measuring differential phases of an I component and a Q component of light of the above-described wavelength.

In the present embodiment, light (may be referred to as input light, target light, or the like) is input to the optical delay interferometer 340. For example, the optical delay interferometer 340 includes a first optical path and a second optical path. For example, the optical delay interferometer 340 branches the input light into the first input light and the second input light. For example, the optical delay interferometer 340 carries out multiplex interference of the first input light having passed through the first optical path and the second input light having passed through the second optical path.

In the present embodiment, the first optical path and the second optical path of the optical delay interferometer 340 are set such that the delay time difference τ between the first input light having passed through the first optical path and the second input light having passed through the second optical path and the frequency f of the input light satisfy the relationship of following Expression 12.

$$2\pi f \tau = 2n\pi + \pi/2 \text{ (where, } n \text{ is an integer)} \quad \text{(Expression 12)}$$

When the relationship of Expression 12 described above is established, the output current i of the optical receiver 350 to which the output light of the optical delay interferometer 340 is input is approximated by following Expression 13.

$$i = RE^2 \{\phi n(t) - \phi n(t - \tau)\} \quad \text{(Expression 13)}$$

In Expression 12 described above, R is the responsivity of the optical receiver 350. E is an electric field of the first input light and the second input light. φn(t) is the phase noise of the input light at time t.

In the present embodiment, the optical receiver 350 converts the output light of the optical delay interferometer 340 into an electric signal. As described above, the output current of the optical receiver 350 indicates the differential phases of the input light at the plurality of respective time points included in the evaluation period. Accordingly, the optical receiver 350 can acquire the information indicating the differential phases of the input light at the plurality of respective time points included in the evaluation period. As described above, the differential phase indicates a difference between the phases of the input light at two temporally adjacent time points among the plurality of time points.

In the present embodiment, the AD converter 360 converts the electric signal output from the optical receiver 350 from an analog signal to a digital signal. The AD converter 360 outputs, to the signal processing unit 370, a plurality of digital signals corresponding to differential phases at a plurality of respective time points included in the evaluation period. The time interval of the plurality of time points may be substantially constant.

According to the present embodiment, the sampling rate of the AD converter 360 can be significantly smaller than the sampling rate of the AD converter 162 or the AD converter 164 which samples signal light. For example, when the sample rate of the communication light is 100 GS/s, the sample rate of the AD converter 360 can be reduced to about 1 GS/s.

As shown in Expression 13 described above, when the optical delay interferometer 340 is used, a value obtained by converting the differential phase into intensity is measured. That is, the differential phase noise is converted into amplitude noise by the optical delay interferometer 340. In addition, the frequency component of the differential phase noise is almost white noise. In consideration of the above, an optical receiver having a narrow band can be used as the optical receiver 350. Specifically, an optical receiver having a band of about 100 MHz is used as the optical receiver 350. Accordingly, the sampling rate of the AD converter 360 which samples the output current of the optical receiver 350 can also be reduced.

In the present embodiment, the signal processing unit 370 receives, from the AD converter 360, the plurality of digital signals described above. The signal processing unit 370 derives, as the index for evaluating the phase noise of the input light, the degree of variability in the differential phases at the plurality of respective time points. As described above, examples of the index indicating the degree of variability include standard deviation, variance, and the like. Note that, as shown in Expression 6, the square of the standard deviation of the phase noise of the input light is expressed as ½ times the square of the standard deviation of the differential phase. The signal processing unit 370 may output information indicating the evaluation of the phase noise of the input light (may be referred to as evaluation information). Details of the signal processing unit 370 will be described later.

In the present embodiment, high-speed arithmetic processing on the electric signal in the optical signal reception device 120 is executed at an optical level. Accordingly, power saving and cost reduction are achieved. In addition, in the present embodiment, the reciprocal of the delay time is equivalent to the sampling rate in the AD converter. Therefore, power to be used for sampling can be saved.

The phase noise evaluation device 320 may be an example of an evaluation device. The optical delay interferometer 340 may be an example of the delay interference unit. The optical receiver 350 may be an example of the differential phase information acquisition unit or the photoelectric conversion unit. The AD converter 360 may be an example of the differential phase information acquisition unit or the analog-to-digital conversion unit. The signal processing unit 370 may be an example of the differential phase information acquisition unit or the index derivation unit.

Example of Another Embodiment

In the present embodiment, an example of the phase noise evaluation device 320 has been described by taking, as an example, a case where the phase noise evaluation device 320 includes the AD converter 360 and the signal processing unit 370. However, the phase noise evaluation device 320 is not limited to the present embodiment. In another embodiment, the signal processing unit 370 may have the function of the AD converter 360, and the phase noise evaluation device 320 may not include the AD converter 360.

Figure 4:
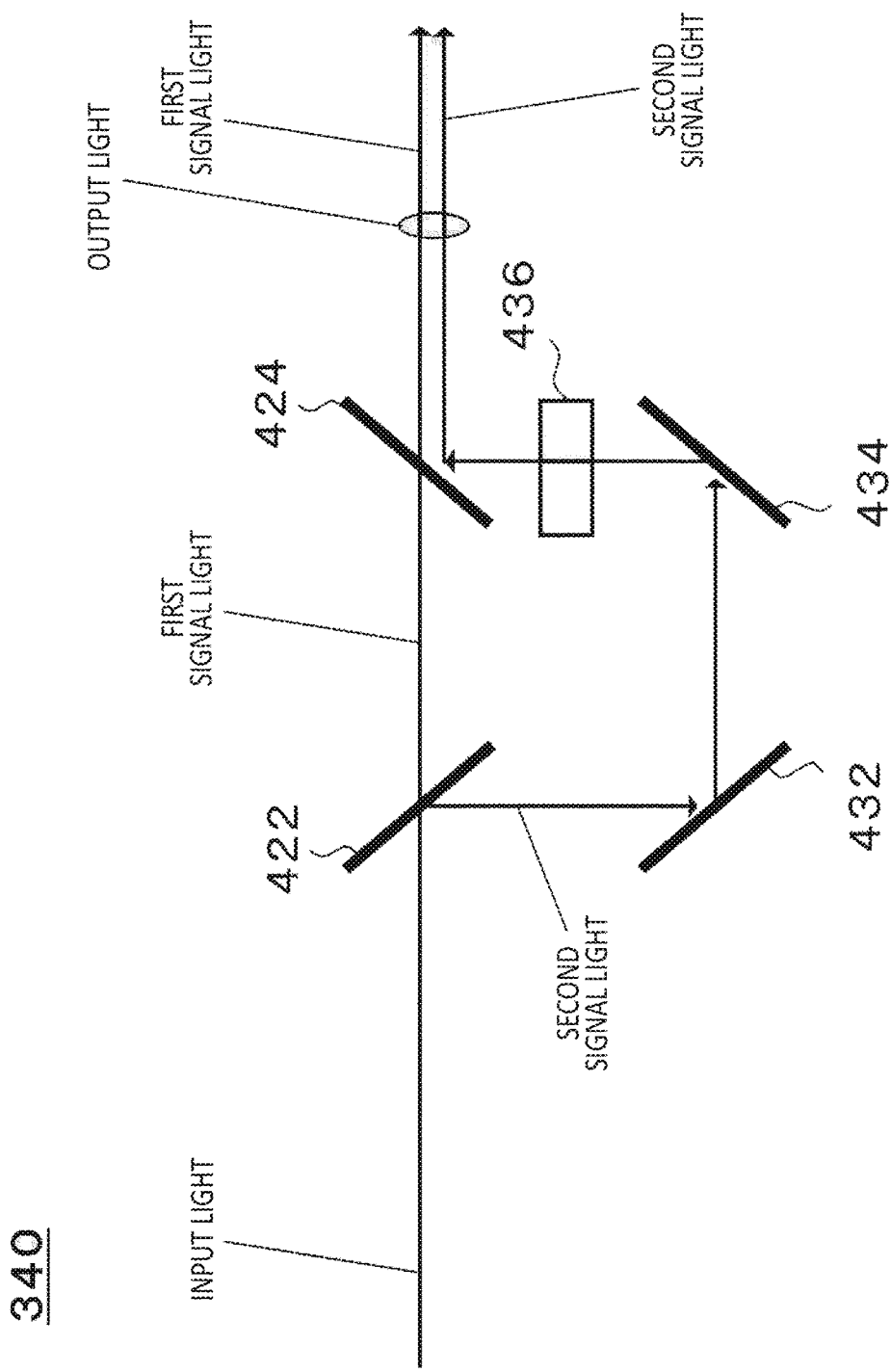
FIG. 4 schematically shows an example of an internal configuration of an optical delay interferometer 340.

FIG. 4 schematically shows an example of an internal configuration of the optical delay interferometer 340. In the present embodiment, the optical delay interferometer 340 includes a half mirror 422, a half mirror 424, a total reflection mirror 432, a total reflection mirror 434, and an optical phase adjuster 436.

The input light is branched into first signal light to transmit through the half mirror 422 and second signal light to be reflected by the half mirror 422. The first signal light transmits through the half mirror 424 and is output from the optical delay interferometer 340. On the other hand, the second signal light is reflected by the total reflection mirror 432, the total reflection mirror 434, and the half mirror 424, mixed with the first signal light having transmitted through the half mirror 424, and output from the optical delay interferometer 340.

In the present embodiment, the optical delay interferometer 340 imparts an optical path difference to the first signal light and the second signal light. Assuming that the delay time difference due to the above-described optical path difference is $\tau$, the time is t, and the phase of the first signal light at the time of input to the optical receiver 350 is $\phi(t)$, the phase of the second signal light at the time of input to the optical receiver 350 is $\phi(t-\tau)$. The delay time difference $\tau$ is adjusted to satisfy the relationship of Expression 8 described above.

In addition, in the present embodiment, the optical phase adjuster 436 is arranged in a region, which does not overlap with the optical path of the first signal light (which is the first optical path described above), in the optical path of the second signal light (which is the second optical path described above). The optical phase adjuster 436 adjusts the phase of the light passing through the optical phase adjuster 436. For example, the optical phase adjuster 436 adjusts the phase of the light passing through the optical phase adjuster 436 according to the voltage applied to the optical phase adjuster 436. Examples of the optical phase adjuster 436 include a liquid crystal element, a lithium niobate crystal, and the like.

According to the present embodiment, the above-described delay time difference $\tau$ is adjusted by adjusting the distance between the first optical path and the second optical path and/or the voltage applied to the optical phase adjuster 436. Accordingly, the operating point of the optical delay interferometer 340 can be adjusted. The delay time difference $\tau$ may be adjusted at the time of calibration or may be adjusted in real time.

In another embodiment, the optical phase adjuster 436 may be arranged in a region, which does not overlap with the second optical path, of the first optical path. In addition, the optical delay interferometer 340 may not include the optical phase adjuster 436.

Figure 5:
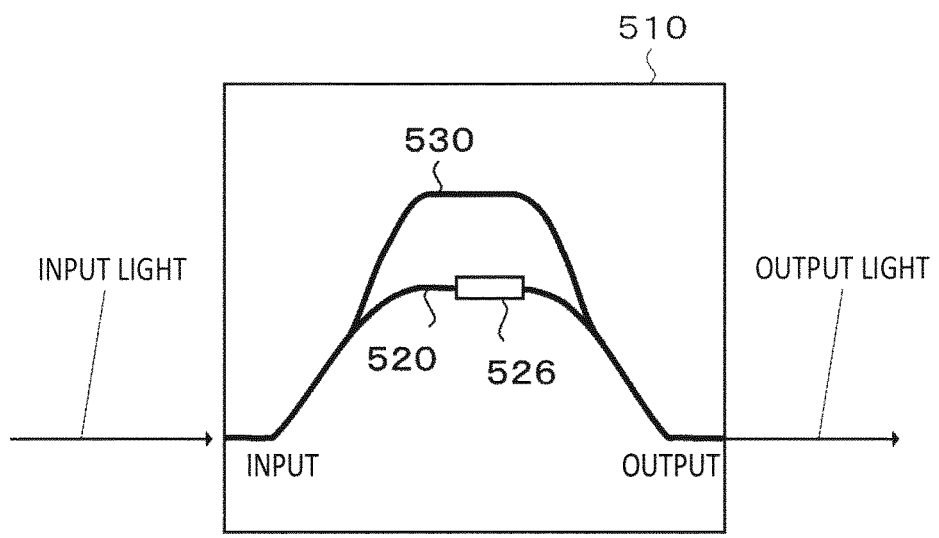
FIG. 5 schematically shows an example of an internal configuration of an optical delay interferometer 540.

FIG. 5 schematically shows an example of an internal configuration of the optical delay interferometer 540. The optical delay interferometer 540 is another example of the optical delay interferometer 340, and can be implemented in the phase noise evaluation device 320 instead of the optical delay interferometer 340.

In the present embodiment, the optical delay interferometer 540 includes a substrate 510, and a waveguide 520 and a waveguide 530 formed in the substrate 510. The substrate 510 may be a semiconductor substrate such as a silicon substrate.

The input light is branched into the waveguide 520 and the waveguide 530 at a branch point. The first signal light having propagated through the waveguide 520 and the second signal light having propagated through the waveguide 530 are multiplexed and then output from the optical delay interferometer 540. The delay time difference $\tau$ between the waveguide 520 and the waveguide 530 is adjusted to satisfy the relationship of Expression 8 described above.

In the present embodiment, an electrode 526 is arranged in a part of the waveguide 520. By adjusting the voltage applied to the electrode 526, the phase of the light passing through the waveguide 520 is finely adjusted.

According to the present embodiment, the above-described delay time difference $\tau$ is adjusted by adjusting the distance between the waveguide 520 and the waveguide 530 and/or the voltage applied to the electrode 526. Accordingly, the operating point of the optical delay interferometer 540 can be adjusted. The delay time difference $\tau$ may be adjusted at the time of calibration or may be adjusted in real time.

In another embodiment, the electrode 526 may be arranged in the waveguide 530. In addition, the optical delay interferometer 540 may not include the electrode 526.

Figure 6:
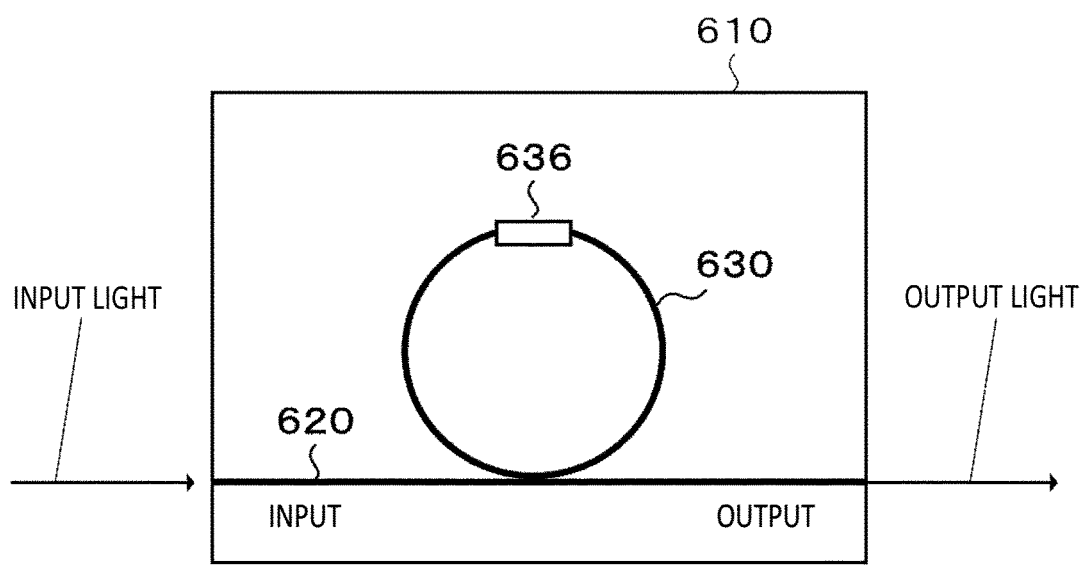
FIG. 6 schematically shows an example of an internal configuration of an optical delay interferometer 640.

FIG. 6 schematically shows an example of an internal configuration of the optical delay interferometer 640. In the present embodiment, the optical delay interferometer 640 includes a substrate 610, a waveguide 620 to which input light is input, a ring resonator 630 arranged adjacent to the waveguide 620, and an electrode 636 arranged in a part of the ring resonator 630. The substrate 610 may be a semiconductor substrate such as a silicon substrate.

The input light incident from the input terminal propagates through the waveguide 620 and reaches the ring resonator 630. Thereafter, a part of the input light is introduced into the ring resonator 630. The input/output characteristics of the ring resonator 630 are set such that the length of the ring is an integral multiple of the wavelength of the input light in a ring medium.

By using the ring resonator 630, the output current specification with respect to the optical frequency becomes steeper in the vicinity of the operating point. The light having passed through the waveguide 620 is output from the optical delay interferometer 640 and input to the optical receiver 350. The optical phase in the ring resonator 630 is adjusted by the voltage applied to the electrode 636. Accordingly, the operating point of the optical delay interferometer 640 can be adjusted.

Figure 7:
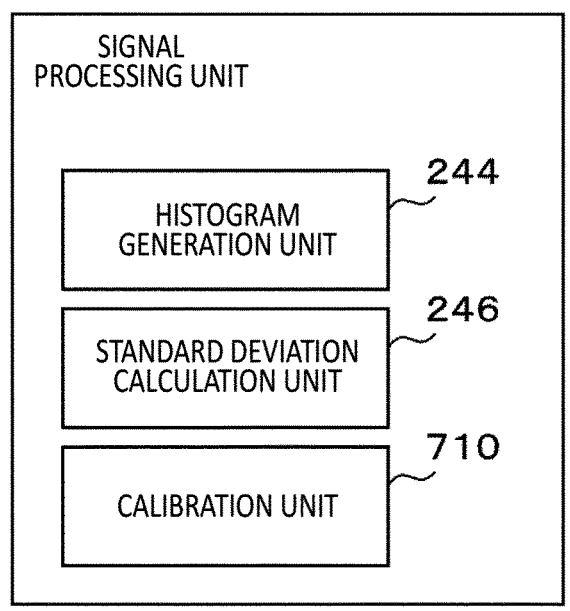
FIG. 7 schematically shows an example of an internal configuration of a signal processing unit 370.

FIG. 7 schematically shows an example of an internal configuration of the signal processing unit 370. In the present embodiment, the signal processing unit 370 includes the histogram generation unit 244, the standard deviation calculation unit 246, and a calibration unit 710.

In the present embodiment, the calibration unit 710 executes various types of calibration processing. As described above, the output current i of the optical receiver 350 is approximated by Expression 13. In this regard, the calibration unit 710 executes the calibration processing of the phase noise evaluation device 320 by using the signal light of which the phase noise is known. Accordingly, the receiver sensitivity of the optical receiver 350 and the noise of the electric circuit of the optical receiver 350 are calibrated.

For example, the variance of the differential phase noise is derived by subtracting the variance of the electric circuit noise from the variance of the reception signal. In addition, what is measured by the above-described derivation method is intensity noise corresponding to a statistical distribution of phase noise. In this regard, the measurement results such as the various variances described above and the standard deviation derived from the variances can be calibrated in advance by using known optical phase noise as a reference. The same applies to a case where the optical ring resonator is used.

Figure 8:
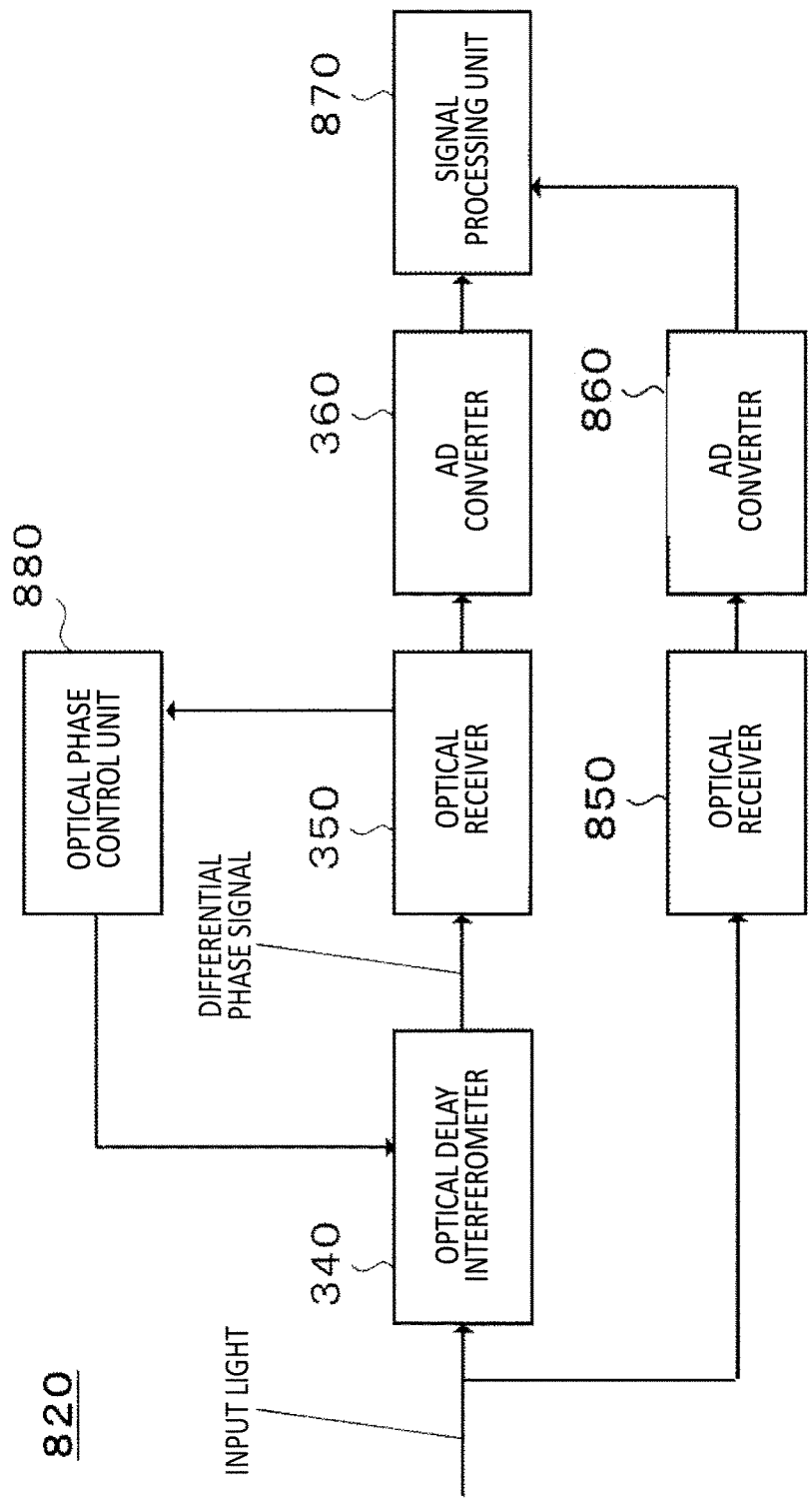
FIG. 8 schematically shows an example of a system configuration of a phase noise evaluation device 820.

FIG. 8 schematically shows an example of a system configuration of a phase noise evaluation device 820. In the present embodiment, the phase noise evaluation device 820 is different from the phase noise evaluation device 320 in including an optical receiver 850, an AD converter 860, and an optical phase control unit 880. In addition, according to the present embodiment, the input light is branched into the first light incident on the optical delay interferometer 340 and the second light incident on the optical receiver 850 at the branch point. Further, in the present embodiment, the phase noise evaluation device 820 is different from the phase noise evaluation device 320 in including a signal processing unit 870 instead of the signal processing unit 370. Regarding the features other than the above-described difference, the phase noise evaluation device 820 may have the same configuration as the phase noise evaluation device 320.

In the present embodiment, the optical receiver 850 converts the input second light into an electric signal. In the present embodiment, the AD converter 860 converts the electric signal output from the optical receiver 850 from an analog signal to a digital signal. Accordingly, information indicating the measured value of the optical power of the input light is obtained.

In the present embodiment, the signal processing unit 870 acquires, from the AD converter 860, the information indicating the measured value of the optical power of the input light. The signal processing unit 870 normalizes the differential phase of the input light by using the measured value of the optical power of the input light. In addition, the signal processing unit 870 derives the degree of variability in the differential phase by using the normalized differential phase.

In the present embodiment, the optical phase control unit 880 acquires, from the optical receiver 350, an electric signal corresponding to the output light of the optical delay interferometer 340. The optical phase control unit 880 adjusts the operating point of the optical delay interferometer 340 based on the above-described electric signal.

The optical phase control unit 880 adjusts the operating point of the optical delay interferometer 340 such that a point at which a ratio of the variation amount of the output current to the variation amount of the optical frequency becomes larger than a predetermined value is the operating point of the optical delay interferometer 340. The optical phase control unit 880 may adjust the operating point of the optical delay interferometer 340 such that a point at which the ratio of the variation amount of the output current to the variation amount of the optical frequency becomes substantially the maximum is the operating point of the optical delay interferometer 340.

The optical frequency-to-output current characteristics of the optical delay interferometer 340 is sinusoidal with respect to the optical frequency, and the cycle thereof is 1/τ. Therefore, in the graph of the above-described optical frequency-to-output current characteristics, when a point at which the above-described sine wave crosses 0 is set as the operating point, it can be seen that the ratio of the variation amount of the output current to the variation amount of the optical frequency is substantially the maximum.

In this regard, the optical phase control unit 880 may decide, as the operating point of the optical delay interferometer 340, a position where the average value of the output currents becomes 0. At this time, the optical frequency of the optical frequency-to-output current characteristics (that is, a graph in which a vertical axis represents the output current and a horizontal axis represents the optical frequency) can be considered in place of the differential phase, and thus the variation of the differential phase directly means the variation of the output current.

The AD converter 860 may be an example of an optical power information acquisition unit. The signal processing unit 870 may be an example of the optical power information acquisition unit. The optical phase control unit 880 may be an example of an adjustment unit.

Example of Another Embodiment

In the present embodiment, an example of the optical phase control unit 880 has been described by taking, as an example, a case where the optical phase control unit 880 detects the average value of the output current of the optical receiver 350 and sets the operating point of the optical delay interferometer 340 such that the average value becomes 0. However, the optical phase control unit 880 is not limited to the present embodiment.

In another embodiment, when the operating point of the optical delay interferometer 340 is optimized, the peak-to-peak value or amplitude of the output current of the optical receiver 350 is maximized. In this regard, the optical phase control unit 880 may detect the peak-to-peak value of the output current of the optical receiver 350 and set the operating point of the optical delay interferometer 340 such that the value is maximized. Similarly, the optical phase control unit 880 may detect the value of the amplitude of the output current of the optical receiver 350 and set the operating point of the optical delay interferometer 340 such that the value is maximized.

Figure 9:
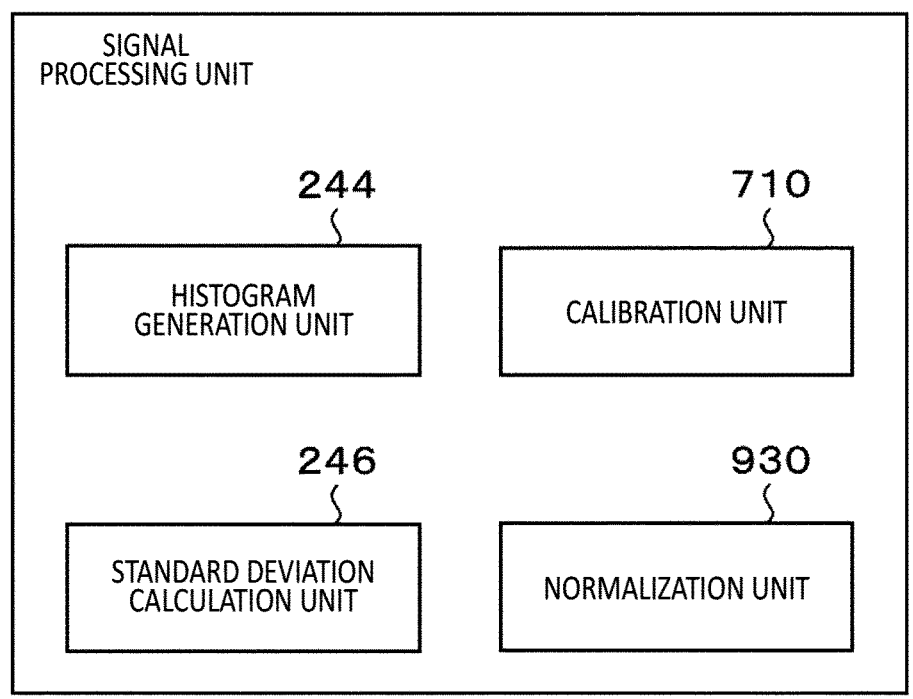
FIG. 9 schematically shows an example of an internal configuration of a signal processing unit 870.

FIG. 9 schematically shows an example of an internal configuration of the signal processing unit 870. In the present embodiment, the signal processing unit 870 includes the histogram generation unit 244, the standard deviation calculation unit 246, the calibration unit 710, and a normalization unit 930.

In the present embodiment, the normalization unit 930 acquires, from the AD converter 860, the information indicating the measured value of the optical power of the input light. The normalization unit 930 normalizes the differential phase of the input light by using the measured value of the optical power of the input light. The normalization unit 930 outputs, to the histogram generation unit 244, information indicating the normalized differential phase of the input light.

In the present embodiment, the histogram generation unit 244 generates a histogram of the differential phase by using the normalized differential phase. In the present embodiment, the standard deviation calculation unit 246 derives the standard deviation of the differential phase by using the histogram generated based on the normalized differential phase.

Figure 10:
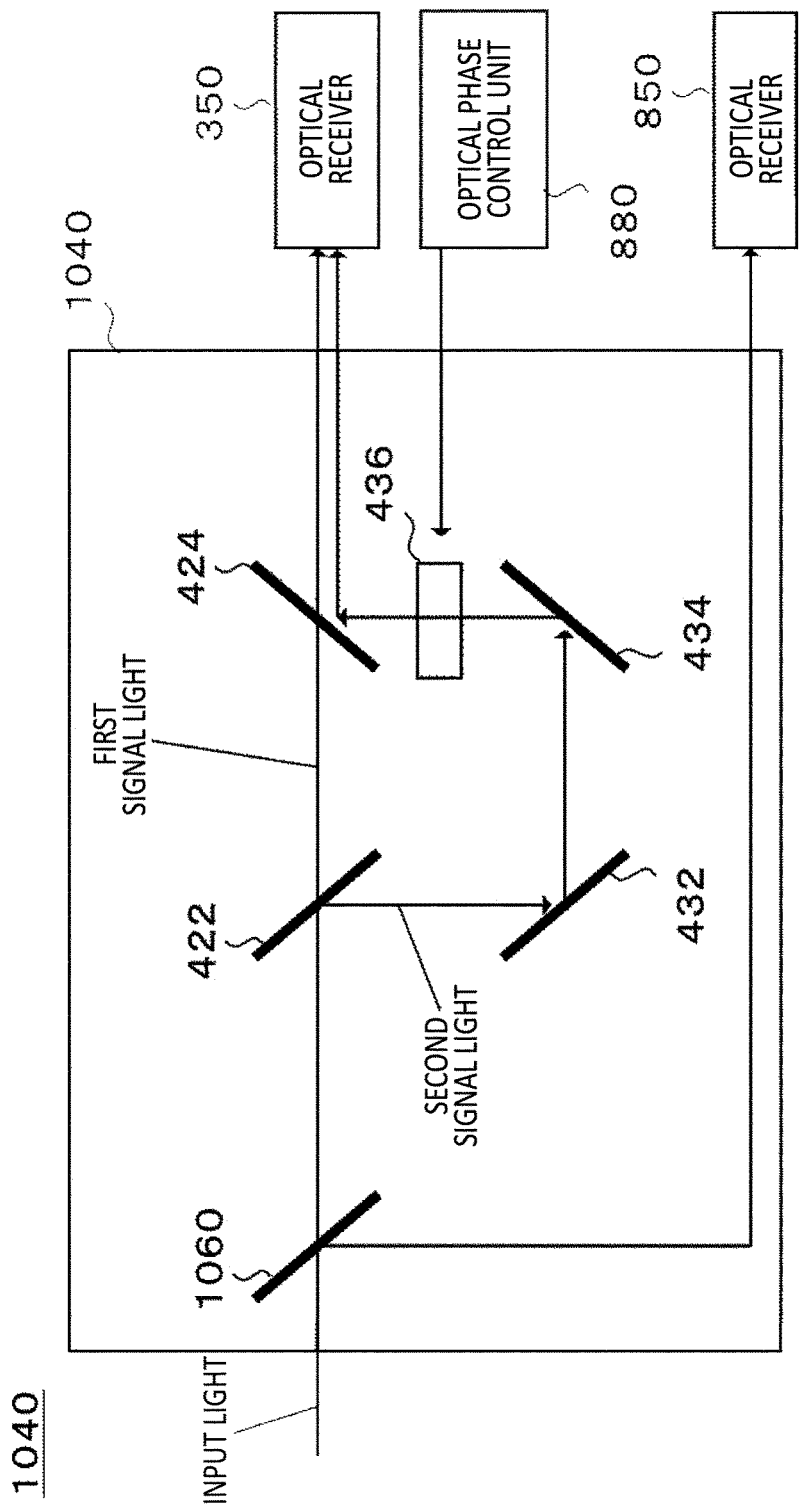
FIG. 10 schematically shows an example of an internal configuration of an optical delay interferometer 1040.

FIG. 10 schematically shows an example of an internal configuration of the optical delay interferometer 1040. In the present embodiment, the optical delay interferometer 1040 is different from the optical delay interferometer 340 in that a half mirror 1060 for branching input light and inputting a part of the input light to the optical receiver 850 is arranged. Further, in the present embodiment, the optical delay interferometer 1040 is different from the optical delay interferometer 340 in that the voltage applied to the optical phase adjuster 436 is controlled by the optical phase control unit 880.

Figure 11:
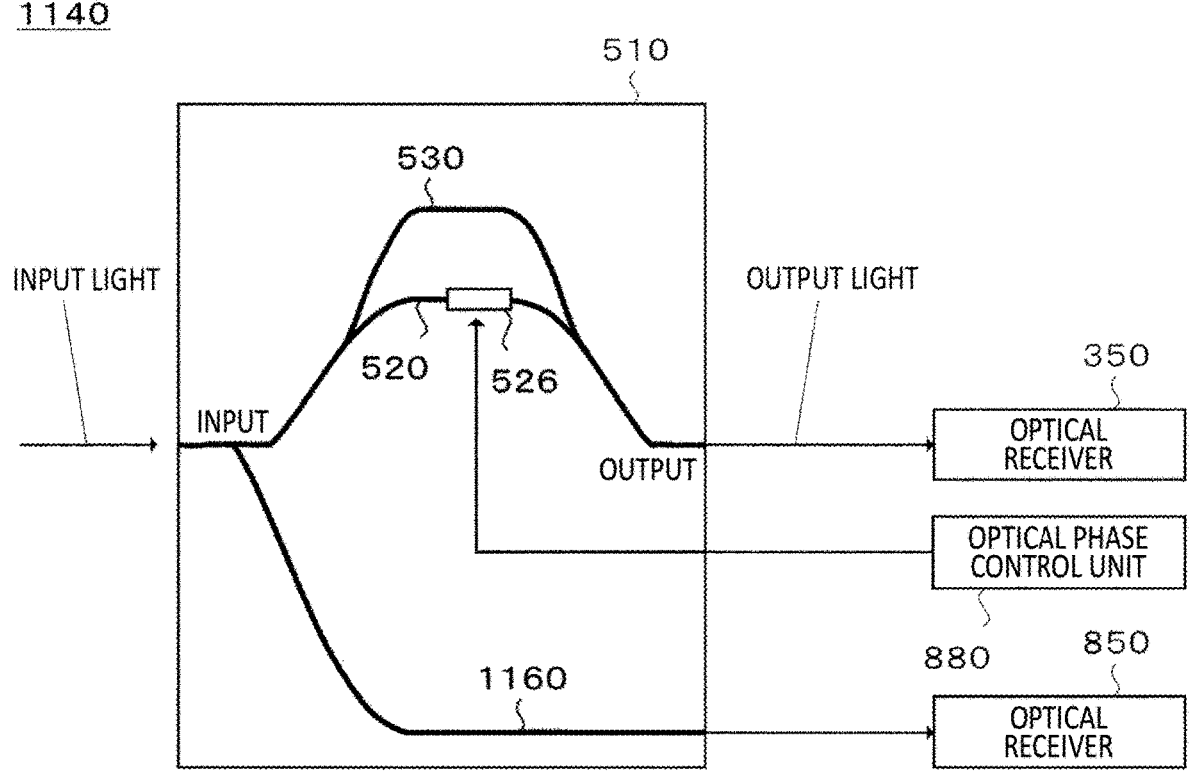
FIG. 11 schematically shows an example of an internal configuration of an optical delay interferometer 1140.

FIG. 11 schematically shows an example of an internal configuration of the optical delay interferometer 1140. In the present embodiment, the optical delay interferometer 1140 is different from the optical delay interferometer 540 in that a waveguide 1160 for branching input light and inputting a part of the input light to the optical receiver 850 is arranged. Further, in the present embodiment, the optical delay interferometer 1140 is different from the optical delay interferometer 540 in that the voltage applied to the electrode 526 is controlled by the optical phase control unit 880.

Figure 12:
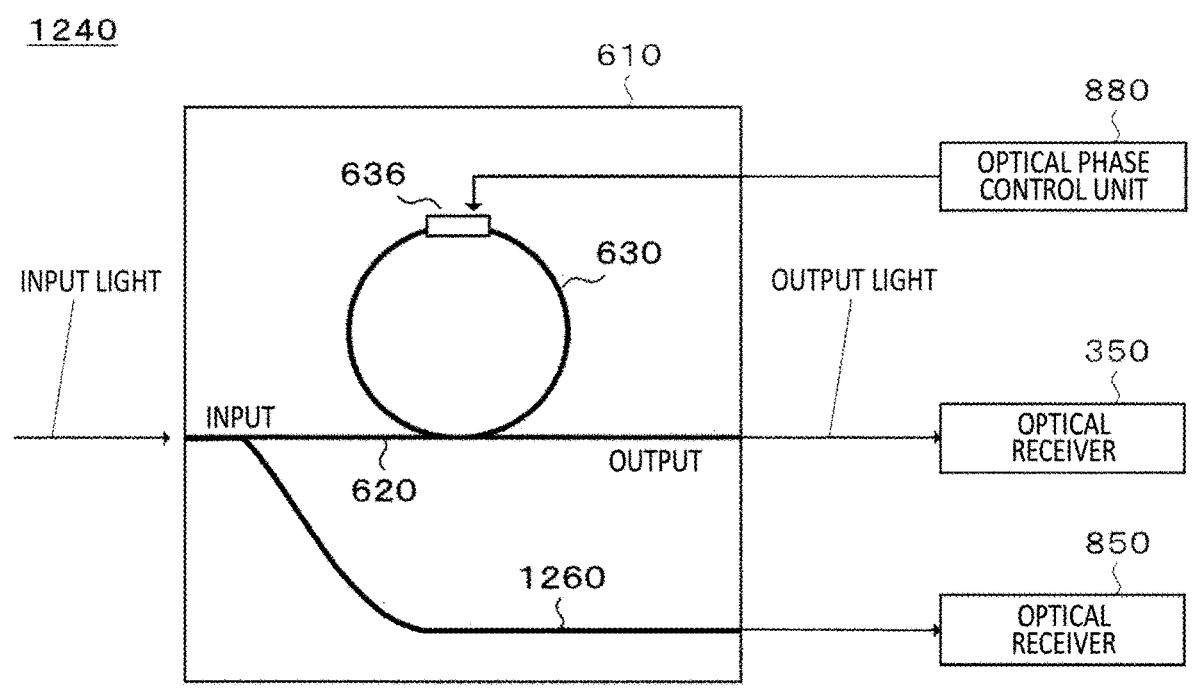
FIG. 12 schematically shows an example of an internal configuration of an optical delay interferometer 1240.

FIG. 12 schematically shows an example of an internal configuration of the optical delay interferometer 1240. In the present embodiment, the optical delay interferometer 1240 is different from the optical delay interferometer 640 in that a waveguide 1260 for branching input light and inputting a part of the input light to the optical receiver 850 is arranged. Further, in the present embodiment, the optical delay interferometer 1240 is different from the optical delay interferometer 640 in that the voltage applied to the electrode 636 is controlled by the optical phase control unit 880.

Figure 13:
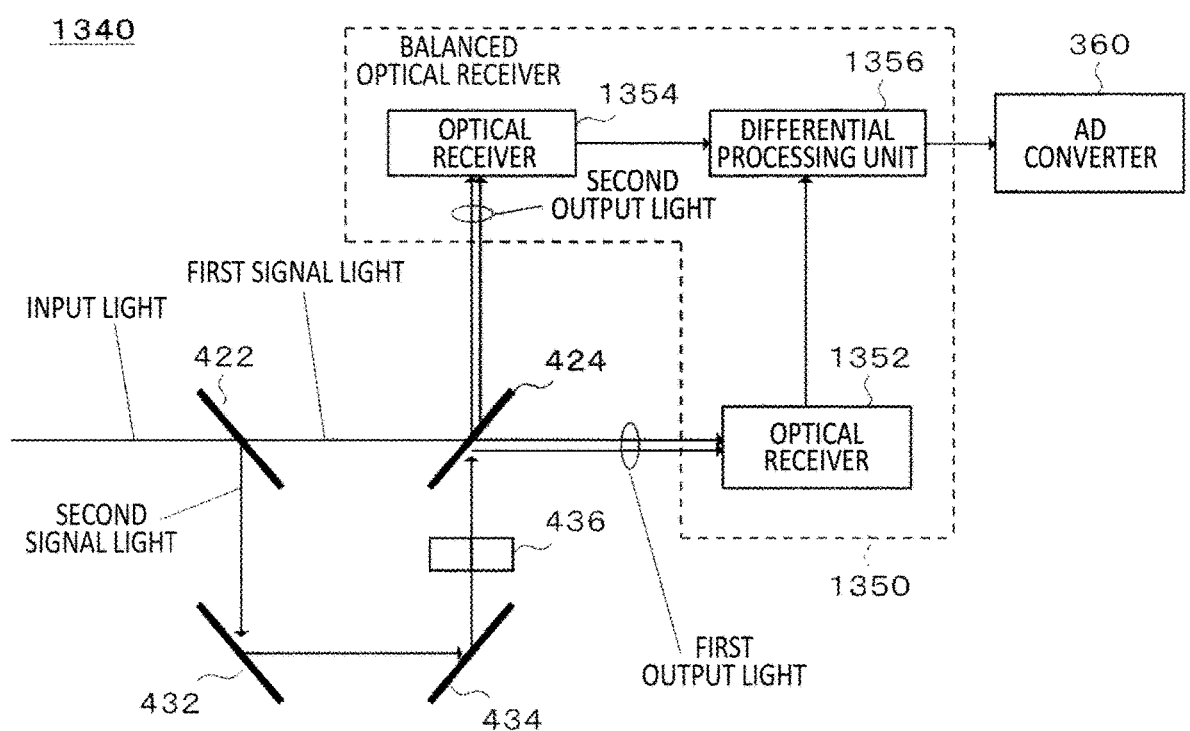
FIG. 13 schematically shows an example of an internal configuration of an optical delay interferometer 1340.

FIG. 13 schematically shows an example of an internal configuration of the optical delay interferometer 1340. In the present embodiment, the optical delay interferometer 1340 is different from the optical delay interferometer 340 in that a balanced optical receiver 1350 is used instead of the optical receiver 350. Accordingly, the intensity noise included in the signal light can be suppressed.

The balanced optical receiver 1350 includes an optical receiver 1352, an optical receiver 1354, and a differential processing unit 1356. First output light obtained by combining the first signal light having transmitted through the half mirror 424 and the second signal light reflected by the half mirror 424 is input to the optical receiver 1352. Second output light obtained by combining the first signal light reflected by the half mirror 424 and the second signal light having transmitted through the half mirror 424 is input to the optical receiver 1354. The differential processing unit 1356 outputs, to the AD converter 360, an electric signal corresponding to a difference between the output of the optical receiver 1352 and the output of the optical receiver 1354.

Figure 14:
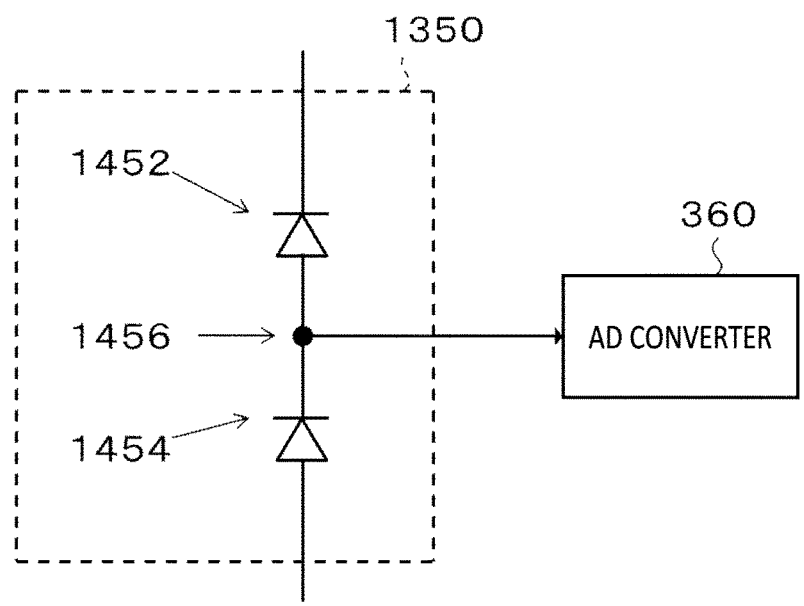
FIG. 14 schematically shows an example of a circuit configuration of a balanced optical receiver 1350.

FIG. 14 schematically shows an example of a circuit configuration of the balanced optical receiver 1350. In the present embodiment, the balanced optical receiver 1350 includes a photodiode 1452 and a photodiode 1454 connected in series. The balanced optical receiver 1350 outputs an electric signal from a coupling point 1456 of the photodiode 1452 and the photodiode 1454.

Figure 15:
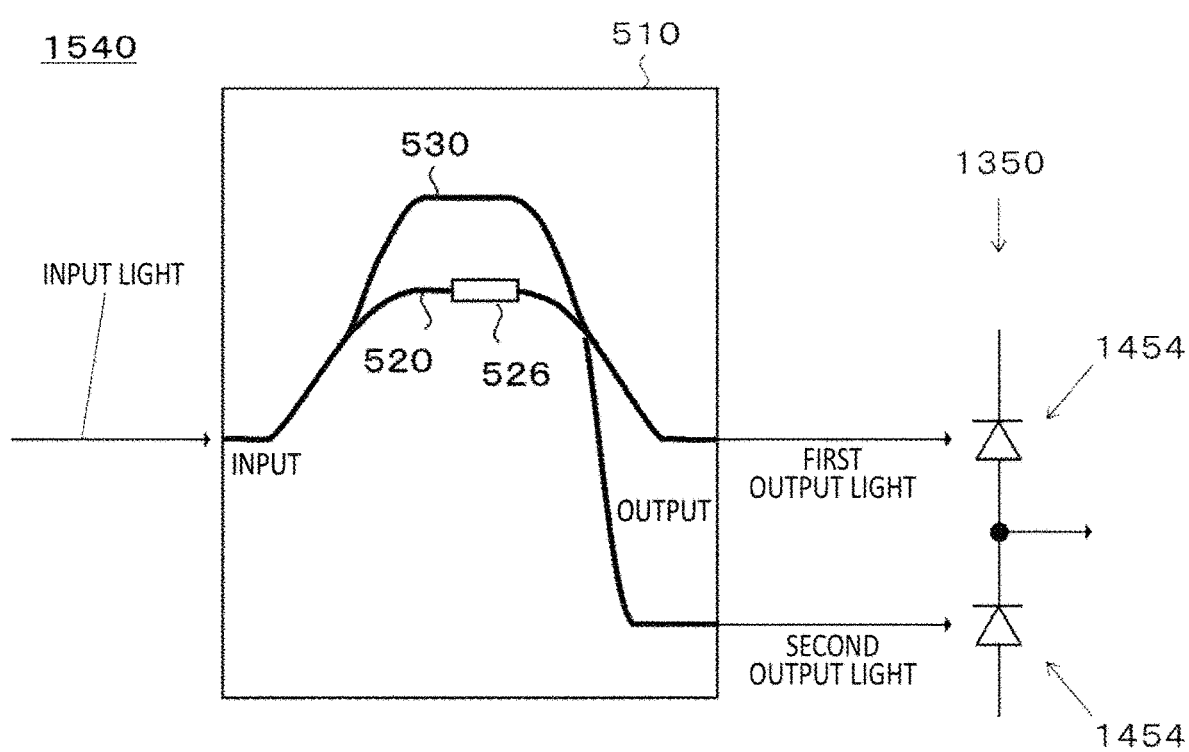
FIG. 15 schematically shows an example of an internal configuration of an optical delay interferometer 1540.

FIG. 15 schematically shows an example of an internal configuration of the optical delay interferometer 1540. In the present embodiment, the optical delay interferometer 1540 is different from the optical delay interferometer 540 in that a balanced optical receiver 1350 is used instead of the optical receiver 350. Accordingly, the intensity noise included in the signal light can be suppressed.

(Outline of Communication System 1600)

Figure 16:
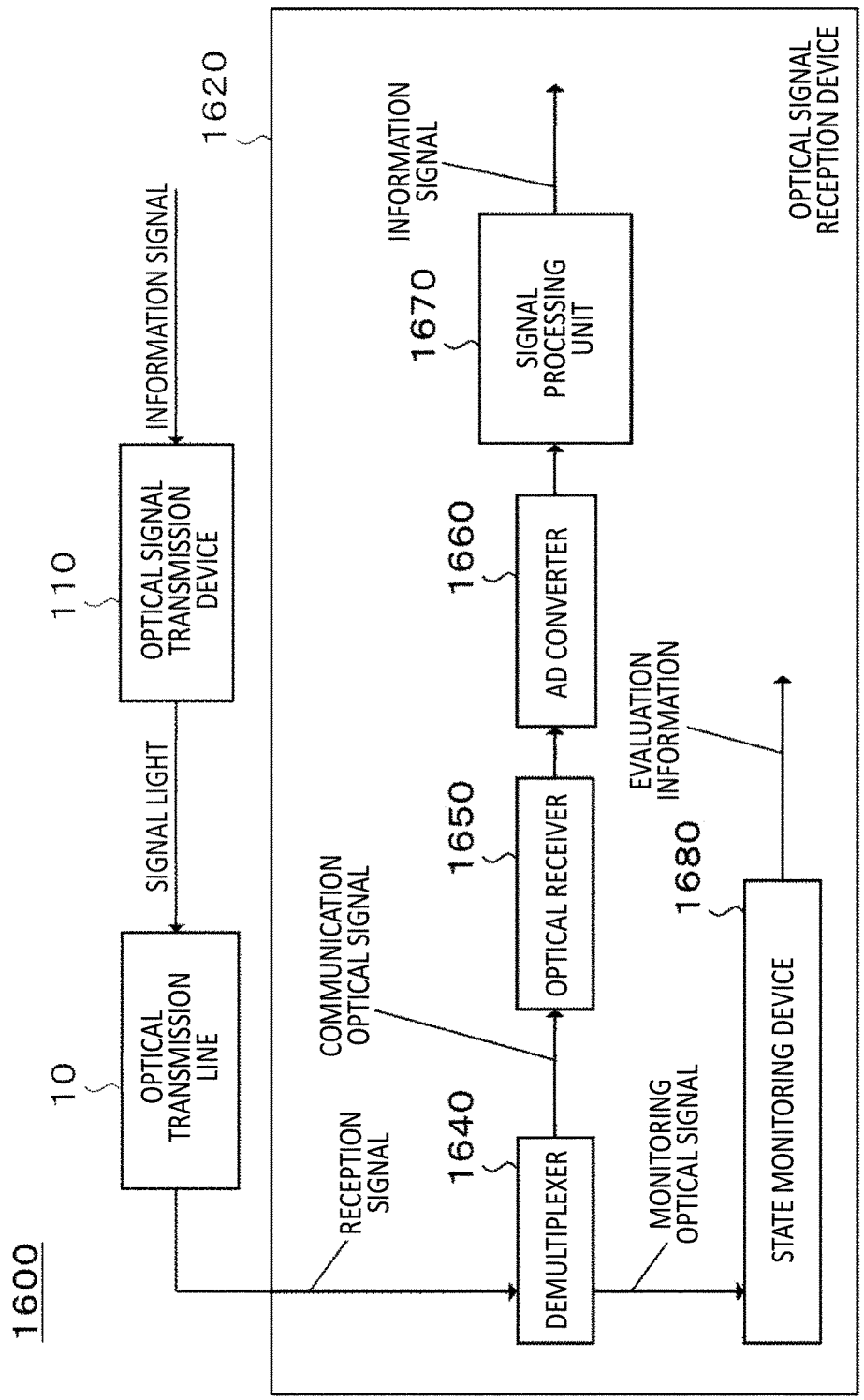
FIG. 16 schematically shows an example of a system configuration of a communication system 1600.

FIG. 16 schematically shows an example of a system configuration of the communication system 1600. In the present embodiment, the details of the communication system 1600 will be described by taking, as an example, a case where information signals are transmitted by the output signal light of the optical signal transmission device 110 propagating through the optical transmission line 10 to reach the optical signal reception device 1620.

In the present embodiment, the communication system 1600 may have the same configuration as the communication system 1600 except that the communication system 100 has a configuration for detecting polarization fluctuation. Regarding the details of the communication system 1600, description of the same configuration as that of the communication system 100 may be omitted.

In the present embodiment, for example, the communication system 1600 includes the optical signal transmission device 110 and an optical signal reception device 1620. In the present embodiment, the optical signal reception device 1620 includes a demultiplexer 1640, an optical receiver 1650, an AD converter 1660, a signal processing unit 1670, and a state monitoring device 1680.

In the present embodiment, the optical signal reception device 1620 receives the signal light having propagated through the optical transmission line 10. The optical signal reception device 120 demodulates the received optical signal and generates an information signal.

As described above, for example, when sudden abnormality occurs in the optical transmission line 10 while the signal light propagates through the optical transmission line 10, sudden polarization fluctuation occurs in the signal light. In the communication system 100, the phase noise evaluation unit 240, the phase noise evaluation device 320, the phase noise evaluation device 820, or a modification thereof statistically processes the measurement result of the phase variation, thereby evaluating the phase noise generating in the communication system 100.

However, the phase variation caused by the polarization fluctuation tends to occur suddenly as compared with the phase noise. Since the phase variation which occurs suddenly is hardly reflected in the result of the statistical processing described above, it is difficult to detect the phase variation caused by the polarization fluctuation by using the phase noise evaluation unit 240, the phase noise evaluation device 320, the phase noise evaluation device 820, or the modification thereof.

In this regard, according to the present embodiment, the optical signal reception device 1620 constantly measures the phase variation occurring in the communication system 1600. The optical signal reception device 1620 detects the phase variation caused by the sudden polarization fluctuation based on the measurement result of the phase noise in real time. For example, the optical signal reception device 1620 detects an increase in phase variation in real time and issues an alarm. Details of the information processing in the optical signal reception device 1620 will be described later.

In the present embodiment, when the signal light includes a plurality of optical signals having different wavelengths, the demultiplexer 1640 demultiplexes the plurality of optical signals for each wavelength. For example, the optical signal (may be referred to as a reception signal) received in the optical signal reception device 1620 includes light of a first wavelength (may be referred to as a communication optical signal) to be used for transmission of an information signal and light of a second wavelength (may be referred to as a monitoring optical signal(s)) to be used for detection of polarization fluctuation. The value of the first wavelength is different from the value of the second wavelength. The monitoring optical signal may be unmodulated. The demultiplexer 1640 outputs the communication optical signal to the optical receiver 1650. The demultiplexer 1640 outputs the monitoring optical signal to the state monitoring device 1680.

In the present embodiment, the optical receiver 1650 converts an optical signal into an electric signal. For example, the optical receiver 1650 converts the communication optical signal to an electric signal (may be referred to as an electric signal corresponding to the communication optical signal). The optical receiver 1650 outputs, to the AD converter 1660, the electric signal corresponding to the communication optical signal.

In the present embodiment, the AD converter 1660 converts the electric signal from an analog signal to a digital signal. For example, the AD converter 1660 samples the electric signal to generate one or more digital signals respectively corresponding to one or more sample points (may be referred to as samples). For example, the AD converter 1660 converts the electric signal corresponding to the communication optical signal to a digital signal (may be referred to as a digital signal corresponding to the communication optical signal). The AD converter 1660 outputs, to the signal processing unit 1670, the digital signal corresponding to the communication optical signal.

In the present embodiment, the signal processing unit 1670 demodulates the reception signal transmitted by the signal light to generate an information signal. A method for generating the information signal from the reception signal is not particularly limited. The signal processing unit 1670 may execute various kinds of digital signal processing for demodulating or compensating the reception signal. The signal processing unit 1670 may execute error correction processing, decoding processing, and the like.

In the present embodiment, the state monitoring device 1680 analyzes light input to the state monitoring device 1680 (may be referred to as input light) and monitors the state of the optical transmission line 10 and/or the state of the signal light having propagated through the optical transmission line 10. For example, the state monitoring device 1680 analyzes the phase variation of the input light and evaluates at least one of (i) the presence or absence and/or degree of phase noise or (ii) the presence or absence and/or degree of polarization fluctuation. Accordingly, the state monitoring device 1680 can detect, for example, the polarization fluctuation of the signal light having propagated through the optical transmission line 10.

For example, the state monitoring device 1680 acquires information indicating the differential phases of the input light as an evaluation target at one or more respective time points. The differential phase indicates a difference between the phases of the input light at two temporally adjacent time points among one or more time points. At one or more time points, the time interval between two temporally adjacent time points may be substantially constant.

The length of the above-described time interval is not particularly limited, but the above-described time interval may be the length of the symbol time of the signal transmitted by the input light, may be equal to or less than the length of the symbol time, or may be equal to or more than the length of the symbol time. In an embodiment, the above-described time interval is set such that a difference from the above-described symbol time is a predetermined value. In another embodiment, the above-described time interval is set such a difference from the above-described symbol time is equal to or less than a predetermined value or less than the predetermined value.

For example, the state monitoring device 1680 determines whether the differential phase at at least some of one or more time points satisfies a predetermined condition. When it is determined that the differential phase at at least some of one or more time points satisfies the predetermined condition, for example, the state monitoring device 1680 outputs information indicating that polarization fluctuation occurs in the signal light. Details of the state monitoring device 1680 will be described later.

(Specific Configuration of Each Unit of Communication System 1600)

Similarly to each unit of the communication system 100, each unit of the communication system 1600 may be implemented by hardware, may be implemented software, or may be implemented hardware and software. When at least a part of the constituents constituting the communication system 1600 is implemented by software, in an information processing apparatus having a general configuration, the constituents implemented by the software may be implemented by starting a program defining an operation regarding the constituents.

In the above-described information processing apparatus, the above-described data processing apparatus or storage apparatus may store a program. The above-described program may be stored in a non-transitory computer readable recording medium. The above-described program is executed by a processor to thereby make the above-described information processing apparatus execute actions defined by said program.

The above-described program may be a program for causing a computer to function as the optical signal reception device 1620 or a part thereof. The above-described program may be a program for causing a computer to execute an information processing method in the optical signal reception device 1620 or a part thereof. Examples of a part of the optical signal reception device 1620 include the signal processing unit 1670, the state monitoring device 1680, and the like.

The above-described information processing method may be a detection method for detecting the polarization fluctuation of signal light having propagated through the optical transmission line. For example, the above-described detection method includes acquiring information indicating the differential phases of input light as an evaluation target at one or more respective time points. For example, the above-described detection method includes determining whether the differential phase at at least some of the one or more time points satisfies a predetermined condition. The above-described detection method may include outputting information indicating that polarization fluctuation occurs in the signal light, when it is determined that the differential phase at at least some of one or more time points satisfies the predetermined condition.

The above-described predetermined condition may include a first condition that the magnitude of the differential phase at at least one of one or more time points is equal to a predetermined first threshold value or larger than the first threshold value. The above-described predetermined condition may include a second condition that, among a plurality of time points which are at least some of one or more time points and are included in an evaluation period which is a period having a predetermined length, the number of time points at which the magnitude of the differential phase is equal to the first threshold value or larger than the first threshold value is equal to a predetermined second threshold value or larger than the second threshold value. The above-described predetermined condition may include a third condition that a ratio of the number of the time points at which the magnitude of the differential phase is equal to the first threshold value or larger than the first threshold value among the plurality of time points, to the number of the plurality of time points included in the evaluation period is equal to a predetermined third threshold value or larger than the predetermined third threshold value. The above-described predetermined condition may include a fourth condition that a movement angle in a variation frequency of the trajectory on the Poincare sphere, derived from the magnitude of the differential phase at each of one or more time points, is equal to a predetermined fourth threshold value or larger than the fourth threshold value. The above-described predetermined condition may include a fifth condition that a movement angular velocity in the variation frequency of the trajectory on the Poincare sphere is equal to a predetermined fifth threshold value or larger than the fifth threshold value.

The above-described predetermined condition may include a combination of at least two conditions selected from a group consisting of the first condition, the second condition, the third condition, the fourth condition, and the fifth condition. The first threshold value, the second threshold value, the third threshold value, the fourth threshold value, and the fifth threshold value may be decided independently from each other. The first threshold value, the second threshold value, the third threshold value, the fourth threshold value, and the fifth threshold value may be different from each other, or at least two thereof may be the same. An outline of a procedure for deciding each threshold value will be described later.

The communication system 1600 may be an example of the detection device, the optical reception device, or the optical communication system. The optical signal reception device 1620 may be an example of the detection device or the optical reception device. The demultiplexer 1640 may be an example of a demultiplexing unit. The optical receiver 1650 may be an example of the photoelectric conversion unit. The AD converter 1660 may be an example of the analog-to-digital conversion unit. The signal processing unit 1670 may be an example of a demodulation unit. The state monitoring device 1680 may be an example of the detection device. The optical signal transmission device 110 may be an example of an optical transmission device. The optical signal may be an example of light. The one or more sample points may be an example of one or more time points. The monitoring optical signal may be an example of light of the second wavelength or input light.

Example of Another Embodiment

In the present embodiment, for the purpose of facilitating understanding of the communication system 1600, the details of the communication system 1600 have been described by taking, as an example, a case where information signals are transmitted by the signal light output from the optical signal transmission device 110 propagating through the optical transmission line 10 to reach the optical signal reception device 1620. However, the communication system 1600 is not limited to the present embodiment. For example, various multiplexing technologies are known in the field of optical communication. In this regard, according to another embodiment, various multiplexing technologies can be applied to the above-described communication system 1600.

Examples of the multiplexing technology include an optical wavelength multiplexing technology (may be referred to as a wavelength division multiplexing technology), a spatial division multiplexing technology, and the like. According to the optical wavelength multiplexing technology, a plurality of optical signals having different wavelengths can be transmitted simultaneously by using a single optical fiber. Examples of the spatial division multiplexing technology include a technology using a multi-core optical fiber in which a plurality of cores are arranged in a single clad, a technology using a multi-mode optical fiber designed to allow a plurality of modes of light to propagate therethrough, and the like.

In the present embodiment, the details of the communication system 1600 have been described by taking, as an example, a case where the communication system 1600 includes a configuration for detecting polarization fluctuation in addition to the configuration similar to the communication system 100. However, the communication system 1600 is not limited to the present embodiment. In another embodiment, the communication system 1600 may not include at least a part of the configuration of communication system 100. For example, the communication system 1600 may not include at least one of the amplitude noise evaluation unit 230 or the phase noise evaluation unit 240.

In the present embodiment, the details of the communication system 1600 have been described by taking, as an example, a case where the signal light includes, as the monitoring optical signal, the optical signal to be used for detecting polarization fluctuation. However, the communication system 1600 is not limited to the present embodiment. In another embodiment, the signal light may include various monitoring optical signals having different wavelengths. Examples of a target to be monitored, inspected, or evaluated by using the monitoring optical signal include the state of the optical transmission line 10, the state of the signal light having propagated through the optical transmission line 10, and the like.

Examples of the state of the optical transmission line 10 include the state of an electromagnetic environment around the optical transmission line 10, the state of an electric field inside or around the optical transmission line 10, the oscillation state of the optical transmission line 10, the bent state of the optical transmission line 10, the connection state (for example, deviation in connection between two optical fiber core materials constituting the optical fiber) of the optical transmission line 10, and the like. Examples of the state of the electromagnetic environment around the optical transmission line 10 include the variation state of the electromagnetic environment. Examples of the state of the electric field inside or around the optical transmission line 10 include the variation state of the electric field. Examples of the state of the optical signal include intensity variation, amplitude variation, phase variation, polarization fluctuation, and the like of the optical signal.

In the present embodiment, the details of the communication system 1600 have been described by taking, as an example, a case where the optical signal transmission device 110 transmits signal light and the optical signal reception device 1620 receives the signal light. However, the communication system 1600 is not limited to the present embodiment. In another embodiment, at least one of the optical signal transmission device 110 and the optical signal reception device 1620 may be a transmission/reception device having a function of transmitting signal light and a function of receiving signal light. For example, the optical signal transmission device 110 includes components similar to at least one of the components of the optical signal reception device 1620. For example, the optical signal reception device 1620 includes components similar to at least one of the components of the optical signal transmission device 110.

Figure 17:
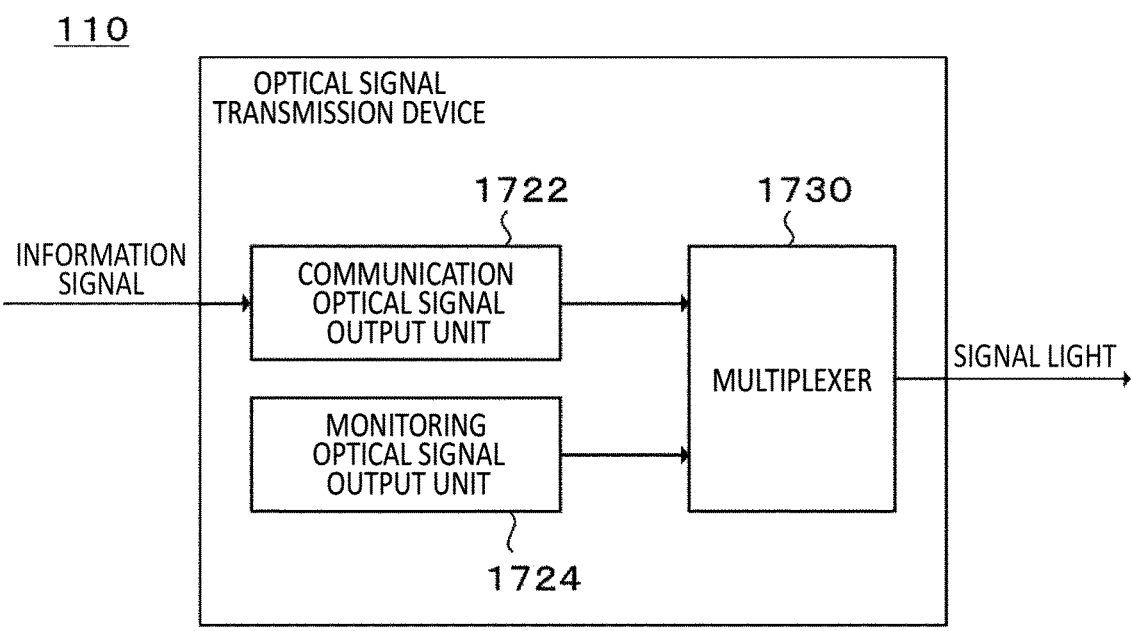
FIG. 17 schematically shows an example of an internal configuration of an optical signal transmission device 110.

FIG. 17 schematically shows an example of an internal configuration of the optical signal transmission device 110. In the present embodiment, for example, the optical signal transmission device 110 includes a communication optical signal output unit 1722, a monitoring optical signal output unit 1724, and a multiplexer 1730.

In the present embodiment, the communication optical signal output unit 1722 modulates the light having the first wavelength based on the information signal and outputs a communication optical signal. In the present embodiment, the monitoring optical signal output unit 1724 outputs one or more monitoring optical signals. Each of the one or more monitoring optical signals is generated by using light having a wavelength different from that of the communication optical signal. Each of the one or more monitoring optical signals may be generated by using light of different wavelengths. In the present embodiment, the multiplexer 1730 multiplexes the communication optical signal output from the communication optical signal output unit 1722 and the monitoring optical signal output from the monitoring optical signal output unit 1724 to generate signal light.

Example of Another Embodiment

In the present embodiment, for the purpose of facilitating understanding of the communication system 1600, the details of the optical signal transmission device 110 have been described by taking, as an example, a case where the optical signal transmission device 110 outputs a single beam of signal light. However, as described above, various multiplexing technologies are known in the field of optical communication. In this regard, according to another embodiment, various multiplexing technologies can be applied to the above-described communication system 1600. When the optical wavelength multiplexing technology is applied in the communication system 1600, the communication optical signal output unit 1722 may output a plurality of communication optical signals having different wavelengths.

Figure 18:
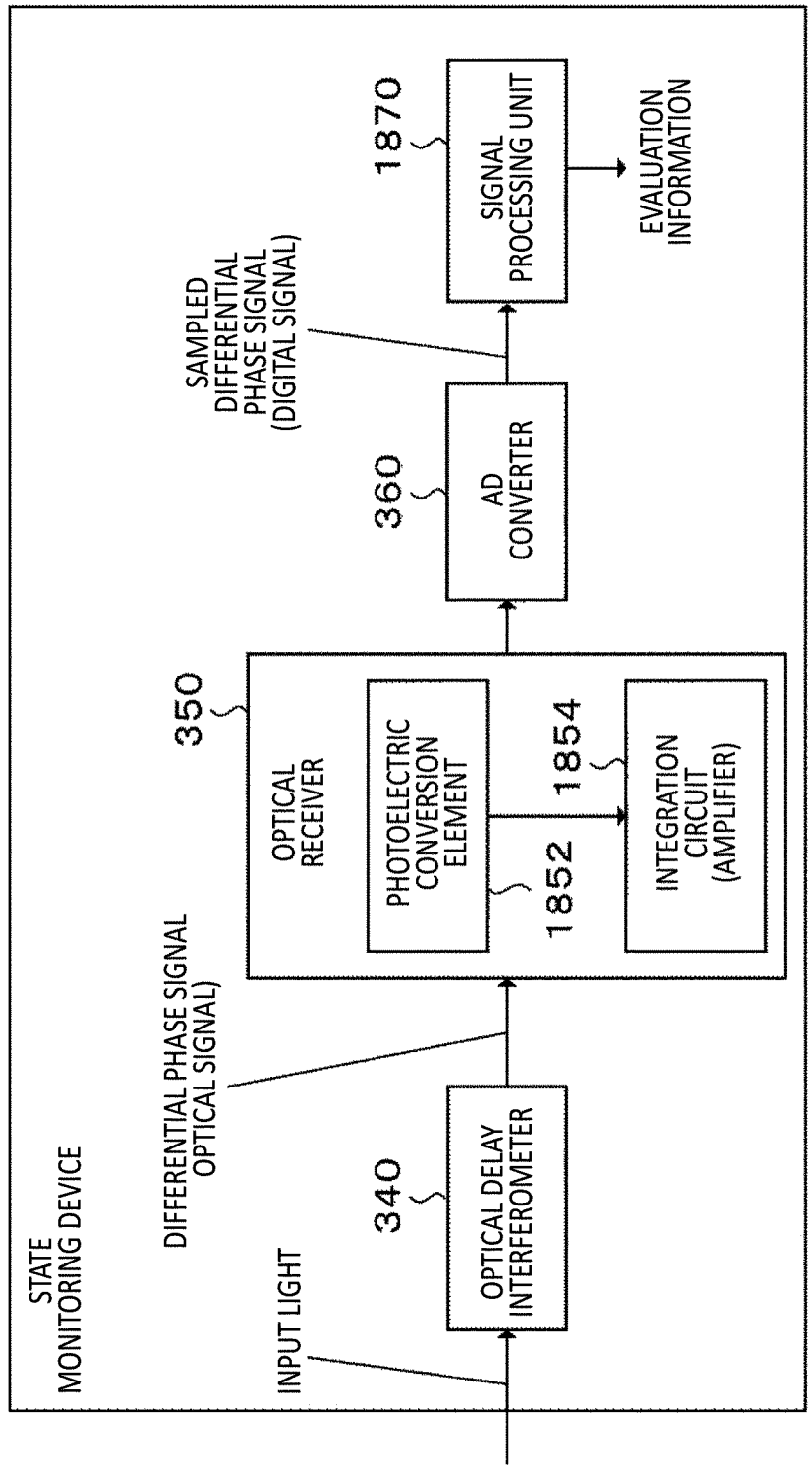
FIG. 18 schematically shows an example of an internal configuration of a state monitoring device 1680.

FIG. 18 schematically shows an example of an internal configuration of the state monitoring device 1680. In the present embodiment, for example, the state monitoring device 1680 includes the optical delay interferometer 340, the optical receiver 350, the AD converter 360, and the signal processing unit 1870. In the present embodiment, for example, the optical receiver 350 includes a photoelectric conversion element 1852 and an integration circuit 1854.

In the present embodiment, the photoelectric conversion element 1852 converts an optical signal into an electric signal. More specifically, the photoelectric conversion element 1852 converts the output light of the optical delay interferometer 340 into an electric signal. For example, the photoelectric conversion element 1852 converts photoelectrically converted photocurrent into a voltage by a load resistor to generate the above-described electric signal. The photoelectric conversion element 1852 outputs the above-described electric signal to the integration circuit 1854.

Similarly to the output current of the optical receiver 350 described in relation to FIG. 3, the output current of the photoelectric conversion element 1852 indicates the differential phase of the input light. As described above, the input light in the present embodiment is the monitoring optical signal input to the state monitoring device 1680.

In the present embodiment, the integration circuit 1854 outputs a voltage having a waveform equal to the time integration of the waveform of the input voltage. The output voltage of the integration circuit 1854 is proportional to an integral value of the input voltage of the integration circuit 1854. More specifically, the integration circuit 1854 receives the electric signal output from the photoelectric conversion element 1852 and outputs a voltage having a waveform equal to the time integration of the waveform of the electric signal. Accordingly, an electric signal corresponding to the output light of the optical delay interferometer 340 is generated. The integration circuit 1854 outputs the above-described electric signal to the AD converter 360.

The time constant of the integration circuit 1854 is decided based on, for example, the maximum speed of the phase variation accompanying the assumed polarization fluctuation. The time constant of the integration circuit 1854 may be a time constant corresponding to the maximum speed described above. For example, when the occurrence of polarization fluctuation of about 10 kHz is assumed, the time constant of the integration circuit 1854 is set to about 100 µs. Similarly, the cutoff frequency of the integration circuit 1854 can be set to about 1.59 kHz.

The time constant of the integration circuit 1854 may be 10 to 1000 µs, may be 50 to 500 µs, may be 75 to 150 µs, or may be 80 to 120 µs. The cutoff frequency of the integration circuit 1854 may be 0.1 to 100 kHz, may be 0.5 to 50 kHz, may be 1 to 20 kHz, or may be 1 to 10 KHz.

The integration circuit 1854 may be an amplifier or a low-pass filter which processes the electric signal output from the photoelectric conversion element 1852, or may be a part of components constituting the amplifier or the low-pass filter. The integration circuit may be incorporated into the photoelectric conversion element 1852 or may be arranged at a subsequent stage of the photoelectric conversion element 1852.

In the present embodiment, the AD converter 360 converts the electric signal output from the optical receiver 350 from an analog signal to a digital signal. Accordingly, one or more digital signals corresponding to the differential phases at one or more respective sample points are generated. The AD converter 360 outputs the above-described digital signal to the signal processing unit 1870.

In the present embodiment, the sampling rate of the AD converter 360 is set to a sufficient value for sampling the signal in the band of the optical receiver 350. For example, the sampling rate of the AD converter 360 is set to about 5 to 10 times the bandwidth of the optical receiver 350.

In the present embodiment, the signal processing unit 1870 acquires, from the AD converter 360, one or more sampled differential phase signals. The signal processing unit 1870 evaluates the state of the optical transmission line 10 and/or the state of the signal light having propagated through the optical transmission line 10 based on the differential phases, which are indicated by one or more differential phase signals, at one or more respective time points. For example, the signal processing unit 1870 evaluates at least one of (i) the presence or absence and/or degree of phase noise or (ii) the presence or absence and/or degree of polarization fluctuation. Accordingly, the signal processing unit 1870 can detect, for example, the polarization fluctuation of the signal light having propagated through the optical transmission line 10.

For example, the signal processing unit 1870 determines whether the differential phase at at least some of one or more time points satisfies a predetermined condition. When it is determined that the differential phase at at least some of one or more time points satisfies the predetermined condition, for example, the signal processing unit 1870 outputs information indicating that polarization fluctuation occurs in the signal light.

The provision form of the signal processing unit 1870 is not particularly limited. The signal processing unit 1870 may be an integrated circuit (IC), a large-scale integrated circuit (LSI), a system LSI, a system-on-chip, or a microprocessor, or may be a device constructed by a combination thereof. Details of the signal processing unit 1870 will be described later.

The photoelectric conversion element 1852 may be an example of the photoelectric conversion unit. The integration circuit 1854 may be an example of an integration unit. The signal processing unit 1870 may be an example of the detection device. The one or more sampled differential phase signals may be an example of the information indicating the differential phases of the input light at one or more respective time points. The one or more sample points may be an example of one or more time points.

Example of Another Embodiment

In the present embodiment, the details of the state monitoring device 1680 have been described by taking, as an example, a case where the state monitoring device 1680 includes the optical delay interferometer 340. However, the state monitoring device 1680 is not limited to the present embodiment. In another embodiment, the state monitoring device 1680 may include an optical delay interferometer having an arbitrary configuration instead of the optical delay interferometer 340. For example, the state monitoring device 1680 includes the optical delay interferometer 540, the optical delay interferometer 640, the optical delay interferometer 1040, the optical delay interferometer 1140, the optical delay interferometer 1240, or the optical delay interferometer 1340.

In the present embodiment, the details of the state monitoring device 1680 have been described by taking, as an example, a case where the state monitoring device 1680 includes the optical receiver 350. However, the state monitoring device 1680 is not limited to the present embodiment. In another embodiment, the state monitoring device 1680 may include an optical receiver having an arbitrary configuration instead of the optical receiver 350. For example, the state monitoring device 1680 includes the balanced optical receiver 1350.

In the present embodiment, the details of the state monitoring device 1680 have been described by taking, as an example, a case where the optical receiver 350 includes the integration circuit 1854. However, the state monitoring device 1680 is not limited to the present embodiment. In another embodiment, the integration circuit 1854 may be arranged outside the optical receiver 350. For example, the integration circuit 1854 is arranged at a subsequent stage of the optical receiver 350. The integration circuit 1854 may be arranged inside an instrument arranged at a subsequent stage of the optical receiver 350. Examples of the above-described instrument include an integration circuit, an instrument having integration characteristics, and the like. Examples of the instrument having integration characteristics include an amplifier, a low-pass filter, and the like.

Figure 19:
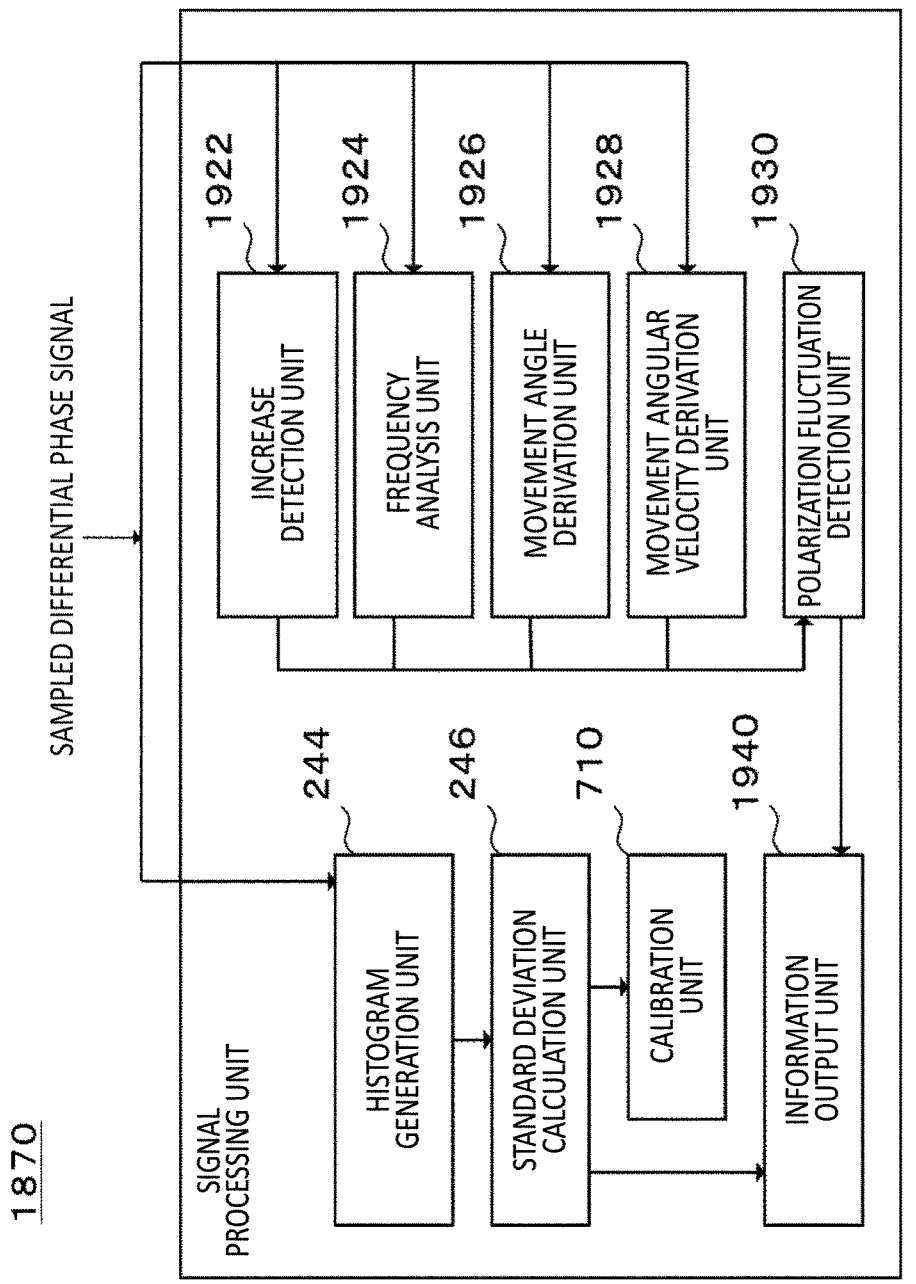
FIG. 19 schematically shows an example of an internal configuration of a signal processing unit 1870.

FIG. 19 schematically shows an example of an internal configuration of the signal processing unit 1870. In the present embodiment, the signal processing unit 1870 includes the histogram generation unit 244, the standard deviation calculation unit 246, and a calibration unit 710. In the present embodiment, the signal processing unit 1870 includes an increase detection unit 1922, a frequency analysis unit 1924, a movement angle derivation unit 1926, a movement angular velocity derivation unit 1928, a polarization fluctuation detection unit 1930, and an information output unit 1940.

In the present embodiment, the increase detection unit 1922 acquires one or more sampled differential phase signals from the AD converter 360. As described above, each of the one or more differential phase signals indicates a differential phase at each of the one or more time points. The increase detection unit 1922 analyzes one or more differential phase signals in a time region.

For example, the increase detection unit 1922 compares the magnitude of the differential phase at each of one or more time points with the predetermined first threshold value. Accordingly, the increase detection unit 1922 can determine whether the magnitude of the differential phase at each of one or more time points is equal to the first threshold value or whether the magnitude is larger than the first threshold value. The increase detection unit 1922 outputs, to the polarization fluctuation detection unit 1930, information indicating the determination result.

In the present embodiment, the frequency analysis unit 1924 acquires one or more sampled differential phase signals from the AD converter 360. The frequency analysis unit 1924 analyzes (may be referred to as frequency-analyze) one or more differential phase signals in the frequency region.

For example, the frequency analysis unit 1924 performs Fourier transform (for example, fast Fourier transform) on one or more differential phase signals. Accordingly, the variation frequency of the phase difference δ(t) between the orthogonal polarization modes Ex(t) and Ey(t) of the signal light propagating in the z direction is derived. In addition, the spectral component obtained by the Fourier transform indicates the amplitude value of the variation.

Specifically, the result of the Fourier transform is analyzed, and a frequency indicating a protruding peak value and a frequency of another protruding component are decided as the variation frequencies. For example, the variation of the amplitude value is observed while changing the frequency of the measurement data obtained by the Fourier transform. The frequency at which the amplitude value rapidly varies is decided as the variation frequency.

In the present embodiment, the frequency analysis unit 1924 outputs information indicating the analysis result to the polarization fluctuation detection unit 1930. The frequency analysis unit 1924 may output the information indicating the analysis result to the movement angle derivation unit 1926 and/or the movement angular velocity derivation unit 1928 as necessary. Examples of the information indicating the analysis result include a variation frequency, a variation amplitude value, and the like. The variation amplitude value is a parameter relating to the movement angle, and the movement angular velocity is derived based on the variation amplitude value and the variation frequency.

In the present embodiment, the movement angle derivation unit 1926 acquires one or more sampled differential phase signals from the AD converter 360. The movement angle derivation unit 1926 derives a movement angle in the variation frequency of the trajectory on the Poincare sphere, which is derived from the magnitude of the differential phase at each of one or more time points. Specifically, the variation frequency of the trajectory on the Poincare sphere is derived based on the result of the Fourier transform described above. In addition, the movement angle is derived by calculating a peak-peak value (p-p value) from the oscillation amplitude value (peak value) of the Fourier transform. The movement angle derivation unit 1926 outputs, to the polarization fluctuation detection unit 1930, information indicating the derivation result.

In the present embodiment, the movement angular velocity derivation unit 1928 acquires one or more sampled differential phase signals from the AD converter 360. The movement angular velocity derivation unit 1928 derives a movement angular velocity in the variation frequency of the trajectory on the Poincare sphere, which is derived from the magnitude of the differential phase at each of one or more time points. The movement angular velocity is derived based on the movement angle and the variation frequency of the trajectory on the Poincare sphere described above. For example, the movement angular velocity is derived as the movement angle (p-p value)×2× variation frequency. The movement angular velocity derivation unit 1928 outputs, to the polarization fluctuation detection unit 1930, information indicating the derivation result.

In the present embodiment, the polarization fluctuation detection unit 1930 evaluates the presence or absence and/or degree of polarization fluctuation. For example, the polarization fluctuation detection unit 1930 detects the polarization fluctuation. When the polarization fluctuation is detected, it can be evaluated that the polarization fluctuation occurs and/or the degree of the polarization fluctuation is relatively large.

For example, the polarization fluctuation detection unit 1930 determines whether the differential phase at at least some of one or more time points satisfies a predetermined condition. When it is determined that the differential phase at at least some of one or more time points satisfies the predetermined condition, the polarization fluctuation detection unit 1930 outputs, to the information output unit 1940, information indicating that the polarization fluctuation is detected.

The above-described predetermined condition may include a first condition that the magnitude of the differential phase at at least one of one or more time points is equal to a predetermined first threshold value or larger than the first threshold value. The above-described predetermined condition may include a second condition that, among a plurality of time points which are at least some of one or more time points and are included in an evaluation period which is a period having a predetermined length, the number of time points at which the magnitude of the differential phase is equal to the first threshold value or larger than the first threshold value is equal to a predetermined second threshold value or larger than the second threshold value. The above-described predetermined condition may include a third condition that a ratio of the number of the time points at which the magnitude of the differential phase is equal to the first threshold value or larger than the first threshold value among the plurality of time points, to the number of the plurality of time points included in the evaluation period is equal to a predetermined third threshold value or larger than the predetermined third threshold value.

The above-described predetermined condition may include a fourth condition that a movement angle in the variation frequency of the trajectory on the Poincare sphere, derived from the magnitude of the differential phase at each of one or more time points, is equal to a predetermined fourth threshold value or larger than the fourth threshold value. The above-described predetermined condition may include a fifth condition that a movement angular velocity in the variation frequency of the trajectory on the Poincare sphere is equal to a predetermined fifth threshold value or larger than the fifth threshold value.

The above-described predetermined condition may include a combination of at least two conditions selected from a group consisting of the first condition, the second condition, the third condition, the fourth condition, and the fifth condition. The first threshold value, the second threshold value, the third threshold value, the fourth threshold value, and the fifth threshold value may be decided independently from each other. The first threshold value, the second threshold value, the third threshold value, the fourth threshold value, and the fifth threshold value may be different from each other, or at least two thereof may be the same.

At least one of the first threshold value, the second threshold value, the third threshold value, the fourth threshold value, or the fifth threshold value may be decided based on the polarization fluctuation tolerance of the communication system 1600 or the optical signal reception device 1620. For example, at least one of the first threshold value, the fourth threshold value, and the fifth threshold value is set to ka times (ka is a positive number, and may be 1 or less or may be less than 1) the polarization fluctuation tolerance defined in the specification of the instrument mounted in the communication system 1600 or the optical signal reception device 1620. As described above, the first threshold value, the fourth threshold value, and the fifth threshold value may be different from each other. At least one of the second threshold value or the third threshold value may be decided by a prior test, a test at the time of trial operation, or the like.

In an embodiment, the polarization fluctuation detection unit 1930 acquires, from the increase detection unit 1922, information indicating a determination result regarding each of one or more sample points. For example, when at least one determination result among the determination results regarding one or more respective sample points indicates that the magnitude of the differential phase at the sample point is equal to the first threshold value or larger than the first threshold value, the polarization fluctuation detection unit 1930 determines that the above-described first condition is satisfied. When the first condition is satisfied, the polarization fluctuation detection unit 1930 may determine that the polarization fluctuation is detected.

According to the above-described embodiment, the first condition can be satisfied even when the influence on the transmission characteristics is actually small. For example, when the magnitude of the differential phase at a specific sample point is a statistically distinctive value, the above-described first condition is satisfied, and the polarization fluctuation can be detected. In this case, the influence of the detected polarization fluctuation on the transmission characteristics can be significantly small.

In this regard, for example, the polarization fluctuation detection unit 1930 may detect the polarization fluctuation by using the determination results regarding a plurality of sample points included in a period (may be referred to as an evaluation period) having a predetermined length, among the determination results regarding one or more respective sample points. Accordingly, the detection accuracy of the polarization fluctuation is improved.

For example, when the number of sample points, which have the magnitude of the differential phase equal to the first threshold value or larger than the first threshold value, among the number of a plurality of sample points included in the evaluation period is equal to the second threshold value or larger than the second threshold value, the polarization fluctuation detection unit 1930 determines that the above-described second condition is satisfied. When the second condition is satisfied, the polarization fluctuation detection unit 1930 may determine that the polarization fluctuation is detected.

For example, when a ratio of the number of sample points, which have the magnitude of the differential phase equal to the first threshold value or larger than the first threshold value, to the number of the plurality of sample points included in the evaluation period is equal to a predetermined third threshold value or larger than the third threshold value, the polarization fluctuation detection unit 1930 determines that the above-described third condition is satisfied. When the third condition is satisfied, the polarization fluctuation detection unit 1930 may determine that the polarization fluctuation is detected.

In another embodiment, the polarization fluctuation detection unit 1930 acquires, from the movement angle derivation unit 1926, information indicating the derivation result of the movement angle in the variation frequency of the trajectory on the Poincare sphere. When the above-described movement angle is equal to the fourth threshold value or larger than the fourth threshold value, the polarization fluctuation detection unit 1930 determines that the above-described fourth condition is satisfied. When the fourth condition is satisfied, the polarization fluctuation detection unit 1930 may determine that the polarization fluctuation is detected.

In still another embodiment, the polarization fluctuation detection unit 1930 acquires, from the movement angular velocity derivation unit 1928, information indicating the derivation result of the movement angular velocity in the variation frequency of the trajectory on the Poincare sphere. When the above-described movement angle is equal to the fifth threshold value or larger than the fifth threshold value, the polarization fluctuation detection unit 1930 determines that the above-described fifth condition is satisfied. When the fifth condition is satisfied, the polarization fluctuation detection unit 1930 may determine that the polarization fluctuation is detected.

In the present embodiment, the information output unit 1940 outputs evaluation information indicating various evaluation results in the signal processing unit 1870. In an embodiment, the evaluation information includes information for evaluating the phase noise of the signal light described with reference to FIG. 2. In another embodiment, the evaluation information includes evaluation information regarding the polarization fluctuation. Examples of the evaluation information regarding the polarization fluctuation include information indicating that the polarization fluctuation has occurred in the signal light, information indicating that the movement angular velocity has exceeded a prescribed angular velocity, information indicating that the movement angle has exceeded a prescribed angle, information indicating that the variation frequency has exceeded a prescribed frequency, and the like. The evaluation information regarding the polarization fluctuation may be output as an alarm or a flag.

As described above, the information indicating that the polarization fluctuation has occurred in the signal light may be an example of the information indicating that the degree of polarization fluctuation is relatively large. As another example of the evaluation information regarding the polarization fluctuation, information indicating the fluctuation amount of the polarization fluctuation, information indicating the absolute value of the fluctuation amount of the polarization fluctuation, and the like are exemplified. As the fluctuation amount of the polarization fluctuation, the fluctuation amount of the movement angle of the trajectory on the Poincare sphere may be used. As described above, the phase variation amplitude width measured by the optical delay interferometer indicates an approximate value of the movement angle of the trajectory on the Poincare sphere.

The increase detection unit 1922 may be an example of the differential phase information acquisition unit. The frequency analysis unit 1924 may be an example of the differential phase information acquisition unit. The movement angle derivation unit 1926 may be an example of the differential phase information acquisition unit. The movement angular velocity derivation unit 1928 may be an example of the differential phase information acquisition unit. The polarization fluctuation detection unit 1930 may be an example of a determination unit. The information output unit 1940 may be an example of the output unit. The information indicating that the polarization fluctuation is detected may be an example of the information indicating that the polarization fluctuation has occurred in the signal light.

Example of Another Embodiment

In the present embodiment, the details of the signal processing unit 1870 have been described by taking, as an example, a case where the signal processing unit 1870 includes the histogram generation unit 244, the standard deviation calculation unit 246, and the calibration unit 710 similarly to the signal processing unit 370. However, the signal processing unit 1870 is not limited to the present embodiment.

In another embodiment, the signal processing unit 1870 may not include at least one of the histogram generation unit 244, the standard deviation calculation unit 246, or the calibration unit 710. In still another embodiment, the signal processing unit 1870 may include the normalization unit 930 similarly to the signal processing unit 870.

Figure 20:
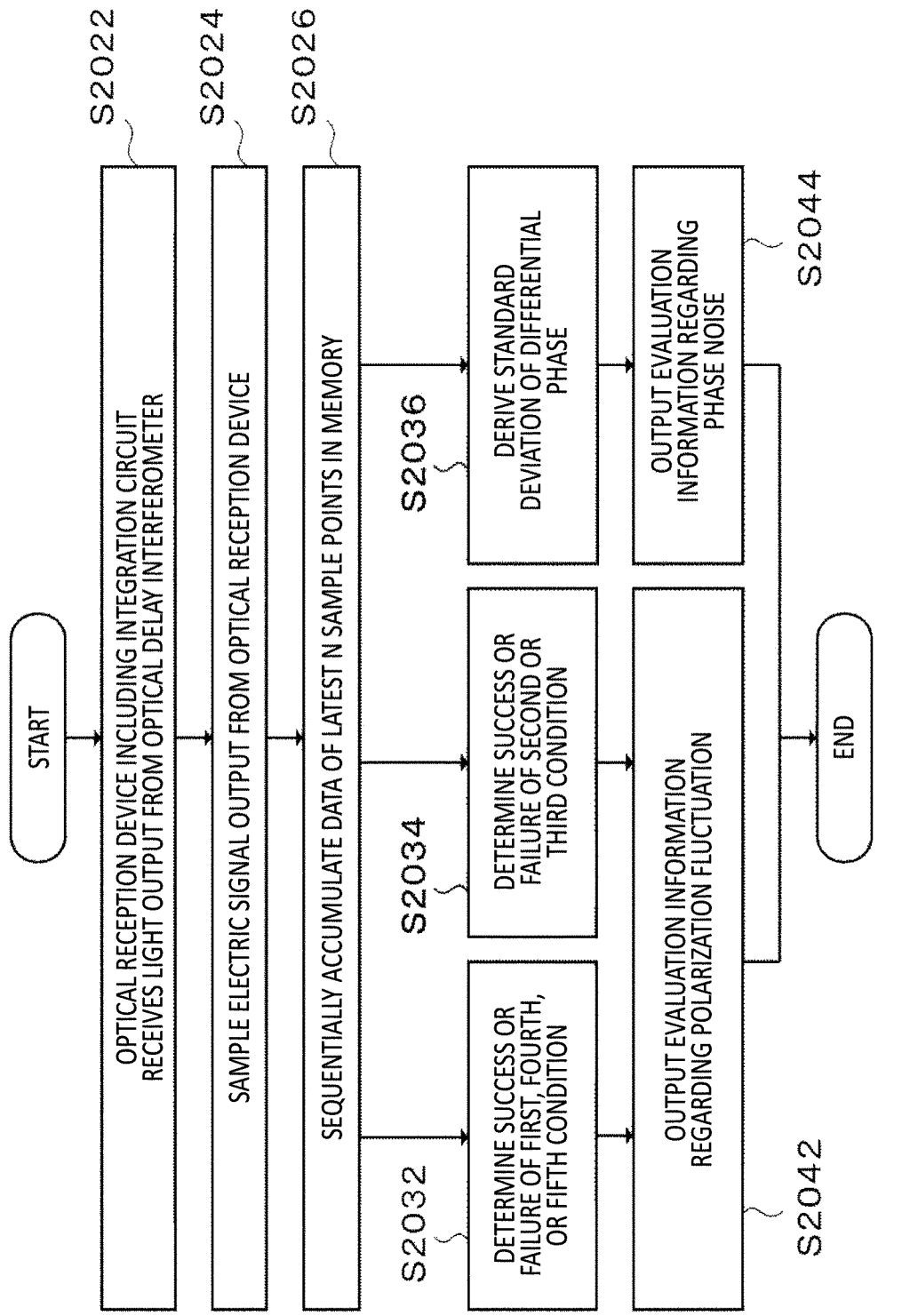
FIG. 20 schematically shows an example of information processing in the state monitoring device 1680.

FIG. 20 schematically shows an example of information processing in the state monitoring device 1680. According to the present embodiment, first, in step 2022 (step may be omitted as S), the optical receiver 350 including the integration circuit 1854 receives the light output from the optical delay interferometer 340. The optical receiver 350 generates an electric signal corresponding to the light output from the optical delay interferometer 340.

Next, in S2024, the AD converter 360 samples the electric signal output from the optical receiver 350. Accordingly, one or more digital signals corresponding to the differential phases at one or more respective sample points are generated.

In addition, in S2026, the digital signal output from the AD converter 360 is accumulated in a memory (not illustrated) arranged in the state monitoring device 1680 or the signal processing unit 1870. The digital signal output from the AD converter 360 is stored in the above-described memory in association with the identification information of each sample point, for example. In the above-described memory, for example, the latest N (N is an integer of 1 or more) pieces of data is sequentially accumulated.

When the processing of S2026 ends, in S2032, the signal processing unit 1870 determines the success or failure of the first condition, the fourth condition, and/or the fifth condition. Accordingly, the presence or absence and/or degree of the polarization fluctuation is evaluated. The signal processing unit 1870 outputs, to the information output unit 1940, information indicating the determination result.

In S2032, the signal processing unit 1870 may determine the success or failure of the first condition, the fourth condition, and/or the fifth condition, by using the data accumulated in the memory in S2026. For example, after moving average processing is performed on the data accumulated in the memory in S2026, the success or failure of the first condition, the fourth condition, and/or the fifth condition is determined. Accordingly, the influence of noise is reduced. Note that the signal processing unit 1870 may sequentially determine, for the sampled data, the success or failure of the first condition, the fourth condition, and/or the fifth condition. In this case, after the processing of S2024 ends and before the process of S2026 ends, the processing of S2032 is started.

When the processing of S2026 ends, in S2034, the signal processing unit 1870 determines the success or failure of the second condition and/or the third condition, by using the data accumulated in the memory in S2026. Accordingly, the presence or absence and/or degree of the polarization fluctuation is evaluated. The signal processing unit 1870 outputs, to the information output unit 1940, information indicating the determination result.

When the processing of S2026 ends, in S2036, the histogram generation unit 244 and the standard deviation calculation unit 246 generate information for evaluating the phase noise of the signal light, by using the data accumulated in the memory in S2026. Accordingly, the presence or absence and/or degree of the phase noise is evaluated. The standard deviation calculation unit 246 outputs, to the information output unit 1940, the information for evaluating the phase noise of the signal light.

In S2042, the information output unit 1940 outputs evaluation information regarding the polarization fluctuation. In addition, in S2044, the information output unit 1940 outputs evaluation information regarding the phase noise. Accordingly, the processing ends.

FIG. 21 schematically shows an example of a data table 2100. In the present embodiment, the data table 2100 stores the evaluation information regarding the polarization fluctuation. In the present embodiment, the data table 2100 has one or more records regarding each of one or more sample points. Each of one or more records may be an example of evaluation information at a specific time point or sample point.

In the present embodiment, the data table 2100 stores, for each of one or more sample points, the number 2120 of the sample point, the time 2122 corresponding to the sample point, the output value 2124 of the optical receiver 350 at the sample point, the variation frequency 2132 derived by the frequency analysis unit 1924, the movement angle 2134 derived by the movement angle derivation unit 1926, the movement angular velocity 2136 derived by the movement angular velocity derivation unit 1928, the success or failure 2140 of each of the first to fifth conditions, and the detection result 2150 of the polarization fluctuation in association with each other. Note that the data item of the data table 2100 is not limited to the present embodiment. For example, in another embodiment, the data table 2100 stores, for each of one or more sample points, the number 2120 or the time 2122 of the sample point and the detection result 2150 of the polarization fluctuation in association with each other.

Example of Another Embodiment

In the present embodiment, the details of the evaluation information regarding the polarization fluctuation have been described by taking, as an example, a case where the evaluation information regarding the polarization fluctuation is stored in the data table 2100. However, the evaluation information regarding the polarization fluctuation is not limited to the present embodiment. In another embodiment, the evaluation information regarding the polarization fluctuation may be a list of one or more times at which the polarization fluctuation is detected.

Figure 22:
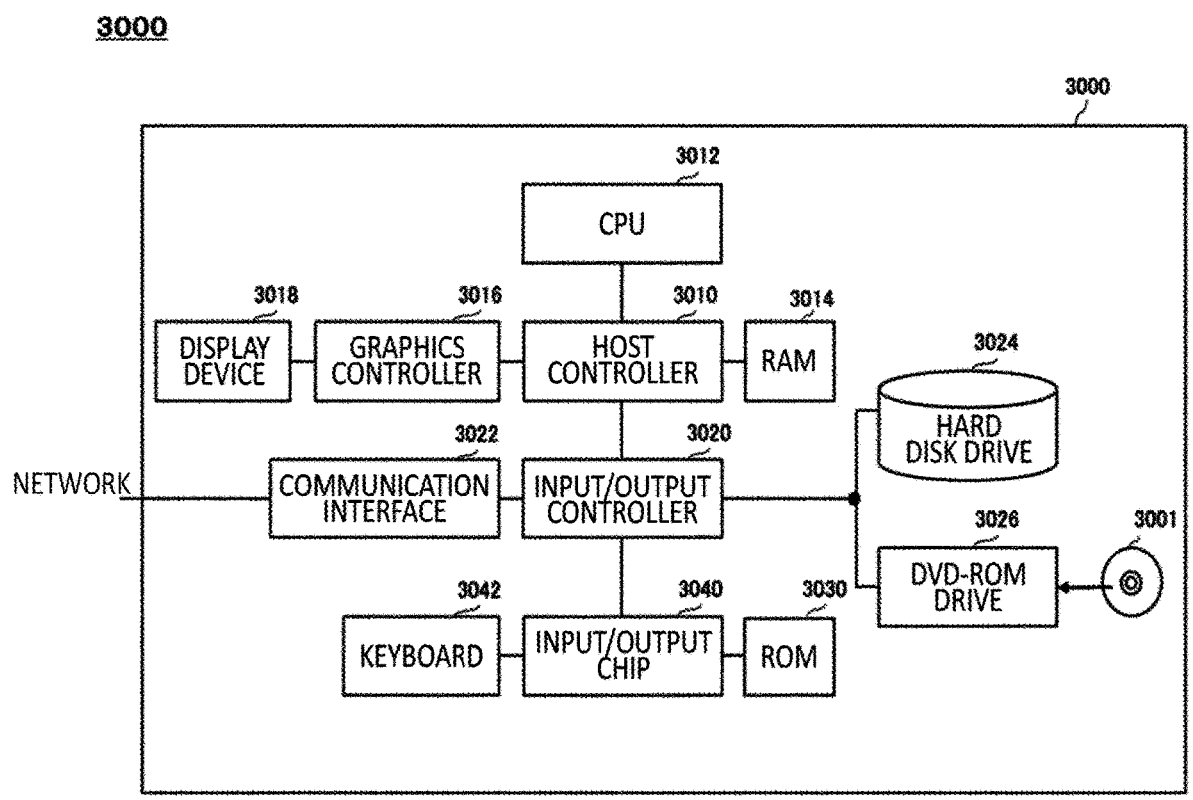
FIG. 22 schematically shows an example of a system configuration of a computer 3000.

FIG. 22 shows an example of a computer 3000 in which a plurality of aspects of the present invention may be embodied in whole or in part. At least a part of the optical signal reception device 120 may be implemented by the computer 3000. At least a part of the phase noise evaluation device 320 may be implemented by the computer 3000. At least a part of the optical signal reception device 1620 may be implemented by the computer 3000. At least a part of the state monitoring device 1680 may be implemented by the computer 3000.

A program that is installed in the computer 3000 can cause the computer 3000 to perform an operation associated with an apparatus according to the embodiment of the present invention or to function as one or a plurality of "units" of the apparatus, or can cause the computer 3000 to perform the operation or said one or plurality of units thereof, and/or cause the computer 3000 to perform processes of the embodiment of the present invention or steps thereof. Such a program may be executed by a CPU 3012 to cause the computer 3000 to perform particular operations associated with some or all of the blocks of flowcharts and block diagrams described in the present specification.

The computer 3000 according to the present embodiment includes the CPU 3012, a RAM 3014, a GPU 3016, and a display device 3018, which are mutually connected by a host controller 3010. The computer 3000 also includes input/output units such as a communication interface 3022, a hard disk drive 3024, a DVD-ROM drive 3026, and an IC card drive, which are connected to the host controller 3010 via an input/output controller 3020. The computer also includes legacy input/output units such as a ROM 3030 and a keyboard 3042, which are connected to the input/output controller 3020 through an input/output chip 3040.

The CPU 3012 operates according to programs stored in the ROM 3030 and the RAM 3014, thereby controlling each unit. The GPU 3016 acquires image data generated by the CPU 3012 in a frame buffer or the like provided in the RAM 3014 or in itself, so that the image data is displayed on the display device 3018.

The communication interface 3022 communicates with other electronic devices via a network. The hard disk drive 3024 stores the program and data to be used by the CPU 3012 in the computer 3000. The DVD-ROM drive 3026 reads a program or data from the DVD-ROM 3001, and provides the program or data to the hard disk drive 3024 via the RAM 3014. The IC card drive reads programs and data from an IC card and/or writes programs and data into the IC card.

The ROM 3030 stores therein a boot program or the like that is executed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port, or the like.

A program is provided by a computer readable storage medium, such as the DVD-ROM 3001 or the IC card. The program is read from the computer readable storage medium, installed into the hard disk drive 3024, RAM 3014, or ROM 3030, which are also examples of the computer readable storage medium, and executed by the CPU 3012. The information processing written in these programs is read into the computer 3000, resulting in cooperation between a program and the above various types of hardware resources. An apparatus or method may be configured by implementing an operation or processing of information in accordance with the use of the computer 3000.

For example, when communication is performed between the computer 3000 and an external device, the CPU 3012 may execute a communication program loaded in the RAM 3014 and instruct the communication interface 3022 to perform communication processing based on processing written in the communication program. Under the control of the CPU 3012, the communication interface 3022 reads transmission data stored in a transmission buffer area provided in a recording medium such as the RAM 3014, the hard disk drive 3024, the DVD-ROM 3001, or the IC card, and transmits the read transmission data to the network, or writes reception data received from the network in a reception buffer area or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, and the like, and execute various types of processing on the data on the RAM 3014. Next, the CPU 3012 may write back the processed data into an external recording medium.

Various types of information, such as various types of programs, data, tables, and databases, may be stored in the recording medium to undergo information processing. The CPU 3012 may execute, against the data read from the RAM 3014, various types of processing, including various types of operations designated by an instruction sequence of a program, which are described throughout this disclosure, information processing, a condition judgment, a conditional branch, an unconditional branch, information search/replacement, and the like, and write back the result to the RAM 3014. In addition, the CPU 3012 may search for information in a file, a database, or the like, in the recording medium. For example, when a plurality of entries, each having an attribute value of a first attribute associated with an attribute value of a second attribute, are stored in the recording medium, the CPU 3012 may search for an entry whose attribute value of the first attribute matches a designated condition, from among said plurality of entries, and read the attribute value of the second attribute stored in said entry, thereby acquiring the attribute value of the second attribute associated with the first attribute satisfying the predetermined condition.

The above-described program or software modules may be stored in the computer readable storage medium on or near the computer 3000. In addition, a recording medium such as a hard disk or a RAM provided within a server system connected to a dedicated communication network or the Internet can be used as a computer readable storage medium, to thereby provide the above program to the computer 3000 via the network.

Experimental Examples and Comparative Experimental Examples

Hereinafter, the present invention will be specifically described by using experimental examples and comparative experimental examples. Note that the present invention is not limited to the following experimental examples and comparative experimental examples. FIGS. 23, 24, 25, and 26 show various measurement results in Experimental Example 1. FIGS. 27, 28, 29, and 30 show various measurement results in Comparative Experimental Example 1. FIGS. 31, 32, 33, and 34 show various measurement results in Experimental Example 2.

Experimental Example 1

(Measurement Using State-of-Polarization Measuring Instrument)

First, a fiber stretcher (PZ1-SMF4-APC-E manufactured by OPTIPHASE) was prepared in which an optical fiber (SMF 28e+fiber manufactured by Corning) with a length of 12.3 m was wound in quadruplicates around a piezoelectric element. One end of the optical fiber was connected to a laser light oscillation device (PPCL550 manufactured by Pure Photonics). The other end of the optical fiber was connected to a state-of-polarization measuring instrument (PM1000 Polarimeter manufactured by Novoptel).

A laser light with a wavelength of 1550 nm was emitted from the laser light oscillation device, a voltage was applied to the fiber stretcher, and a lateral pressure variation of 140 kHz was applied to the optical fiber. The state-of-polarization measuring instrument was used to measure the Stokes parameters of the fiber stretcher output light. In addition, the movement angle of the trajectory on the Poincare sphere was derived by using the measurement result of the Stokes parameter.

The above-described experiment was performed by changing the magnitude of the voltage applied to the fiber stretcher. The magnitudes (peak-peak values) of the voltages applied to the fiber stretcher were three types of 500 mV, 1 V, and 2 V.

Figure 23:
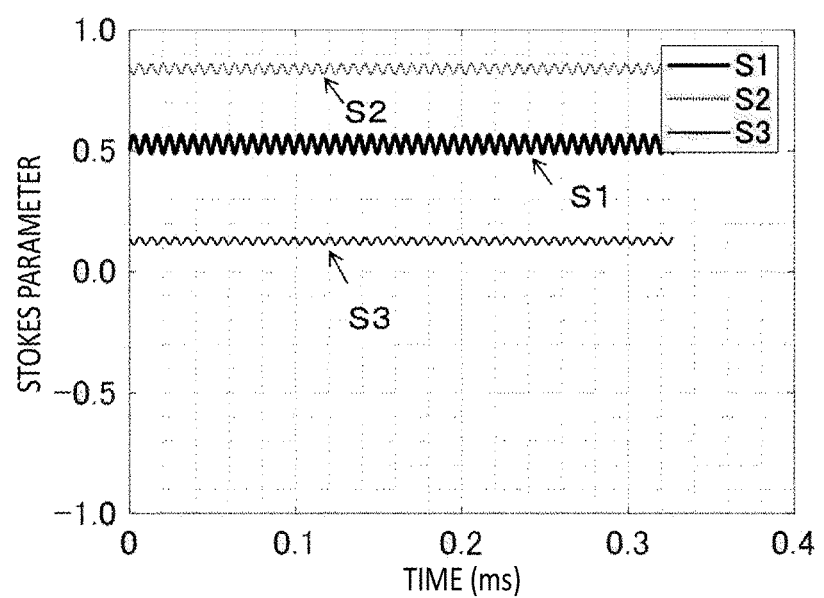
FIG. 23 shows measurement results of Stokes parameters in Experimental Example 1.

FIG. 23 shows a measurement result of the Stokes parameter when the magnitude of the voltage applied to the fiber stretcher is 1 V. As shown in FIG. 23, it was confirmed that minute polarization fluctuation occurred at a frequency of 140 kHz. In addition, when the situation of the polarization fluctuation on the Poincare sphere was confirmed by using the measurement result of the Stokes parameter, minute polarization fluctuation was confirmed on the Poincare sphere.

(Measurement Using Optical Delay Interferometer)

Next, the other end of the optical fiber was disconnected from the state-of-polarization measuring instrument, and the other end of the optical fiber was connected to one end of the optical delay interferometer (DI-C1EFAM512 manufactured by Optoplex). The other end of the optical delay interferometer was connected to the balanced optical receiver (BR-C0200B1DC manufactured by Optoplex). The balanced optical receiver was mounted with a low-pass filter, and the cutoff frequency of the balanced optical receiver was 150 MHz. The AD converter (Oscilloscope model number MSO64 manufactured by Tektronix) was used to sample the output of the balanced optical receiver.

A laser light with a wavelength of 1550 nm was emitted from the laser light oscillation device, a voltage was applied to the fiber stretcher, and a lateral pressure variation of 140 kHz was applied to the optical fiber. The measurement result of the sampled output of the balanced optical receiver was used to create (a) a histogram regarding the magnitude of the differential phase and (b) a graph showing the time variation of the magnitude of the differential phase. The measurement result of the sampled output of the balanced optical receiver is subjected to fast Fourier transform to derive (c) a frequency spectrum of the differential phase.

The above-described experiment was performed by changing the magnitude of the voltage applied to the fiber stretcher. The magnitudes (peak-peak values) of the voltages applied to the fiber stretcher were three types of 500 mV, 1 V, and 2 V.

Figure 24:
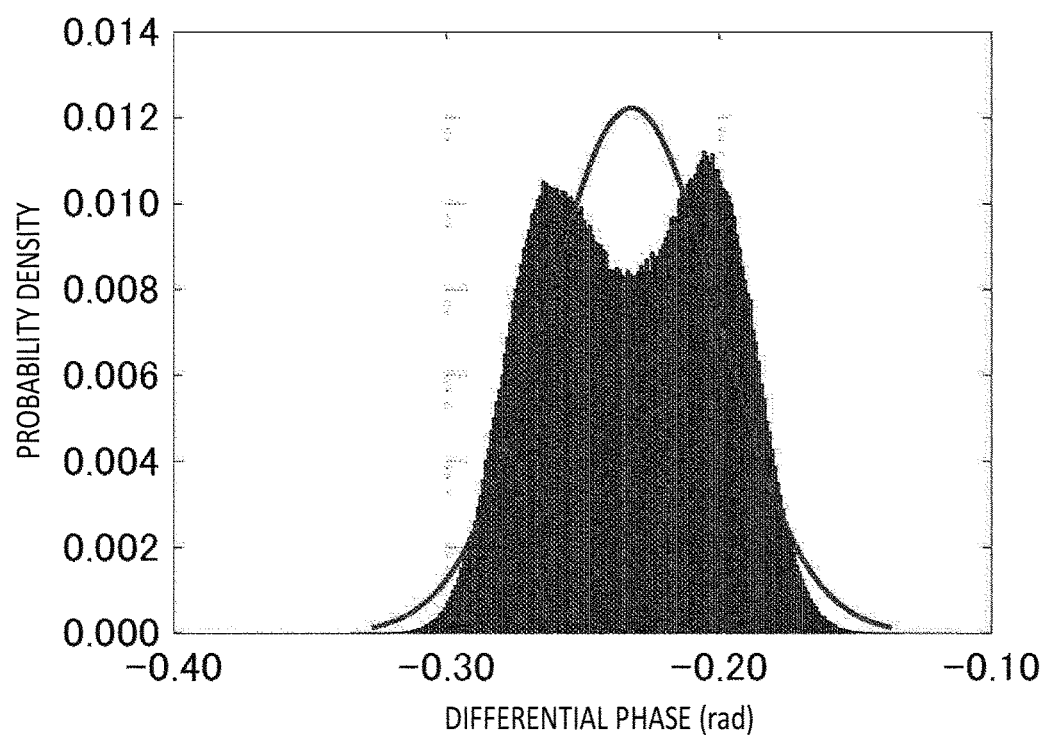
FIG. 24 shows a histogram of a differential phase in Experimental Example 1.
Figure 25:
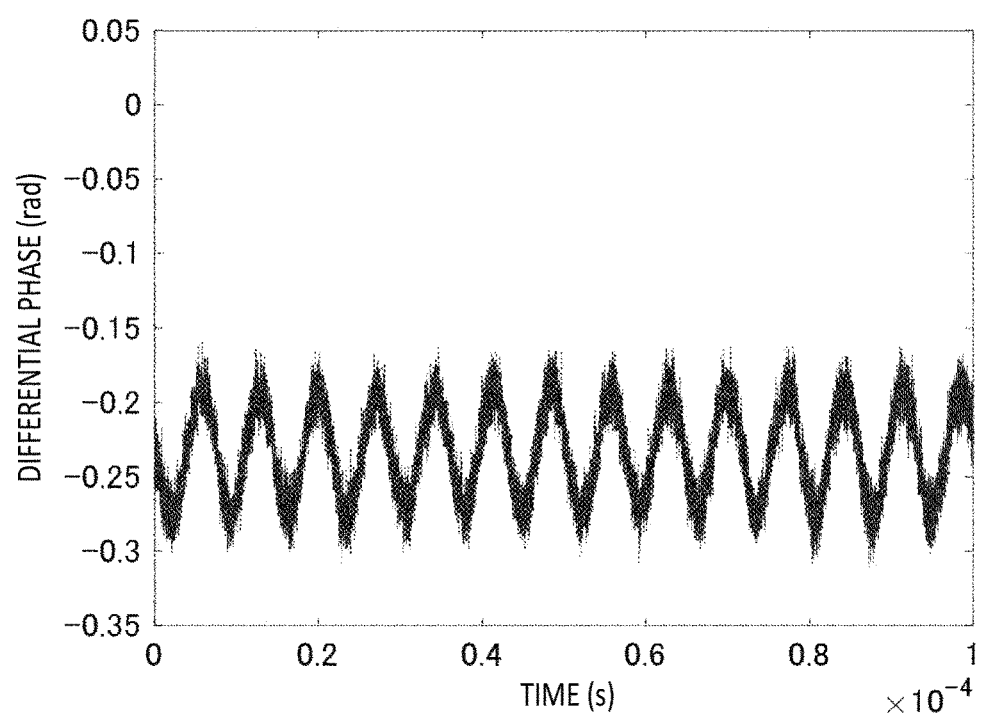
FIG. 25 shows time variation of the differential phase in Experimental Example 1.
Figure 26:
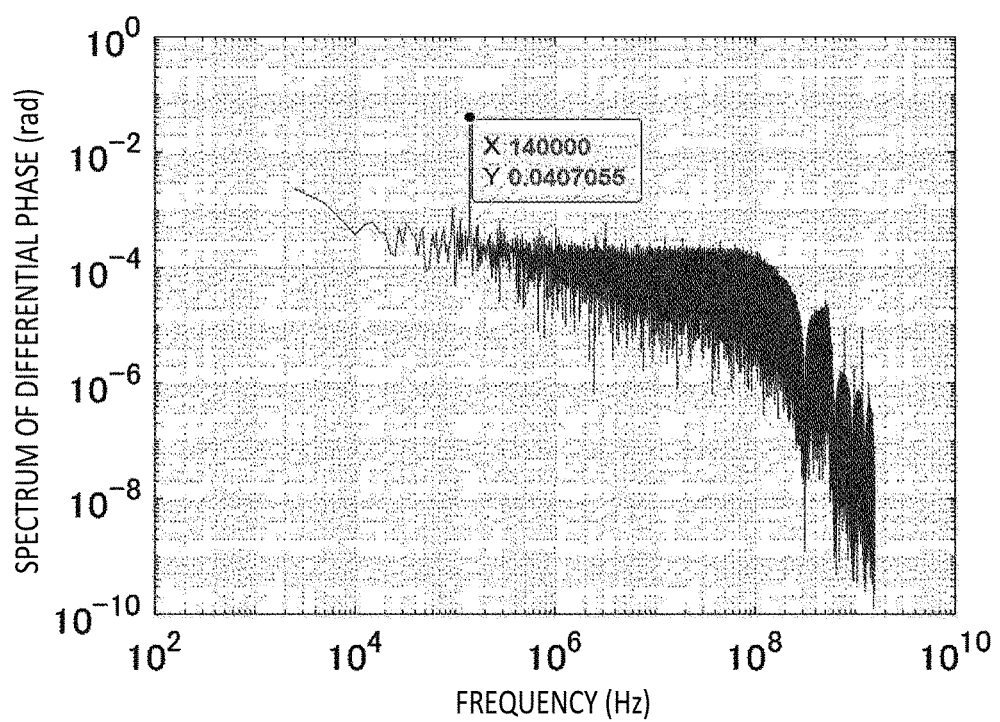
FIG. 26 shows a frequency spectrum of the differential phase in Experimental Example 1.

FIG. 24 shows a histogram of the output of the balanced optical receiver when the magnitude of the voltage applied to the fiber stretcher is 1 V. FIG. 25 shows time variation of the output of the balanced optical receiver when the magnitude of the voltage applied to the fiber stretcher is 1 V. FIG.

26 shows a frequency spectrum of the output of the balanced optical receiver when the magnitude of the voltage applied to the fiber stretcher is 1 V.

As shown in FIG. 24, the histogram is divided into two, and it can be seen that the phase variation occurs. As shown in FIG. 25, the rising and falling of the variation are steep, and it can be seen that the integration effect by the low-pass filter of the balanced optical receiver appears. As described above, when the integration effect appears, it is estimated that the phase variation is directly measured. Note that although the cause of the steep variation is not clear, it is estimated that mechanical vibration cannot follow a sinusoidal input voltage, and the steep variation locally occurs.

As described above, in FIG. 26, the magnitude of the variation was derived by measuring the frequency component at 140 kHz. In addition, the peak-peak value of the frequency component at 140 kHz was measured to derive a phase shift amount. As a result, the applied voltage of the fiber stretcher was substantially proportional to the measurement result of the phase shift amount. As described in Non-Patent Document 15, there is a proportional relationship between the applied voltage of the fiber stretcher and the values of the lateral pressure and birefringence caused by the operation of the fiber stretcher, and thus, the result of Experimental Example 1 indicates that the above-described measurement principle functions.

(Evaluation)

The measurement result obtained by using the state-of-polarization measuring instrument (may be referred to as a polarization measuring instrument) was compared with the measurement result obtained by using the optical delay interferometer. As a result, the measurement result obtained by using the optical delay interferometer closely matched the measurement result obtained by using the state-of-polarization measuring instrument. For example, when the magnitude (peak-peak value) of the voltage applied to the fiber stretcher was 2 V, the coordinates of both ends of the movement of the trajectory on the Poincare sphere measured by the polarization measuring instrument were (0.31, 0.94, −0.15) and (0.17, 0.98, −0.06). In this case, the p-p value of the phase change amount was 0.17 rad. On the other hand, according to the measurement result obtained by using the optical delay interferometer, the p-p value of the 140 kHz component in the spectrum measurement result is 0.16 rad.

Accordingly, it was possible to confirm that the approximate value of the movement angle of the trajectory on the Poincare sphere can be measured by using the optical delay interferometer. In addition, the effectiveness of the detection principle of the movement variation caused by the polarization fluctuation described above was confirmed.

Comparative Experimental Example 1

(Measurement Using State-of-Polarization Measuring Instrument)

The Stokes parameter of the fiber stretcher output light was measured in a procedure similar to that of Experimental Example 1 except that the magnitude (peak-peak value) of the voltage applied to the fiber stretcher was set to 200 mV. In addition, the movement angle of the trajectory on the Poincare sphere was derived by using the measurement result of the Stokes parameter.

Figure 27:
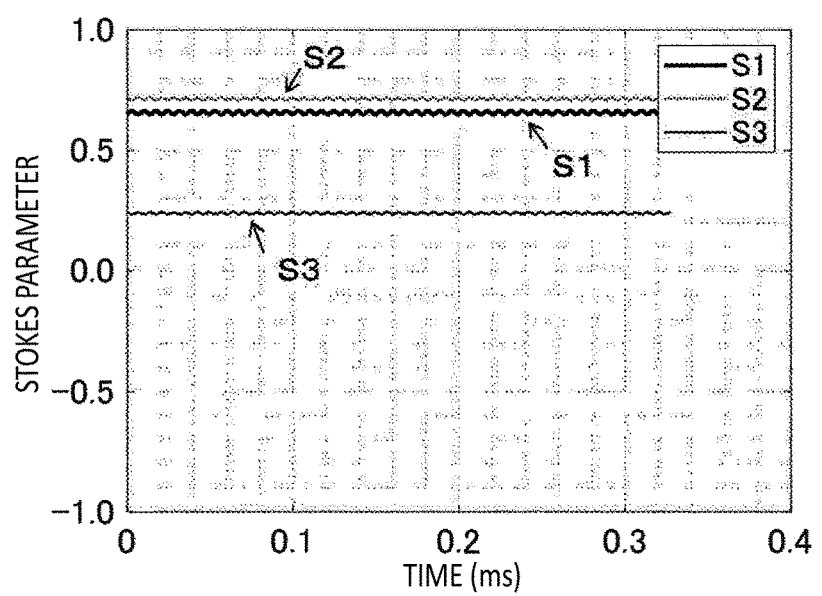
FIG. 27 shows measurement results of the Stokes parameters in Comparative Experimental Example 1.

FIG. 27 shows a measurement result of the Stokes parameter when the magnitude of the voltage applied to the fiber stretcher is 200 mV. As shown in FIG. 27, it was confirmed that minute polarization fluctuation occurred at a frequency of 140 kHz. In addition, when the situation of the polarization fluctuation on the Poincare sphere was confirmed by using the measurement result of the Stokes parameter, minute polarization fluctuation was confirmed on the Poincare sphere.

(Measurement Using Optical Delay Interferometer)

(a) A histogram regarding the magnitude of the differential phase and (b) a graph showing the time variation of the magnitude of the differential phase were created in a procedure similar to that of Experimental Example 1 except that the magnitude (peak-peak value) of the voltage applied to the fiber stretcher was set to 200 mV. In addition, (c) a frequency spectrum of the differential phase was derived.

Figure 28:
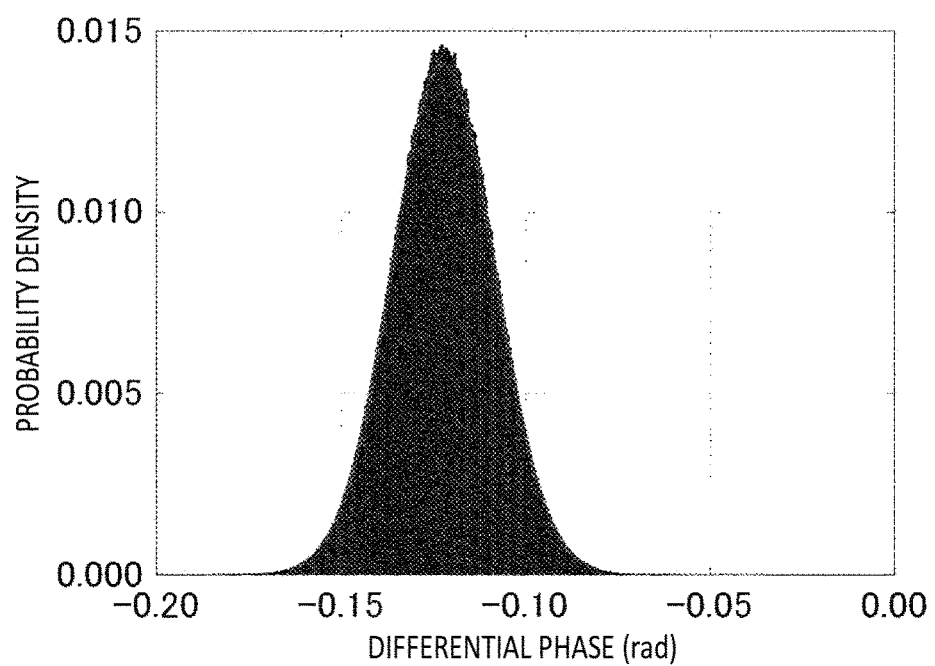
FIG. 28 shows a histogram of the differential phase in Comparative Experimental Example 1.
Figure 29:
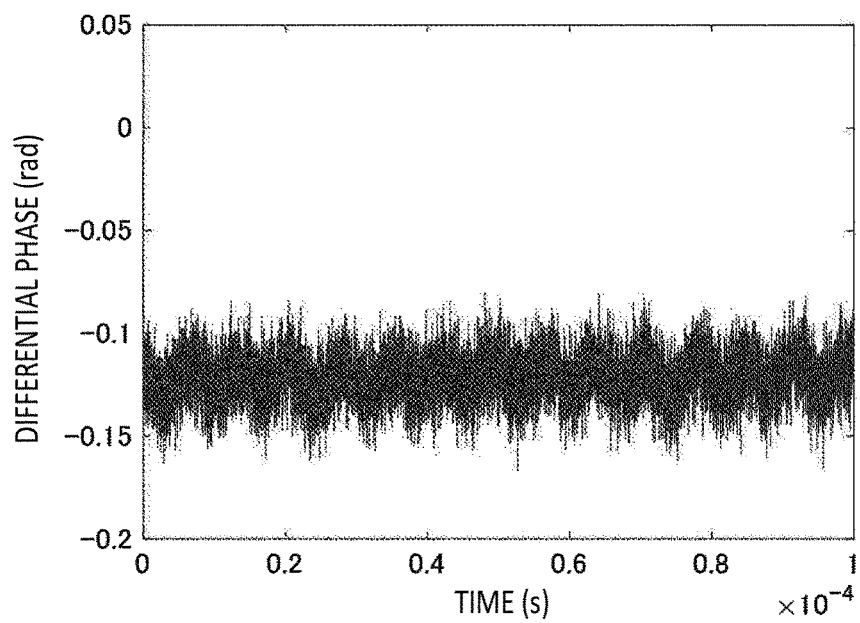
FIG. 29 shows time variation of the differential phase in Comparative Experimental Example 1.
Figure 30:
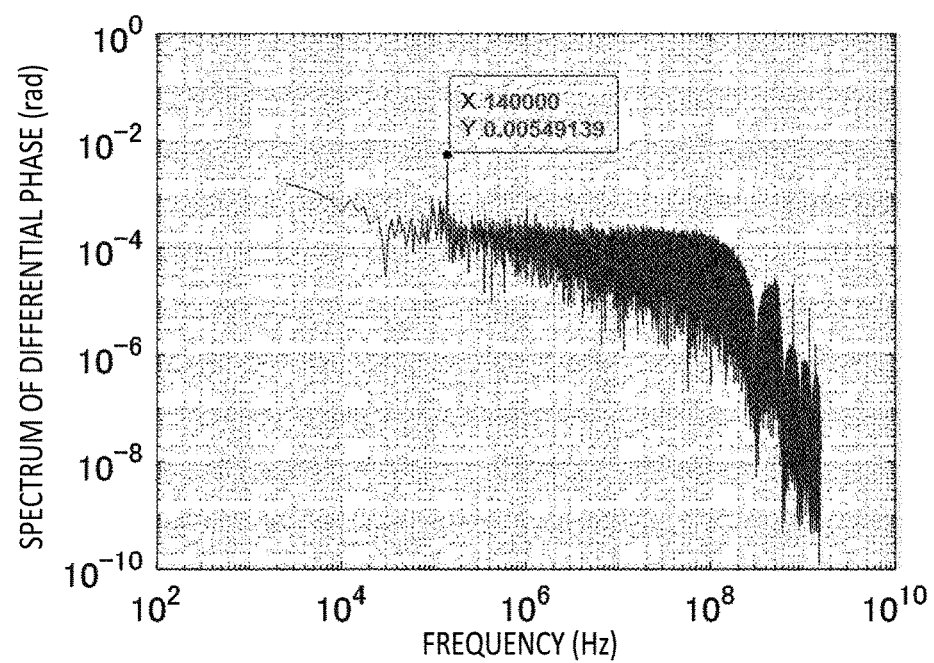
FIG. 30 shows a frequency spectrum of the differential phase in Comparative Experimental Example 1.

FIG. 28 shows a histogram of the output of the balanced optical receiver when the magnitude of the voltage applied to the fiber stretcher is 200 mV. FIG. 29 shows time variation of the output of the balanced optical receiver when the magnitude of the voltage applied to the fiber stretcher is 200 mV. FIG. 30 shows a frequency spectrum of the output of the balanced optical receiver when the magnitude of the voltage applied to the fiber stretcher is 200 mV.

As shown in FIG. 28, only the phase noise is observed in the histogram. On the other hand, according to FIGS. 29 and 30, it can be seen that minute phase variation of 140 kHz, which cannot be read from FIG. 28, occurs. Accordingly, it has been confirmed that the statistical processing makes it difficult to read high-speed variation which actually exists.

Experimental Example 2

(Measurement Using State-of-Polarization Measuring Instrument)

First, one end of the optical fiber was connected to a laser light oscillation device (model number PPCL550 manufactured by Pure Photonics). The other end of the optical fiber was connected to a polarization scrambler (NRT-2500 manufactured by Luna Innovations). The output end of the polarization scrambler was connected to a state-of-polarization measuring instrument (PM1000 Polarimeter manufactured by Novoptel).

Laser light with a wavelength of 1550 nm was emitted from the laser light oscillation device, and a high-speed polarization fluctuation was caused to occur by using Spinner Mode of the polarization scrambler. The polarization fluctuation frequency of the polarization scrambler was set to 75 kHz. This corresponds to a movement angular velocity of about 470 krad/s on the Poincare sphere.

The Stokes parameter of the polarization fluctuation light output from the polarization scrambler was measured by using the state-of-polarization measuring instrument. In addition, the movement angle of the trajectory on the Poincare sphere was derived by using the measurement result of the Stokes parameter.

Figure 31:
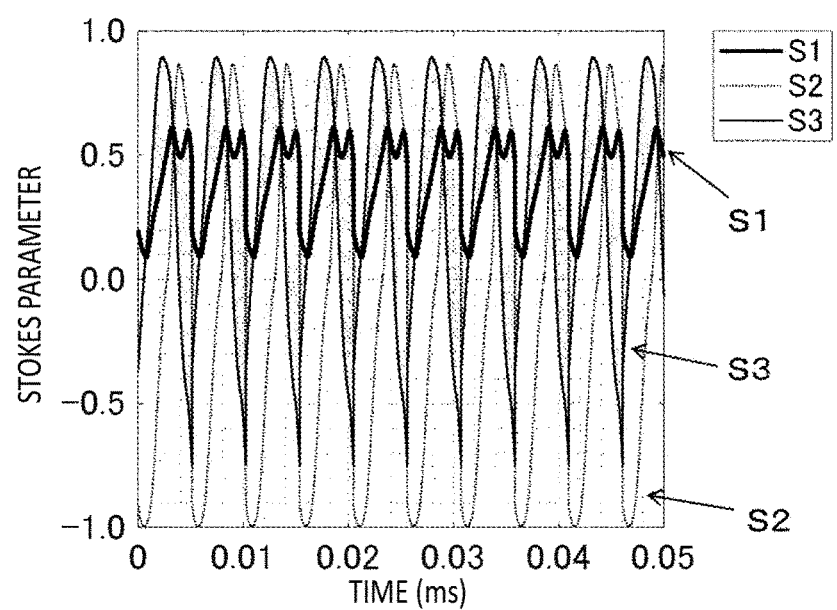
FIG. 31 shows measurement results of the Stokes parameters in Experimental Example 2.

FIG. 31 shows measurement results of the Stokes parameters in Experimental Example 2. As shown in FIG. 31, the occurrence of significantly large and high-speed polarization fluctuation was confirmed in accordance with the specifications of the polarization scrambler. In addition, when the situation of the polarization fluctuation on the Poincare sphere was confirmed by using the measurement result of the Stokes parameter, it was confirmed that a trajectory close to a large circle having the largest radius is drawn on the Poincare sphere.

(Measurement Using Optical Delay Interferometer)

Next, the output end of the polarization scrambler was disconnected from the state-of-polarization measuring instrument, and the output end of the polarization scrambler was connected to one end of an optical delay interferometer (DI-C1EFAM512 manufactured by Optoplex). The other end of the optical delay interferometer was connected to the balanced optical receiver (BR-C0200B1DC manufactured by Optoplex) mounted with a low-pass filter function. The AD converter (Oscilloscope MSO64 manufactured by Tektronix) was used to sample the output of the balanced optical receiver.

Laser light with a wavelength of 1550 nm was emitted from the laser light oscillation device, and a high-speed polarization fluctuation was caused to occur by using Spinner Mode of the polarization scrambler. The polarization fluctuation frequency of the polarization scrambler was set to 75 kHz. The measurement result of the sampled output of the balanced optical receiver was used to create (a) a histogram regarding the magnitude of the differential phase and (b) a graph showing the time variation of the magnitude of the differential phase. The measurement result of the sampled output of the balanced optical receiver is subjected to fast Fourier transform to derive (c) a frequency spectrum of the differential phase.

Figure 32:
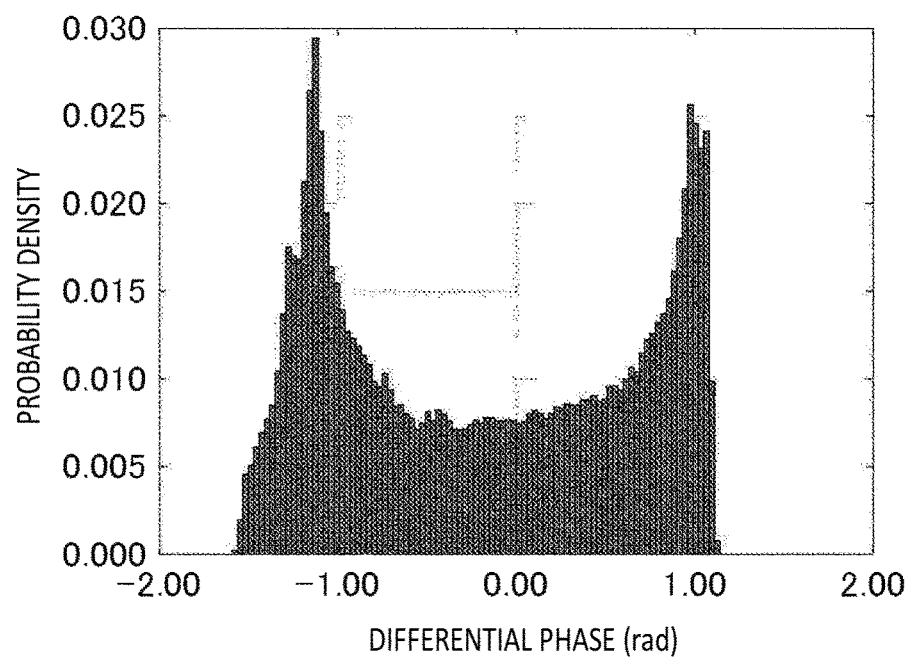
FIG. 32 shows a histogram of the differential phase in Experimental Example 2.
Figure 33:
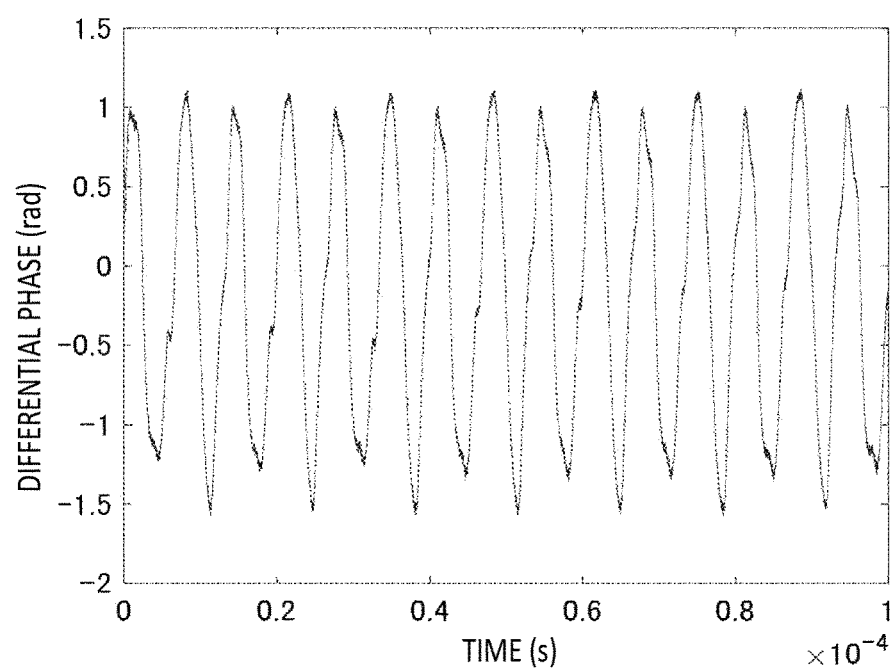
FIG. 33 shows time variation of the differential phase in Experimental Example 2.
Figure 34:
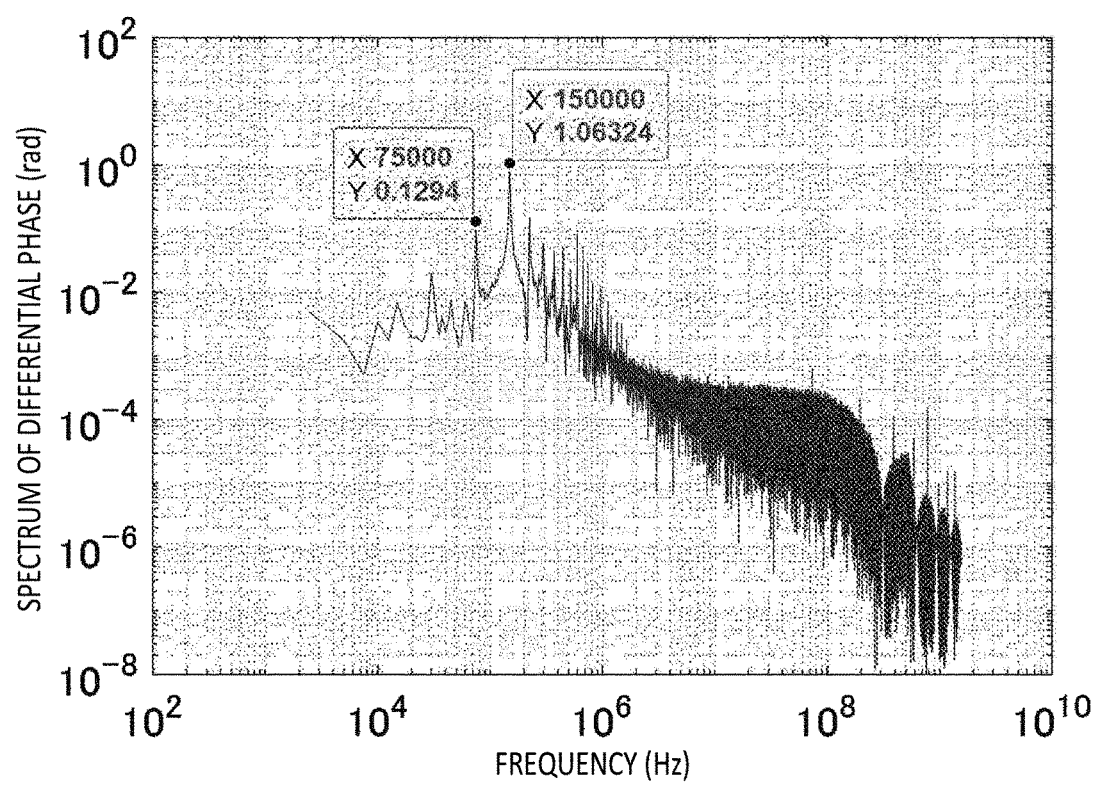
FIG. 34 shows a frequency spectrum of the differential phase in Experimental Example 2.

FIG. 32 shows a histogram of outputs of the balanced optical receiver in Experimental Example 2. FIG. 33 shows time variation of an output of the balanced optical receiver in Experimental Example 2. FIG. 34 shows a frequency spectrum of the output of the balanced optical receiver in Experimental Example 2. All the results of FIGS. 32, 33, and 34 indicate that large polarization fluctuation occurs.

As shown in FIG. 33, the rising and falling of the variation are steep, and it can be seen that the integration effect by the low-pass filter of the balanced optical receiver appears. As described above, when the integration effect appears, it is estimated that the phase variation is directly measured. Note that the polarization scrambler NRT-2500 causes polarization fluctuation to occur by rotating the ½ wavelength plate at a high speed. It is estimated that at the moment when the principal axis of the ½ wavelength plate crosses the principal axis of the orthogonal polarization mode, phase variation due to the ½ wavelength plate occurs, and as a result, steep variation occurs.

As shown in FIG. 34, a 150 kHz component is measured as a main frequency component. In this regard, 75 kHz which is the nominal value of the polarization scrambler NRT-2500 is the frequency of polarization rotation. The phase change accompanying the rotation of the ½ wavelength plate changes at a frequency twice the polarization rotation. Therefore, it is estimated that frequency components of 75 kHz and 150 kHz were observed.

Accordingly, it was possible to confirm that even when large polarization fluctuation occurs, the approximate value of the movement angle of the trajectory on the Poincare sphere can be measured by using the optical delay interferometer. The effectiveness of the detection principle of the movement variation caused by the polarization fluctuation described above was confirmed.

(Application of Evaluation Information Regarding Polarization Fluctuation to Control of Communication System)

In the embodiments described with reference to FIGS. 16 to 21, the details of the communication system 1600 have been described by taking, as an example, a case where the state monitoring device 1680 outputs, as an alarm or a flag, the evaluation information regarding the polarization fluctuation. However, the use mode of the evaluation information regarding the polarization fluctuation is not limited to the above-described embodiments. In another embodiment, the evaluation information regarding the polarization fluctuation can be used to control the communication system. An example of the embodiment in which the evaluation information regarding the polarization fluctuation is used to control the communication system will be described with reference to FIGS. 35, 36, 37, 38, 39, and 40.

The present inventor has focused on the fact that the state monitoring device 1680 detects a rapid polarization fluctuation in an optical region, and has conceived of using the evaluation information regarding the polarization fluctuation for control of signal processing in an electrical region (may be referred to as an electric signal region). For example, an optical signal reception device of a digital coherent optical communication system uses a digital signal processor (may be referred to as DSP) to execute various types of signal processing such as (i) processing for equalizing chromatic dispersion, (ii) processing for polarization separation and/or compensating for polarization mode dispersion, (iii) processing for estimating a carrier phase, and (iv) processing for decoding an information signal.

The characteristics of the optical transmission line 10 are decided by chromatic dispersion, birefringence, polarization mode dispersion, and the like in the optical transmission line 10. In addition, the characteristics of the optical transmission line 10 can be described by using a propagation matrix H. The optical signal reception device of the digital coherent optical communication system can substantially completely extract information regarding a complex amplitude of an optical signal. Therefore, the optical signal reception device of the digital coherent optical communication system can compensate for the group velocity dispersion of the optical transmission line. Specifically, in (i) the above-described processing for equalizing the chromatic dispersion and (ii) the above-described processing for the polarization separation and/or compensating for the polarization mode dispersion, various effects generated while the signal light propagates through the optical transmission line 10 are compensated by using an inverse matrix H-1 of the propagation matrix H.

In an embodiment, the propagation matrix H is expressed as a product of a first matrix indicating the effect of chromatic dispersion and a second matrix indicating the effect of birefringence and/or polarization mode dispersion. In another embodiment, the propagation matrix H is expressed as a product of a first matrix indicating the effect of chromatic dispersion, a second matrix indicating the effect of birefringence, and a third matrix indicating the effect of polarization mode dispersion. In still another embodiment, the propagation matrix H is expressed as a single matrix for collectively expressing the effect of chromatic dispersion and the effect of birefringence and/or polarization mode dispersion.

Compensation processing using an inverse matrix H-1 is implemented by using, for example, a finite impulse response filter (may be referred to as an FIR filter) in the electrical region. As the FIR filter, any known FIR filter can be adopted. As the FIR filter, the FIR filter disclosed in Non-Patent Document 16 may be used. In an embodiment, the FIR filter includes a first FIR filter corresponding to the first matrix described above and a second FIR filter corresponding to the second matrix described above. In another embodiment, the FIR filter includes a first FIR filter corresponding to the first matrix described above, a second FIR filter corresponding to the second matrix described above, and a third FIR filter corresponding to the third matrix described above. In another embodiment, the FIR filter includes a single FIR filter corresponding to a single matrix for collectively expressing the effect of chromatic dispersion and the effect of birefringence/polarization mode dispersion described above.

Since the polarization state of the optical transmission line 10 changes from moment to moment, in the optical signal reception device of the digital coherent optical communication system, the tap coefficient of the FIR filter is updated at predetermined time intervals based on the oversampling ratio of the AD conversion. In many cases, the oversampling ratio is set to 2. Accordingly, the tap coefficient is updated at a frequency twice the symbol rate, and thus the data can be stably demodulated even when a rapid polarization fluctuation occurs.

Various algorithms for updating the above-described tap coefficient have been proposed. Examples of the above-described algorithm include a constant-modulus algorithm (CMA). Since the above-described various algorithms for updating the tap coefficient include a step of executing multiplication of complex numbers, updating the tap coefficient requires a large amount of power.

Non-Patent Document 17 discloses that downsampling is executed and the tap coefficient is updated at the same frequency as the symbol rate for the purpose of reducing the power consumption in the DSP. According to the technology disclosed in Non-Patent Document 17, the update frequency of the tap coefficient is set to be about the same as the symbol rate by using the fact that the phase rotation occurring in one symbol time is extremely small.

In the existing FIR filter, once the update frequency of the tap coefficient is decided, the update frequency cannot be changed. Therefore, in the existing DSP, the tap coefficient is constantly updated at a high frequency so as to be able to cope with the rapid polarization fluctuation. As described above, although the update processing of the tap coefficient consumes a large amount of power, the rapid polarization fluctuation is often about several times a day.

The present inventor has focused on the fact that the rapid polarization fluctuation can be detected in the optical region before the rapid polarization fluctuation occurs in the electrical region, and has conceived of reducing unnecessary power consumption in the control of the FIR filter. A control method of the above-described FIR filter includes, for example, receiving a detection signal that is a signal indicating a detection result of a detection device that optically detects polarization fluctuation in an optical transmission line, and setting by deciding, based on the detection result of the detection device, a setting regarding an update frequency or an update interval of the number of taps of the FIR filter or an update frequency or an update interval of a tap coefficient of the FIR filter.

More specifically, for example, the present inventor has conceived that when no rapid polarization fluctuation is detected in the optical region, the update frequency of the tap coefficient of the FIR filter is set to a relatively small value, and when the rapid polarization fluctuation is detected in the optical region, the update frequency of the tap coefficient of the FIR filter is increased before the rapid polarization fluctuation occurs in the electrical region. Accordingly, for example, when no rapid polarization fluctuation is detected in the optical region, the update frequency of the tap coefficient of the FIR filter can be set to a value smaller than the symbol rate, for example. The above-described update frequency may be ½ or less of the symbol rate, 1/5 or less of the symbol rate, 1/10 or less of the symbol rate, 1/20 or less of the symbol rate, 1/50 or less of the symbol rate, or 1/100 or less of the symbol rate.

As described above, since the rapid polarization fluctuation occurs several times a day, the power consumption in the DSP is significantly reduced by the above-described processing. In addition, the number of taps or the tap coefficient of the FIR filter is updated at a high frequency during a period in which the rapid polarization fluctuation occurs in the electrical region. Accordingly, data can be stably demodulated.

Similarly, for example, the present inventor has conceived that when no rapid polarization fluctuation is detected in the optical region, the update frequency of the number of taps of the FIR filter to set to a relatively small value, and when the rapid polarization fluctuation is detected in the optical region, the update frequency of the number of taps of the FIR filter is increased before the rapid polarization fluctuation occurs in the electrical region. Accordingly, for example, when no rapid polarization fluctuation is detected in the optical region, the update frequency of the number of taps of the FIR filter can be set to a value smaller than the symbol rate, for example. The above-described update frequency may be ½ or less of the symbol rate, 1/5 or less of the symbol rate, 1/10 or less of the symbol rate, 1/20 or less of the symbol rate, 1/50 or less of the symbol rate, or 1/100 or less of the symbol rate.

According to an embodiment, the update processing of the number of taps includes a procedure of increasing or decreasing the number of taps itself. According to another embodiment, the update processing of the number of taps includes a procedure of substantially decreasing the number of taps by setting some of the tap coefficients to 0. The update processing of the number of taps may include a procedure of substantially increasing the number of taps by changing some of the tap coefficients from 0 to a positive number other than 0.

In the control of the existing FIR filter, the number of taps is fixed. However, according to the above-described processing, for example, when no rapid polarization fluctuation is detected in the optical region, the number of taps of the FIR filter is set to a relatively small value. In addition, the number of taps is updated at a relatively small update frequency. On the other hand, when the rapid polarization fluctuation is detected in the optical region, the number of taps of the FIR filter is set to a relatively large value before the rapid polarization fluctuation occurs in the electrical region. In addition, the number of taps is updated at a relatively large update frequency. Accordingly, the power consumption in the DSP is significantly reduced. In addition, data can be stably demodulated.

(Outline of Communication System 3500)

Figure 35:
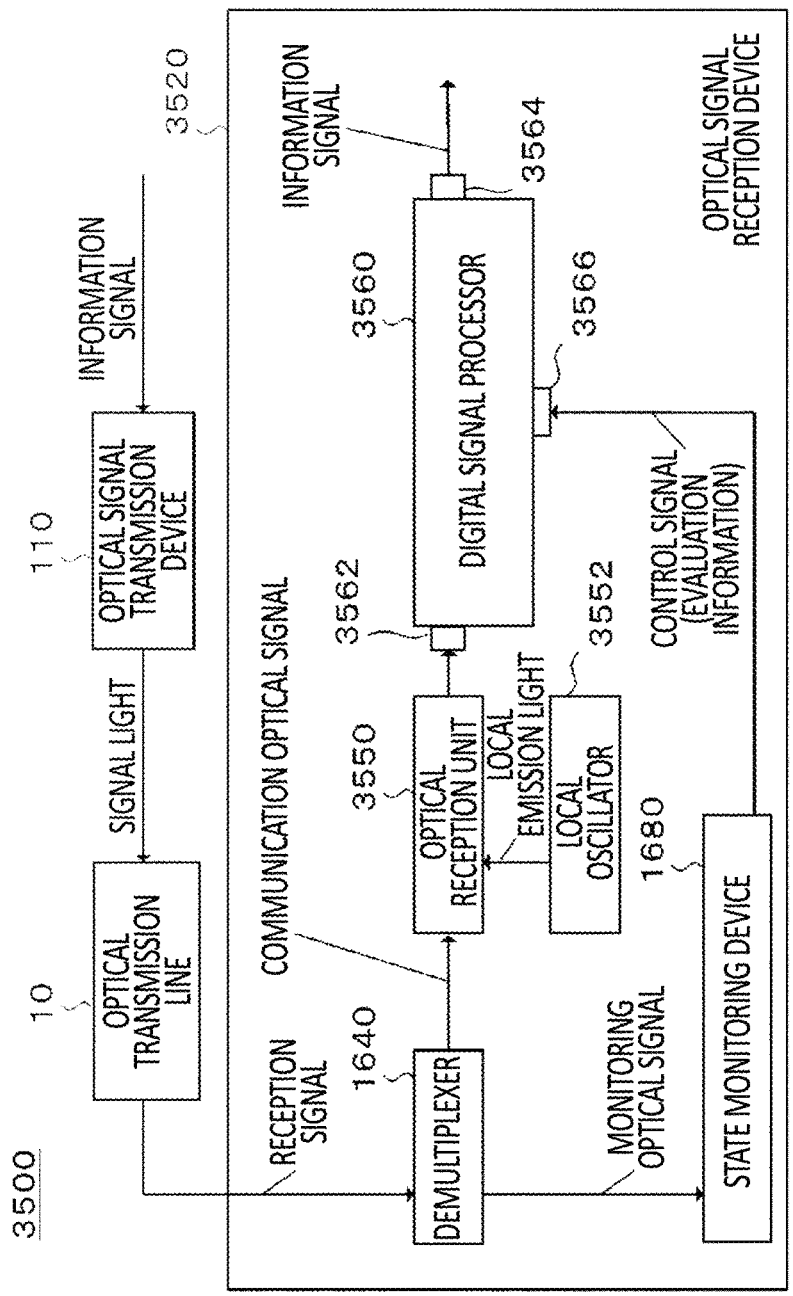
FIG. 35 schematically shows an example of a system configuration of a communication system 3500.

FIG. 35 schematically shows an example of a system configuration of the communication system 3500. The communication system 3500 may have a configuration similar to those of the communication system 100 and/or the communication system 1600 to the extent that they are not technically inconsistent. In addition, description of the configuration similar to those of the communication system 100 and/or the communication system 1600 may be omitted.

In the present embodiment, for example, the communication system 3500 includes the optical signal transmission device 110 and an optical signal reception device 3520. In the present embodiment, the details of the communication system 3500 will be described by taking, as an example, a case where information signals are transmitted by the output signal light of the optical signal transmission device 110 propagating through the optical transmission line 10 to reach the optical signal reception device 3520.

In the present embodiment, the optical signal reception device 3520 includes the demultiplexer 1640, an optical reception unit 3550, a local oscillator 3552, a digital signal processor 3560, and the state monitoring device 1680. In the present embodiment, the digital signal processor 3560 includes a signal input terminal 3562, a signal output terminal 3564, and a control input terminal 3566.

In the present embodiment, when the signal light includes a plurality of optical signals having different wavelengths, the demultiplexer 1640 demultiplexes the plurality of optical signals for each wavelength. For example, the optical signal (may be referred to as a reception signal) received in the optical signal reception device 1620 includes light of a first wavelength (may be referred to as a communication optical signal) to be used for transmission of an information signal and light of a second wavelength (may be referred to as a monitoring optical signal(s)) to be used for detection of polarization fluctuation. The value of the first wavelength is different from the value of the second wavelength. The monitoring optical signal may be unmodulated. In the present embodiment, the demultiplexer 1640 outputs the communication optical signal to the optical reception unit 3550. The demultiplexer 1640 outputs the monitoring optical signal to the state monitoring device 1680.

In the present embodiment, the state monitoring device 1680 analyzes light input to the state monitoring device 1680 (may be referred to as input light) and monitors the state of the optical transmission line 10 and/or the state of the signal light having propagated through the optical transmission line 10. For example, the state monitoring device 1680 analyzes the phase variation of the input light and evaluates at least one of (i) the presence or absence and/or degree of phase noise or (ii) the presence or absence and/or degree of polarization fluctuation. Accordingly, the state monitoring device 1680 can detect, for example, the polarization fluctuation of the signal light having propagated through the optical transmission line 10.

In the present embodiment, the state monitoring device 1680 generates a signal (may be referred to as a control signal) for controlling the operation of the digital signal processor 3560, based on the above-described evaluation result or detection result regarding the polarization fluctuation. The control signal includes, for example, information indicating the presence or absence and/or degree of polarization fluctuation. The degree of polarization fluctuation may be referred to as a fluctuation amount of the polarization fluctuation.

As described above, the state monitoring device 1680 outputs the evaluation information regarding the polarization fluctuation. The above-described evaluation information indicates, for example, the detection result of the state monitoring device 1680. Examples of the evaluation information regarding the polarization fluctuation include information indicating that the polarization fluctuation is detected, information indicating that the polarization fluctuation has occurred, information indicating that the movement angular velocity has exceeded a prescribed angular velocity, information indicating that the movement angle has exceeded a prescribed angle, information indicating that the variation frequency has exceeded a prescribed frequency, information indicating the fluctuation amount of the polarization fluctuation, information indicating the absolute value of the fluctuation amount of the polarization fluctuation, and the like.

The information indicating that the polarization fluctuation is detected may be information indicating that the polarization fluctuation exceeding a predetermined degree is detected. The information indicating that the polarization fluctuation occurs may be information indicating that the polarization fluctuation exceeding a predetermined degree occurs. As described above, the variation amount of the movement angle of the trajectory on the Poincare sphere can be used as the fluctuation amount of the polarization fluctuation.

In the present embodiment, the optical reception unit 3550 converts an optical signal into an electric signal. In the present embodiment, the optical reception unit 3550 includes, for example, an optical 90-degree hybrid and an optical receiver. Details of the optical reception unit 3550 will be described later.

In the present embodiment, the local oscillator 3552 outputs local emission light. The local emission light output from the local oscillator 3552 is input to the optical 90-degree hybrid of the optical reception unit 3550. The local oscillator 3552 may have a configuration similar to that of the local oscillator 130.

In the present embodiment, the digital signal processor 3560 executes various types of signal processing in the electrical region and demodulates a reception signal transmitted by signal light. Accordingly, an information signal is generated.

For example, the digital signal processor 3560 compensates for the polarization mode dispersion of the signal light having propagated through the optical transmission line 10. The digital signal processor 3560 compensates for the above-described polarization mode dispersion by, for example, digital signal processing using a finite impulse response filter. The digital signal processor 3560 may control the operation of the finite impulse response filter. Details of the digital signal processor 3560 will be described later.

In the present embodiment, a signal to be subjected to signal processing in the digital signal processor 3560 is input to the signal input terminal 3562. Specifically, the electric signal output by the optical reception unit 3550 is input to the signal input terminal 3562. In the present embodiment, the signal output terminal 3564 outputs the information signal generated by the digital signal processor 3560. In the present embodiment, the evaluation information output from the state monitoring device 1680 is input to the control input terminal 3566. The evaluation information functions as, for example, a control signal for controlling the update frequency or the update interval of the number of taps of the finite impulse response filter or the update frequency or the update interval of the tap coefficient of the finite impulse response filter described above.

The optical signal transmission device 110 may be an example of an optical transmission device. The state monitoring device 1680 may be an example of the detection device. The evaluation information of the state monitoring device 1680 may be an example of the detection signal. The communication system 3500 may be an example of an optical communication system. The optical signal reception device 3520 may be an example of an optical reception device, a compensation device, or a control device. The digital signal processor 3560 may be an example of the compensation device or the control device. The control input terminal 3566 may be an example of a control signal input terminal.

Example of Another Embodiment

In the present embodiment, for the purpose of facilitating understanding of the communication system 3500, the details of the communication system 3500 have been described by taking, as an example, a case where the reception signal includes a single communication optical signal and a single monitoring optical signal. However, the communication system 3500 is not limited to the present embodiment. For example, various multiplexing technologies are known in the field of optical communication. In this regard, according to another embodiment, various multiplexing technologies can be applied to the above-described communication system 3500.

For example, when the optical wavelength multiplexing technology is applied to the communication system 3500, the reception signal includes one or a plurality of (may be referred to as one or more) communication optical signals. The plurality of communication optical signals are propagated by signal light having different wavelengths. Similarly, the reception signal may include one or more monitoring optical signals. The plurality of monitoring optical signals are propagated by signal light having different wavelengths.

When the reception signal includes a plurality of communication optical signals, the communication system 3500 may include the same number of optical reception units 3550 and digital signal processors 3560 as the number of the communication optical signals. When the reception signal includes a plurality of monitoring optical signals, the communication system 3500 may include the same number of the state monitoring devices 1680 as the number of the monitoring optical signals.

For example, when the reception signal includes a plurality of communication optical signals and a single monitoring optical signal, the evaluation information output by the single state monitoring device 1680 is used as a control signal for controlling the operation of a plurality of digital signal processors 3560. Accordingly, the operation of the plurality of digital signal processors 3560 can be controlled by a single control signal.

Figure 36:
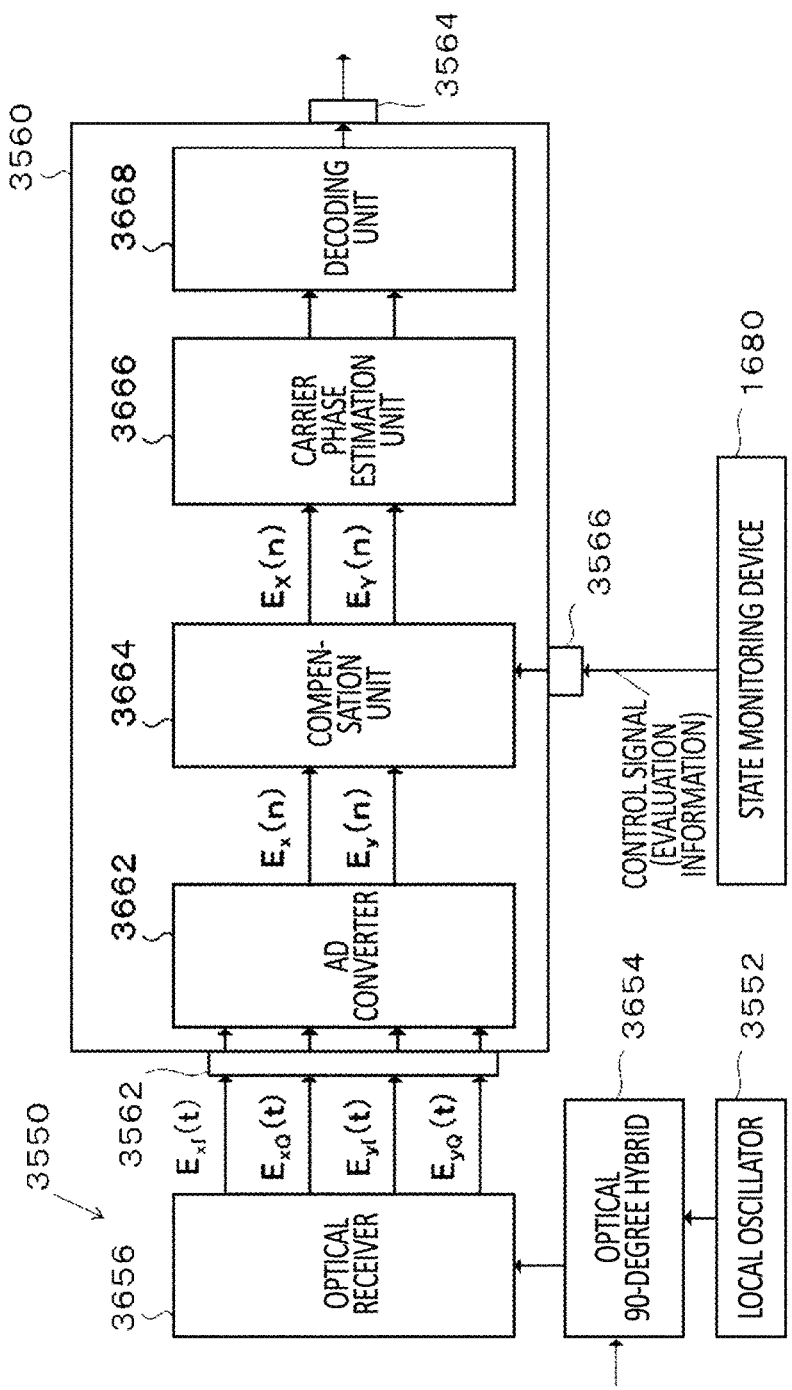
FIG. 36 schematically shows an example of an internal configuration of a digital signal processor 3560.

FIG. 36 schematically shows an example of internal configurations of the optical reception unit 3550 and the digital signal processor 3560. In the present embodiment, the optical reception unit 3550 includes an optical 90-degree hybrid 3654 and an optical receiver 3656. The optical receiver 3656 may have a plurality of optical receivers (for example, four optical reception elements). In the present embodiment, the digital signal processor 3560 includes an AD converter 3662, a compensation unit 3664, a carrier phase estimation unit 3666, and a decoding unit 3668. The AD converter 3662 may have a plurality of AD converters (for example, four AD conversion elements).

The optical 90-degree hybrid 3654 may have a configuration similar to that of the optical 90-degree hybrid 140. The optical receiver 3656 may have a configuration similar to that of the optical receiver 152 or the optical receiver 154. The AD converter 3662 may have a configuration similar to that of the AD converter 162 or the AD converter 164. The compensation unit 3664, the carrier phase estimation unit 3666, and the decoding unit 3668 may have configurations similar to that of the signal processing unit 170 or the signal processing unit 1670. The compensation unit 3664 and the carrier phase estimation unit 3666 may have configurations similar to that of the digital signal processing circuit 210. The decoding unit 3668 may have a configuration similar to that of the decoding circuit 220.

In the present embodiment, the optical 90-degree hybrid 3654 causes signal light having propagated through the optical transmission line 10 to interfere with the local emission light from the local oscillator 130, and outputs a plurality of optical signals in which the reception signal transmitted by the signal light is separated into a plurality of signal components. In the present embodiment, the optical receiver 3656 converts each of the plurality of optical signals output from the optical 90-degree hybrid 3654 into an electric signal. The optical receiver 3656 outputs the electric signal corresponding to each of the plurality of optical signals output from the optical 90-degree hybrid 3654.

Accordingly, an electric signal $E_{xI}$ (t) corresponding to the in-phase component (may be referred to as an I component) of the x-polarized component of the communication optical signal, an electric signal $E_{xQ}$ (t) corresponding to the orthogonal component (may be referred to as a 90-degree phase component, a Q component, or the like) of the x-polarized component of the communication optical signal, an electric signal $E_{yI}$ (t) corresponding to the in-phase component (may be referred to as an I component) of the y-polarized component, and an electric signal $E_{yQ}$ (t) corresponding to the orthogonal component (may be referred to as a 90-degree phase component or a Q component) of the y-polarized component are obtained. Each electric signal is input to the AD converter 3662 via the signal input terminal 3562 of the digital signal processor 3560.

In the present embodiment, the AD converter 3662 converts the electric signal from an analog signal to a digital signal. The AD converter 3662 samples the analog signal corresponding to each of the above-described components at a predetermined sampling frequency. Accordingly, the analog signal corresponding to each of the above-described components is converted into a complex digital signal. In FIG. 36, the x component and the y component of the n-th signal converted into the digital signal are expressed as $E_x(n)$ and $E_y(n)$, respectively.

In the present embodiment, the compensation unit 3664 compensates for the birefringence and/or the polarization mode dispersion received by the signal light having propagated through the optical transmission line 10 (may be referred to as the birefringence and/or the polarization mode dispersion of the signal light). The compensation unit 3664 compensates for the birefringence and/or the polarization mode dispersion of the signal light and performs polarization separation. The compensation unit 3664 compensates for the birefringence and/or the polarization mode dispersion of the signal light, for example, by digital signal processing using a finite impulse response filter, and performs polarization separation. Accordingly, the orthogonal polarization is restored.

In the present embodiment, the compensation unit 3664 controls the operation of the finite impulse response filter based on the evaluation information input to the control input terminal 3566. Accordingly, the power consumption of the compensation unit 3664 can be significantly reduced. In the present embodiment, the details of the compensation unit 3664 will be exemplified by taking, as an example, a case where the complex digital signals $E_x$ (n) and $E_y$ (n) output from the AD converter 3662 are input to the compensation unit 3664, and the compensation unit 3664 outputs restoration signals $E_X$ (n) and $E_Y$(n) in which the birefringence and/or the polarization mode dispersion is compensated for. $E_X(n)$ is the x component of the n-th restoration signal obtained by the polarization separation, and $E_Y$ (n) is the y component of the n-th restoration signal obtained by the polarization separation. Details of the compensation unit 3664 will be described later.

In the present embodiment, the carrier phase estimation unit 3666 has a function of estimating a phase of an optical carrier wave. Accordingly, the phase of the optical carrier wave required by the decoding unit 3668 is restored.

In the present embodiment, the decoding unit 3668 executes error correction processing, decoding processing, and the like. Accordingly, the information signal is extracted from the reception signal. The decoding unit 3668 outputs the decoded information signal to the signal output terminal 3564.

Example of Another Embodiment

In the present embodiment, the details of the digital signal processor 3560 have been described by taking, as an example, a case where the digital signal processor 3560 includes the AD converter 3662. However, the digital signal processor 3560 is not limited to the present embodiment. In another embodiment, the AD converter 3662 may be arranged outside the digital signal processor 3560.

Figure 37:
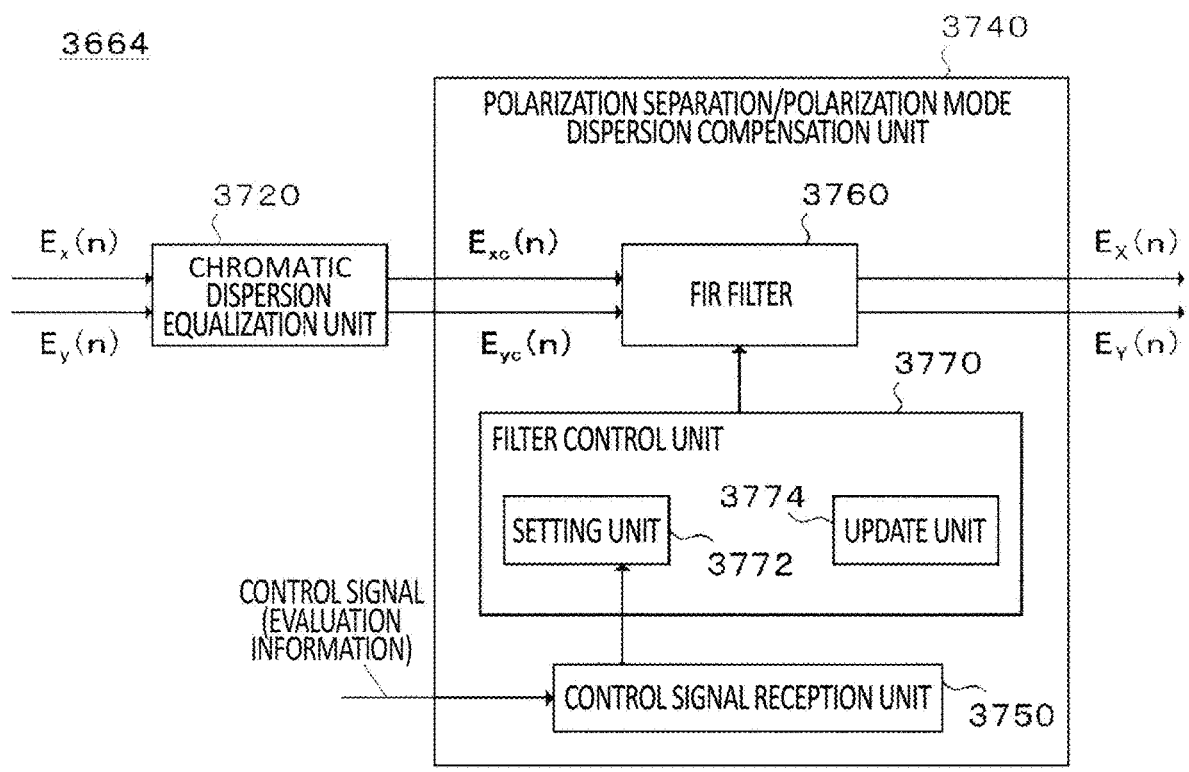
FIG. 37 schematically shows an example of an internal configuration of a compensation unit 3664.

FIG. 37 schematically shows an example of an internal configuration of the compensation unit 3664. In the present embodiment, the compensation unit 3664 includes a chromatic dispersion equalization unit 3720 and a polarization separation/polarization mode dispersion compensation unit 3740. In the present embodiment, the polarization separation/polarization mode dispersion compensation unit 3740 includes a control signal reception unit 3750, an FIR filter 3760, and a filter control unit 3770. In the present embodiment, the filter control unit 3770 includes a setting unit 3772 and an update unit 3774.

In the present embodiment, the chromatic dispersion equalization unit 3720 compensates for the group delay characteristics of the complex digital signals $E_x$ (n) and $E_y$ (n). Accordingly, complex digital signals $E_{xc}$ (n) and $E_{yc}$ (n) in which the group delay characteristics are compensated for are obtained.

In the present embodiment, the polarization separation/polarization mode dispersion compensation unit 3740 compensates for the influence of the birefringence and/or the polarization mode dispersion received by the signal light, and restores the original orthogonal polarization signals $E_X(n)$ and $E_Y(n)$. Specifically, the polarization separation/polarization mode dispersion compensation unit 3740 executes the above-described compensation processing using the inverse matrix $H^{-1}$. For example, the polarization separation/polarization mode dispersion compensation unit 3740 inputs the above-described complex digital signals $E_x$ (n) and $E_y$ (n) to a finite impulse response filter (may be referred to as an FIR filter) corresponding to the inverse matrix $H^{-1}$. Accordingly, the restoration signals $E_X(n)$ and $E_Y(n)$ described above are obtained.

The above-described inverse matrix $H^{-1}$ is expressed by following Expression C-1 using a coefficient $h_{xx}$ (ω) indicating the $E_X(n)$ component included in $E_x$ (n), a coefficient $h_{xy}$ (ω) indicating the $E_X$ (n) component included in $E_y$ (n), a coefficient $h_{yx}$ (ω) indicating the $E_Y$ (n) component included in $E_x$ (n), and a coefficient $h_{yy}$ (w) indicating the $E_Y(n)$ component included in $E_y$ (n). In Expression C-1, ω indicates an angular frequency of the optical signal.

$$H^{-1} = \begin{bmatrix} h_{xx}(\omega) & h_{xy}(\omega) \\ h_{yx}(\omega) & h_{yy}(\omega) \end{bmatrix} \quad \text{(Expression C-1)}$$

When $h_{xx}$ (ω), $h_{xy}$ (ω), $h_{yx}$ (ω), and $h_{yy}$ (ω) of Expression C-1 are expressed as hp (p is xx, xy, yx, or yy), and the number of taps of the FIR filter corresponding to the inverse matrix $H^{-1}$ is k, the x component of the input vector of the FIR filter is expressed by following Expression C-2. Similarly, the y component of the input vector of the above-described FIR filter is expressed by following Expression C-3. In addition, the tap coefficient vector of the FIR filter is expressed by following Expression C-4. In Expressions C-2, C-3, and C-4, a subscript T indicates transposition.

In this case, the x component $E_X(n)$ of the restoration signal described above is derived based on following Expression C-5. Similarly, the y component $E_Y(n)$ of the restoration signal described above is derived based on following Expression C-6.

Note that when the symbol interval is denoted by Ts and the oversampling ratio of the AD converter 3662 is denoted by m, the delay time interval of the above-described FIR filter is Ts/m. In addition, in the CMA described above, the tap coefficient is controlled such that the square of the absolute value of $E_X$ (n) and the square of the absolute value of $E_Y$ (n) approach 1.

$$\vec{E_x}(n) = [E_x(n), E_x(n-1), \ldots, E_x(n-(k-1))]^T \quad \text{(Expression C-2)}$$

$$\vec{E_y}(n) = [E_y(n), E_y(n-1), \ldots, E_y(n-(k-1))]^T \quad \text{(Expression C-3)}$$

$$\vec{h_p}(n) = [h_{p,0}(n), h_{p,1}(n), \ldots, h_{p,(k-1)}(n)]^T \quad \text{(Expression C-4)}$$

$$E_X(n) = \vec{h_{xx}}(n)^T \vec{E_x}(n) + \vec{h_{xy}}(n)^T \vec{E_y}(n) \quad \text{(Expression C-5)}$$

$$E_Y(n) = \vec{h_{yx}}(n)^T \vec{E_x}(n) + \vec{h_{yy}}(n)^T \vec{E_y}(n) \quad \text{(Expression C-6)}$$

In the present embodiment, the control signal reception unit 3750 receives the evaluation information output by the state monitoring device 1680. As described above, the state monitoring device 1680 optically detects the polarization fluctuation of the monitoring optical signal having propagated through the optical transmission line 10. In addition, the state monitoring device 1680 outputs evaluation information (may be referred to as evaluation information regarding polarization fluctuation) indicating the evaluation result or the detection result regarding the above-described polarization fluctuation. The control signal reception unit 3750 may output the above-described evaluation information to the setting unit 3772.

In the present embodiment, the FIR filter 3760 compensates for the influence of the birefringence and/or the polarization mode dispersion received by the signal light, and restores the original orthogonal polarization signals $E_X(n)$ and $E_Y(n)$. Specifically, the FIR filter 3760 receives the above-described complex digital signals $E_x$ (n) and $E_y$ (n) and outputs the above-described restoration signals $E_X(n)$ and $E_Y(n)$.

According to the present embodiment, the number of taps or the tap coefficient of the FIR filter 3760 is dynamically changed (the above-described change may be referred to as update). For example, the number of taps or the tap coefficient of the FIR filter 3760 is changed during the operation of the polarization separation/polarization mode dispersion compensation unit 3740. According to the present embodiment, the update frequency or the update interval of the number of taps or the tap coefficient of the FIR filter 3760 is dynamically changed. For example, the update frequency or the update interval of the number of taps or the tap coefficient of the FIR filter 3760 is changed during the operation of the polarization separation/polarization mode dispersion compensation unit 3740.

In the present embodiment, the filter control unit 3770 controls the operation of the polarization separation/polarization mode dispersion compensation unit 3740. Specifically, the filter control unit 3770 controls the operation of the FIR filter 3760. More specifically, the filter control unit 3770 changes, for example, the number of taps of the FIR filter 3760. The filter control unit 3770 changes, for example, the tap coefficient of the FIR filter 3760. The filter control unit 3770 changes, for example, the update frequency or the update interval of the number of taps of the FIR filter 3760. The filter control unit 3770 changes, for example, the update frequency or the update interval of the tap coefficient of the FIR filter 3760. The filter control unit 3770 may substantially increase or decrease the number of taps of the FIR filter 3760 by adjusting the tap coefficient of the FIR filter 3760.

In the present embodiment, the setting unit 3772 decides a setting regarding the update frequency or the update interval of the number of taps of the FIR filter 3760 and/or the update frequency or the update interval of the tap coefficient of the FIR filter 3760, based on the evaluation information regarding the polarization fluctuation. The setting unit 3772 may decide the above-described setting during the operation of the polarization separation/polarization mode dispersion compensation unit 3740, based on the evaluation information acquired during the operation of the polarization separation/polarization mode dispersion compensation unit 3740.

As described above, the evaluation information regarding the polarization fluctuation includes information indicating that the polarization fluctuation exceeding a predetermined degree is detected, information indicating that the polarization fluctuation exceeding the predetermined degree has occurred, information indicating the fluctuation amount of the polarization fluctuation, information indicating the absolute value of the fluctuation amount of the polarization fluctuation, and the like. Accordingly, the setting unit 3772 can determine whether the absolute value of the fluctuation amount of the polarization fluctuation is larger than a predetermined threshold value, based on the evaluation information regarding the polarization fluctuation. For example, the setting unit 3772 decides the above-described setting based on the result of the above-described determination.

In an embodiment, when it is determined that the absolute value of the fluctuation amount of the polarization fluctuation is larger than the threshold value, the setting unit 3772 decides (i) to set the set value of the update frequency of the number of taps and/or the tap coefficient to be larger than a current set value, (ii) to set the set value of the update frequency of the number of taps and/or the tap coefficient to be a predetermined first value, (iii) to set the set value of the update interval of the number of taps and/or the tap coefficient to be smaller than the current set value, or (iv) to set the set value of the update interval of the number of taps and/or the tap coefficient to be a predetermined second value. The first value and the second value may be the same or different.

In another embodiment, when it is not determined that the absolute value of the fluctuation amount of the polarization fluctuation is larger than the threshold value, the setting unit 3772 decides (i) to set the set value of the update frequency of the number of taps and/or the tap coefficient to be smaller than the current set value, (ii) to set the set value of the update frequency of the number of taps and/or the tap coefficient to be a predetermined third value, (iii) to set the set value of the update interval of the number of taps and/or the tap coefficient to be larger than the current set value, or (iv) to set the set value of the update interval of the number of taps and/or the tap coefficient to be a predetermined fourth value. The third value and the fourth value may be the same or different. The third value may be a value different from the first value, and the fourth value may be a value different from the second value.

According to these embodiments, for example, when no rapid polarization fluctuation is detected in the optical region, the update frequency of the number of taps and/or the tap coefficient of the FIR filter can be set to a relatively small value, and when the rapid polarization fluctuation is detected in the optical region, the update frequency of the number of taps and/or the tap coefficient of the FIR filter can be increased before the rapid polarization fluctuation occurs in the electrical region. Accordingly, the power consumption in the digital signal processor 3560 is significantly reduced. In addition, data can be stably demodulated.

In the present embodiment, the update unit 3774 updates the number of taps and/or the tap coefficient of the FIR filter 3760. The update unit 3774 may update the number of taps and/or the tap coefficient described above at the update frequency or the update interval determined by the setting decided by the setting unit 3772. The update unit 3774 may update the number of taps and/or the tap coefficient described above during the operation of the polarization separation/polarization mode dispersion compensation unit 3740.

(Time Difference Between Detection of Polarization Fluctuation in Optical Region and Detection of Polarization Fluctuation in Electrical Region)

Since enormous arithmetic processing is executed in the DSP, a relatively large delay (latency) occurs. For example, Non-Patent Document 20 and Non-Patent Document 21 disclose that a delay of about 1 µs occurs in the digital coherent optical communication system. Although the delay in each of the chromatic dispersion equalization unit 3720 and the polarization separation/polarization mode dispersion compensation unit 3740 is unknown, considering that the FIR filter having a relatively large number of taps is also used in the chromatic dispersion equalization unit 3720, it is estimated that a delay of several hundred ns occurs in the chromatic dispersion equalization unit 3720.

On the other hand, as described above, a delay time in the optical delay interferometer 340 of the state monitoring device 1680 is 35.7 ps when the symbol rate is 28GSymbol/s. In addition, Non-Patent Document 20 and Non-Patent Document 21 disclose that a delay time of a transponder that performs optical reception, identification and reproduction, and optical transmission is 4 to 30 ns. When it is assumed that the delay time of the electronic circuit arranged in the state monitoring device 1680 is about the same as the delay time of the transponder disclosed in Non-Patent Document 20 and Non-Patent Document 21, the delay time in the entire state monitoring device 1680 is estimated to be several tens of ns.

In consideration of the above estimation and the structure of the DSP, the length of a period from when the polarization fluctuation is detected in the optical region to when the polarization fluctuation is detected in the electrical region is estimated to be about several hundred ns. Accordingly, according to the present embodiment, after the state monitoring device 1680 detects the rapid polarization fluctuation in the optical region, the filter control unit 3770 can change the setting of the FIR filter 3760 before the rapid polarization fluctuation occurs in the electric signal input to the FIR filter 3760.

The polarization separation/polarization mode dispersion compensation unit 3740 may be an example of a compensation device or a control device. The control signal reception unit 3750 may be an example of a detection signal reception unit. The FIR filter 3760 may be an example of a compensation device or a finite impulse response filter. The filter control unit 3770 may be an example of a control device.

Example of Another Embodiment

In the present embodiment, the details of the polarization separation/polarization mode dispersion compensation unit 3740 have been described by taking, as an example, a case where the polarization separation/polarization mode dispersion compensation unit 3740 includes the control signal reception unit 3750 and the filter control unit 3770. However, the polarization separation/polarization mode dispersion compensation unit 3740 is not limited to the present embodiment.

In another embodiment, the control signal reception unit 3750 and the filter control unit 3770 may be arranged outside the polarization separation/polarization mode dispersion compensation unit 3740. Accordingly, for example, when the optical signal reception device 3520 includes a plurality of digital signal processors 3560, a single filter control unit 3770 can control the FIR filters 3760 of the plurality of digital signal processors 3560.

In still another embodiment, when the optical signal reception device 3520 includes a plurality of digital signal processors 3560, some of the digital signal processors 3560 may include the control signal reception unit 3750 and the filter control unit 3770, and the remaining digital signal processors 3560 may not include the control signal reception unit 3750 and the filter control unit 3770. In this case, the filter control unit 3770 arranged in some of the digital signal processors 3560 may control the FIR filter 3760 of another digital signal processor 3560.

Figure 38:
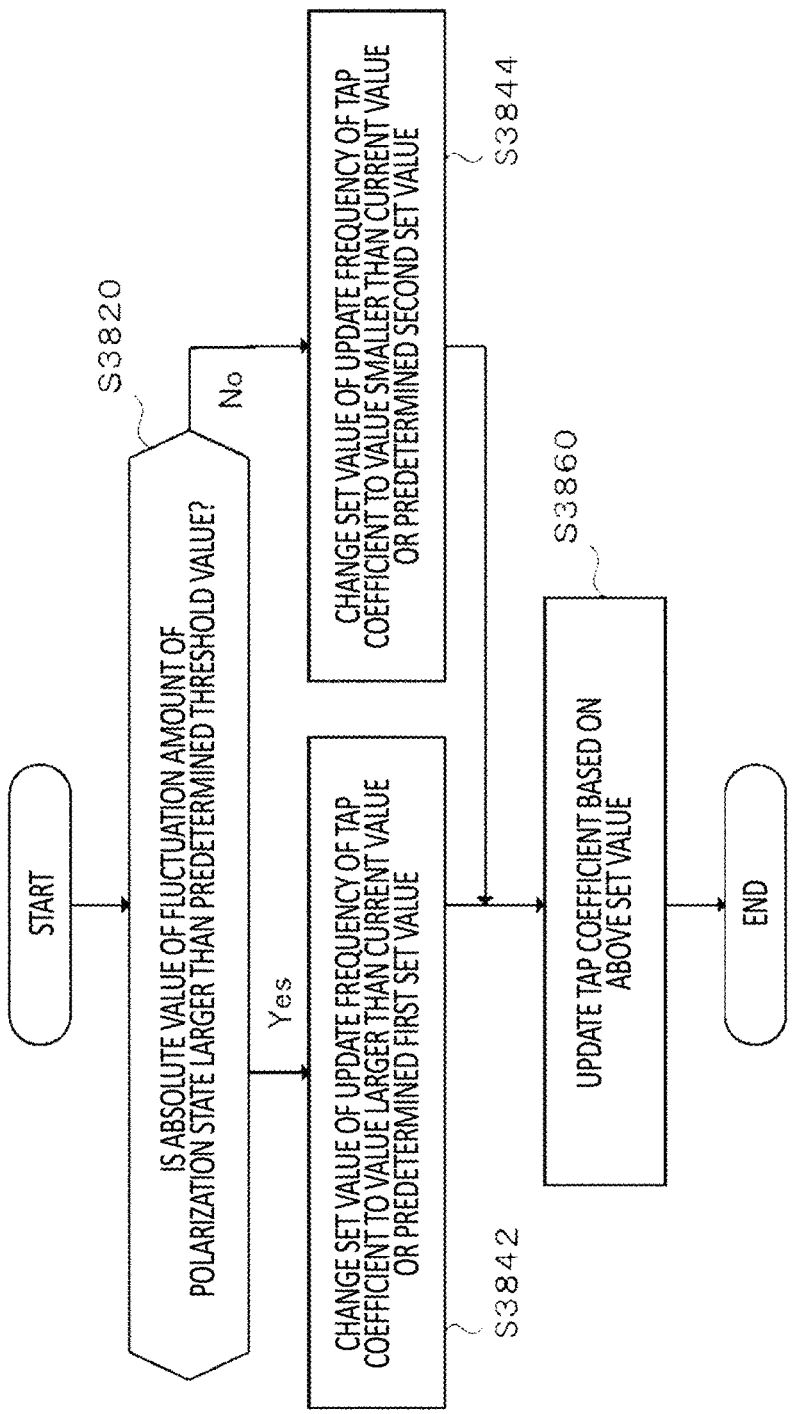
FIG. 38 schematically shows an example of information processing in the compensation unit 3664.

FIG. 38 schematically shows an example of information processing in the compensation unit 3664. FIG. 38 schematically shows an example of information processing for the filter control unit 3770 to control the operation of the compensation unit 3664, for example.

According to the present embodiment, first, in step 3820 (step may be omitted as S), the control signal reception unit 3750 receives the evaluation information regarding the polarization fluctuation output by the state monitoring device 1680. Next, the setting unit 3772 analyzes the evaluation information regarding the polarization fluctuation and determines whether the absolute value of the fluctuation amount of the polarization state is larger than a predetermined threshold value.

The fluctuation amount of the polarization state is expressed by using, for example, an approximately variation amount of the movement angle of the trajectory on the Poincare sphere indicating a polarization state fluctuation. For example, the setting unit 3772 executes above-described determination processing by comparing an approximate variation amount of the movement angle of the trajectory on the Poincare sphere with a preset reference value regarding the above-described variation amount.

If it is determined in S3820 that the absolute value of the fluctuation amount of the polarization state is larger than the predetermined threshold value (Yes in S3820), in S3842, the setting unit 3772 decides to change, for example, the set value of the update frequency of the tap coefficient to a value larger than the current value or a predetermined first set value. Note that the setting unit 3772 may execute various types of processing described with reference to FIG. 37 and decide the setting regarding the update frequency or the update interval of the number of taps and/or the tap coefficient.

On the other hand, if it is not determined in S3820 that the absolute value of the variation amount of the polarization state is larger than the predetermined threshold value (No in S3820), in S3844, the setting unit 3772 decides to change, for example, the set value of the update frequency of the tap coefficient to a value smaller than the current value or a predetermined second set value. The second set value may be smaller than the first set value. Note that the setting unit 3772 may execute various types of processing described with reference to FIG. 37 and decide the setting regarding the update frequency or the update interval of the number of taps and/or the tap coefficient.

Thereafter, in S3860, the update unit 3774 updates the tap coefficient of the FIR filter 3760. Specifically, the update unit 3774 updates the tap coefficient of the FIR filter 3760 at the update frequency indicated by the set value decided in S3842 or S3844. Note that, as described with reference to FIG. 37, the update unit 3774 may update the number of taps of the FIR filter 3760.

Figure 39:
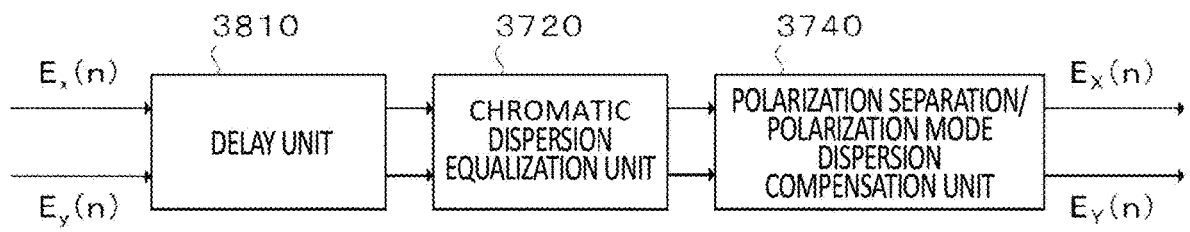
FIG. 39 schematically shows another example of the internal configuration of the compensation unit 3664.

FIG. 39 schematically shows another example of the internal configuration of the compensation unit 3664. The compensation unit 3664 according to the present embodiment has a configuration similar to that of the compensation unit 3664 described with reference to FIG. 37 except that a delay unit 3810 is arranged at a preceding stage of the chromatic dispersion equalization unit 3720.

In the present embodiment, the delay unit 3810 receives the output of the AD converter 3662, and outputs the output of the AD converter 3662 to the chromatic dispersion equalization unit 3720 after a predetermined time has elapsed. Accordingly, after the state monitoring device 1680 detects the rapid polarization fluctuation in the optical region, the filter control unit 3770 can reliably change the setting of the FIR filter 3760 before the rapid polarization fluctuation occurs in the electric signal input to the FIR filter 3760.

Figure 40:
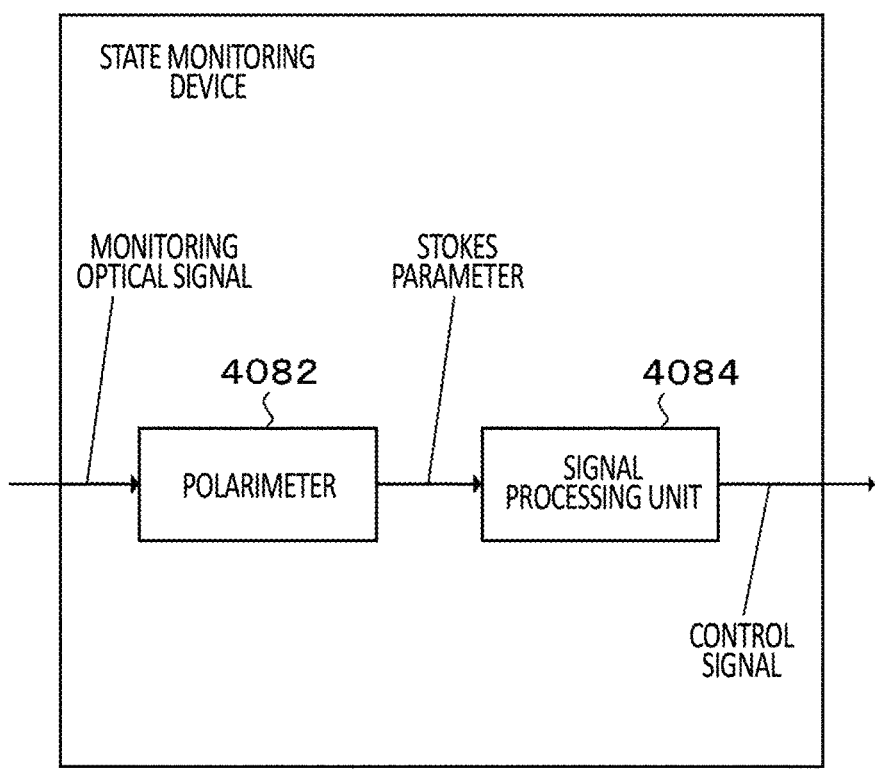
FIG. 40 schematically shows an example of an internal configuration of a state monitoring device 4080.

FIG. 40 schematically shows an example of an internal configuration of the state monitoring device 4080. A state monitoring device 4080 may be another example of the state monitoring device 1680. In the present embodiment, the state monitoring device 4080 includes a polarimeter 4082 and a signal processing unit 4084. The state monitoring device 4080 may have a configuration similar to that of the state monitoring device 1680 except that information indicating the time differentiation of a phase difference is acquired by using the polarimeter 4082 instead of the optical delay interferometer 340.

When the degree of change in a phase difference between the x-polarized component of the electric field of the monitoring optical signal and the y-polarized component of the electric field of the monitoring optical signal is larger than a predetermined degree, it can be determined that the polarization fluctuation occurs. Therefore, if the change amount of the phase difference between the x-polarized component of the electric field of the monitoring optical signal and the y-polarized component of the electric field of the monitoring optical signal can be measured, the setting unit 3772 can adjust the setting regarding the update frequency or the update interval of the number of taps and/or the tap coefficient of the FIR filter by using the information indicating the change amount instead of the above-described evaluation information regarding the polarization fluctuation.

In the present embodiment, the polarimeter 4082 measures a state of polarization (SOP) and/or a degree of polarization (DOP) of light (for example, the above-described monitoring optical signal) input to the polarimeter 4082. The polarimeter 4082 outputs the sampled Stokes parameters. The Stokes parameters are expressed by Expressions B-13, B-14, B-15, and B-16 described above.

The measurement principle and structure of the polarimeter 4082 are not particularly limited. As the polarimeter 4082, any known polarimeter is used. The polarimeter 4082 includes, for example, four photodetectors, three polarizers, one ¼ wavelength plane, and a data processing apparatus.

In the present embodiment, the signal processing unit 4084 first acquires the sampled Stokes parameters. The signal processing unit 4084 derives a phase difference $\delta(t)$ between the x-polarized component of the electric field of the monitoring optical signal and the y-polarized component of the electric field of the monitoring optical signal, based on the sampled Stokes parameters. The phase difference $\delta(t)$ is calculated by following Expression C-7 using the Stokes parameters S2 and S3.

$$\delta(t) = \tan^{-1}(S3/S2) \quad \text{(Expression C-7)}$$

When the i-th sampled $\delta(t)$ is expressed as $\delta(i)$ (i is an integer of 1 or more), the signal processing unit 4084 can derive $\delta(i)$ based on the sampled Stokes parameters and Expression C-7. For example, the signal processing unit 4084 calculates $\delta(i+1)-\delta(i)$ to calculate an amount corresponding to the time differentiation of the phase difference $\delta(t)$. The amount corresponding to the time differentiation of the phase difference $\delta(t)$ indicates a change amount of the phase difference. The signal processing unit 4084 generates information indicating the above-described change amount of the phase difference. The signal processing unit 4084 outputs the above-described information indicating the change amount of the phase difference as the above-described control signal to the control input terminal 3566 of the digital signal processor 3560.

The polarimeter 4082 may be an example of a polarimeter, a state-of-polarization measuring instrument, or a Stokes parameter measuring instrument. The information indicating the change amount of the phase difference may be an example of a detection signal.

While the present invention has been described by way of the embodiments, the technical scope of the present invention is not limited to the above-described embodiments. It is apparent to persons skilled in the art that various alterations or improvements can be made to the above described embodiments. In addition, the matters described with regard to the particular embodiment can be applied to other embodiments to the extent that they are not technically inconsistent.

It is also apparent from the description of the claims that embodiments added with such alterations or improvements can be included in the technical scope of the present invention.

Note that the operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described by using phrases such as "first" or "next" in the scope of the claims, specification, or drawings, it does not necessarily mean that the process must be performed in this order. For example, the present specification discloses the following matters.

Item A-1

An evaluation device which evaluates phase noise of signal light having propagated through an optical transmission line, the evaluation device including:

a differential phase information acquisition unit which acquires information indicating a differential phase of input light at each of a plurality of time points included in an evaluation period; and an index derivation unit which derives, as an index for evaluating the phase noise, a degree of variability in the differential phase at each of the plurality of time points, wherein the differential phase indicates a difference between phases of the input light at two temporally adjacent time points among the plurality of time points, and a time interval of the plurality of time points is substantially constant and is equal to or less than a length of a symbol time of a signal transmitted by the input light.

Item A-2

An optical receiver including:

the evaluation device according to items A-1; and a demodulation unit which demodulates a reception signal transmitted by the signal light and generates an information signal.

Item A-3

An optical communication system including:

an optical transmitter which transmits the signal light; and the optical receiver according to item A-2.

Item A-4

A program for causing a computer to function as the evaluation device according to items A-1.

Item A-5

An evaluation method which evaluates phase noise of signal light having propagated through an optical transmission line, the evaluation method including:

acquiring information indicating a differential phase of input light at each of a plurality of time points included in an evaluation period; and deriving, as an index for evaluating the phase noise, a degree of variability in the differential phase at each of the plurality of time points, wherein the differential phase indicates a difference between phases of the input light at two temporally adjacent time points among the plurality of time points, and a time interval of the plurality of time points is substantially constant and is equal to or less than a length of a symbol time of a signal transmitted by the input light.

For example, the present specification discloses the following matters.

Item B-1

A detection device for detecting polarization fluctuation of signal light having propagated through an optical transmission line, the detection device including:

a differential phase information acquisition unit which acquires information indicating a differential phase of input light as an evaluation target at each of one or more time points; and a determination unit which determines whether the differential phase at at least some of the one or more time points satisfies a predetermined condition, wherein the predetermined condition includes at least one of
a first condition that a magnitude of the differential phase at at least one of the one or more time points is equal to a predetermined first threshold value or larger than the first threshold value,
a second condition that, among a plurality of time points which are the at least some of the one or more time points and are included in an evaluation period which is a period having a predetermined length, the number of time points at which the magnitude of the differential phase is equal to the first threshold value or larger than the first threshold value is equal to a predetermined second threshold value or larger than the second threshold value,
a third condition that a ratio of the number of the time points at which the magnitude of the differential phase is equal to the first threshold value or larger than the first threshold value among the plurality of time points, to the number of the plurality of time points included in the evaluation period is equal to a predetermined third threshold value or larger than the third threshold value,
a fourth condition that a movement angle in a variation frequency of a trajectory on a Poincare sphere, derived from the magnitude of the differential phase at each of the one or more time points, is equal to a predetermined fourth threshold value or larger than the fourth threshold value, or
a fifth condition that a movement angular velocity in the variation frequency of the trajectory on the Poincare sphere is equal to a predetermined fifth threshold value or larger than the fifth threshold value.

Item B-2

An optical reception device including:
the detection device according to of items B-1; and
a demodulation unit which demodulates a reception signal transmitted by the signal light and generates an information signal.

Item B-3

An optical communication system including:
an optical transmission device which transmits the signal light; and the optical reception device according to Item B-2.

Item B-4

A program for causing a computer to function as the detection device according to items B-1.

Item B-5

A detection method for detecting polarization fluctuation of signal light having propagated through an optical transmission line, the detection method including:
acquiring information indicating a differential phase of input light as an evaluation target at each of one or more time points; and
determining whether the differential phase at at least some of the one or more time points satisfies a predetermined condition, wherein
the predetermined condition includes at least one of
a first condition that a magnitude of the differential phase at at least one of the one or more time points is equal to a predetermined first threshold value or larger than the first threshold value,
a second condition that, among a plurality of time points which are the at least some of the one or more time points and are included in an evaluation period which is a period having a predetermined length, the number of time points at which the magnitude of the differential phase is equal to the first threshold value or larger than the first threshold value is equal to a predetermined second threshold value or larger than the second threshold value,
a third condition that a ratio of the number of the time points at which the magnitude of the differential phase is equal to the first threshold value or larger than the first threshold value among the plurality of time points, to the number of the plurality of time points included in the evaluation period is equal to a predetermined third threshold value or larger than the third threshold value,
a fourth condition that a movement angle in a variation frequency of a trajectory on a Poincare sphere, derived from the magnitude of the differential phase at each of the one or more time points, is equal to a predetermined fourth threshold value or larger than the fourth threshold value, or
a fifth condition that a movement angular velocity in the variation frequency of the trajectory on the Poincare sphere is equal to a predetermined fifth threshold value or larger than the fifth threshold value.

EXPLANATION OF REFERENCES

10: optical transmission line; 100: communication system; 110: optical signal transmission device; 120: optical signal reception device; 130: local oscillator; 140: optical 90-degree hybrid; 152: optical receiver; 154: optical receiver; 162: AD converter; 164: AD converter; 170: signal processing unit; 210: digital signal processing circuit; 220: decoding circuit; 230: amplitude noise evaluation unit; 240: phase noise evaluation unit; 242: differential phase signal generation unit; 244: histogram generation unit; 246: standard deviation calculation unit; 320: phase noise evaluation device; 340: optical delay interferometer; 350: optical receiver; 360: AD converter; 370: signal processing unit; 422: half mirror; 424: half mirror; 432: total reflection mirror; 434: total reflection mirror; 436: optical phase adjuster; 510: substrate; 520: waveguide; 526: electrode; 530: waveguide; 540: optical delay interferometer; 610: substrate; 620: waveguide; 630: ring resonator; 636: electrode; 640: optical delay interferometer; 710: calibration unit; 820: phase noise evaluation device; 850: optical receiver; 860: AD converter; 870: signal processing unit; 880: optical phase control unit; 930: normalization unit; 1040: optical delay interferometer; 1060: half mirror; 1140: optical delay interferometer; 1160: waveguide; 1240: optical delay interferometer; 1260: waveguide; 1340: optical delay interferometer; 1350: balanced optical receiver; 1352: optical receiver; 1354: optical receiver; 1356: differential processing unit; 1452: photodiode; 1454: photodiode; 1456: coupling point; 1540: optical delay interferometer; 1600: communication system; 1620: optical signal reception device; 1640: demultiplexer; 1650: optical receiver; 1660: AD converter; 1670: signal processing unit; 1680: state monitoring device; 1722: communication optical signal output unit; 1724: monitoring optical signal output unit; 1730: multiplexer; 1852: photoelectric conversion element; 1854: integration circuit; 1870: signal processing unit; 1922: increase detection unit; 1924: frequency analysis unit; 1926: movement angle derivation unit; 1928: movement angular velocity derivation unit; 1930: polarization fluctuation detection unit; 1940: information output unit; 2100: data table; 2120: number; 2122: time; 2124: output value; 2132: variation frequency; 2134: movement angle; 2136:

movement angular velocity; 2140: success or failure; 2150: detection result; 3000: computer; 3001: DVD-ROM; 3010: host controller; 3012: CPU; 3014: RAM; 3016: GPU; 3018: display device; 3020: input/output controller; 3022: communication interface; 3024: hard disk drive; 3026: DVD-ROM drive; 3030: ROM; 3040: input/output chip; 3042: keyboard; 3500: communication system; 3520: optical signal reception device; 3550: optical reception unit; 3552: local oscillator; 3560: digital signal processor; 3562: signal input terminal; 3564: signal output terminal; 3566: control input terminal; 3654: optical 90-degree hybrid; 3656: optical receiver; 3662: AD converter; 3664: compensation unit; 3666: carrier phase estimation unit; 3668: decoding unit; 3720: chromatic dispersion equalization unit; 3740: polarization separation/polarization mode dispersion compensation unit; 3750: control signal reception unit; 3760: FIR filter; 3770: filter control unit; 3772: setting unit; 3774: update unit; 3810: delay unit; 4080: state monitoring device; 4082: polarimeter; and 4084: signal processing unit.

What is claimed is:

1. A control device which controls an operation of a compensation device which compensates for birefringence and/or polarization mode dispersion, which is received by signal light having propagated through an optical transmission line, by digital signal processing using a finite impulse response filter, wherein:
   the control device receives a detection signal which is a signal indicating a detection result of a detection device which optically detects polarization fluctuation in the optical transmission line; and
   the control device sets a setting regarding an update frequency or an update interval of the number of taps of the finite impulse response filter or an update frequency or an update interval of a tap coefficient of the finite impulse response filter, based on the detection result of the detection device.

2. The control device according to claim 1, wherein
   the control device
   determines whether an absolute value of a fluctuation amount of the polarization fluctuation is larger than a predetermined threshold value, based on the detection result of the detection device, and
   when it is determined that the absolute value of the fluctuation amount of the polarization fluctuation is larger than the threshold value, sets (i) a set value of the update frequency of the number of taps and/or the tap coefficient to be larger than a current set value, (ii) the set value of the update frequency of the number of taps and/or the tap coefficient to be a predetermined first value, (iii) a set value of the update interval of the number of taps and/or the tap coefficient to be smaller than a current set value, or (iv) to set the set value of the update interval of the number of taps and/or the tap coefficient to be a predetermined second value.

3. The control device according to claim 1, wherein
   the control device
   determines whether an absolute value of a fluctuation amount of the polarization fluctuation is larger than a predetermined threshold value, based on the detection result of the detection device, and
   when it is not determined that the absolute value of the fluctuation amount of the polarization fluctuation is larger than the threshold value, sets (i) a set value of the update frequency of the number of taps and/or the tap coefficient to be smaller than a current set value, (ii) the set value of the update frequency of the number of taps and/or the tap coefficient to be a predetermined third value, (iii) a set value of the update interval of the number of taps and/or the tap coefficient to be larger than a current set value, or (iv) the set value of the update interval of the number of taps and/or the tap coefficient to be a predetermined fourth value.

4. The control device according to claim 1, wherein
   the control device updates the number of taps or the tap coefficient at the update frequency or the update interval determined by the setting set by the control device.

5. The control device according to claim 1, wherein
   the compensation device compensates for birefringence and/or polarization mode dispersion received by first signal light having propagated through the optical transmission line,
   the detection device optically detects polarization fluctuation of second signal light having propagated through the optical transmission line, and
   the first signal light and the second signal light have different wavelengths.

6. The control device according to claim 5, wherein
   the detection device includes an optical delay interferometer, a polarimeter, a state-of-polarization measuring instrument, or a Stokes parameter measuring instrument for optically detecting the polarization fluctuation of the second signal light.

7. The control device according to claim 1, wherein
   the control device controls operations of a plurality of compensation devices including the compensation device which compensates for birefringence and/or polarization mode dispersion, which is received by each of a plurality of beams of signal light having propagated through the optical transmission line, by digital signal processing using a finite impulse response filter,
   the control device sets the setting regarding a plurality of finite impulse response filters, which includes the finite impulse response filter, arranged in the plurality of compensation devices, based on the detection result of the detection device, and
   the plurality of beams of signal light have different wavelengths.

8. The control device according to claim 2, wherein
   the control device
   determines whether an absolute value of a fluctuation amount of the polarization fluctuation is larger than a predetermined threshold value, based on the detection result of the detection device, and
   when it is not determined that the absolute value of the fluctuation amount of the polarization fluctuation is larger than the threshold value, sets (i) a set value of the update frequency of the number of taps and/or the tap coefficient to be smaller than a current set value, (ii) the set value of the update frequency of the number of taps and/or the tap coefficient to be a predetermined third value, (iii) a set value of the update interval of the number of taps and/or the tap coefficient to be larger than a current set value, or (iv) the set value of the update interval of the number of taps and/or the tap coefficient to be a predetermined fourth value.

9. The control device according to claim 2, wherein
   the control device updates the number of taps or the tap coefficient at the update frequency or the update interval determined by the setting decided by the control device.

10. The control device according to claim 3, wherein the control device updates the number of taps or the tap coefficient at the update frequency or the update interval determined by the setting decided by the control device.

11. The control device according to claim 2, wherein the compensation device compensates for birefringence and/or polarization mode dispersion received by first signal light having propagated through the optical transmission line,
the detection device optically detects polarization fluctuation of second signal light having propagated through the optical transmission line, and
the first signal light and the second signal light have different wavelengths.

12. The control device according to claim 3, wherein the compensation device compensates for birefringence and/or polarization mode dispersion received by first signal light having propagated through the optical transmission line,
the detection device optically detects polarization fluctuation of second signal light having propagated through the optical transmission line, and
the first signal light and the second signal light have different wavelengths.

13. The control device according to claim 4, wherein the compensation device compensates for birefringence and/or polarization mode dispersion received by first signal light having propagated through the optical transmission line,
the detection device optically detects polarization fluctuation of second signal light having propagated through the optical transmission line, and
the first signal light and the second signal light have different wavelengths.

14. The control device according to claim 5, wherein the detection device includes an optical delay interferometer for optically detecting the polarization fluctuation of the second signal light.

15. The control device according to claim 2, wherein the control device controls operations of a plurality of compensation devices including the compensation device which compensates for birefringence and/or polarization mode dispersion, which is received by each of a plurality of beams of signal light having propagated through the optical transmission line, by digital signal processing using a finite impulse response filter,
the control device sets the setting regarding a plurality of finite impulse response filters, which includes the finite impulse response filter, arranged in the plurality of compensation devices, based on the detection result of the detection device, and
the plurality of beams of signal light have different wavelengths.

16. The control device according to claim 3, wherein the control device controls operations of a plurality of compensation devices including the compensation device which compensates for birefringence and/or polarization mode dispersion, which is received by each of a plurality of beams of signal light having propagated through the optical transmission line, by digital signal processing using a finite impulse response filter,
the control device sets the setting regarding a plurality of finite impulse response filters, which includes the finite impulse response filter, arranged in the plurality of compensation devices, based on the detection result of the detection device, and
the plurality of beams of signal light have different wavelengths.

17. The control device according to claim 4, wherein the control device controls operations of a plurality of compensation devices including the compensation device which compensates for birefringence and/or polarization mode dispersion, which is received by each of a plurality of beams of signal light having propagated through the optical transmission line, by digital signal processing using a finite impulse response filter,
the control device sets the setting regarding a plurality of finite impulse response filters, which includes the finite impulse response filter, arranged in the plurality of compensation devices, based on the detection result of the detection device, and
the plurality of beams of signal light have different wavelengths.

18. A compensation device which compensates for birefringence and/or polarization mode dispersion received by signal light having propagated through an optical transmission line, the compensation device comprising:
a finite impulse response filter which compensates for the birefringence and/or the polarization mode dispersion received by the signal light; and
the control device according to claim 1.

19. A non-transitory storage medium having stored thereon a program which causes a computer to function as a control device which controls an operation of a compensation device which compensates for birefringence and/or polarization mode dispersion, which is received by signal light having propagated through an optical transmission line, by digital signal processing using a finite impulse response filter, the program causing the computer to function as:
the control device receiving a detection signal which is a signal indicating a detection result of a detection device which optically detects polarization fluctuation in the optical transmission line; and
the control device setting a setting regarding an update frequency or an update interval of the number of taps of the finite impulse response filter or an update frequency or an update interval of a tap coefficient of the finite impulse response filter, based on the detection result of the detection device.

20. A control method for controlling an operation of a compensation device which compensates for birefringence and/or polarization mode dispersion, which is received by signal light having propagated through an optical transmission line, by digital signal processing using a finite impulse response filter, the control method comprising:
receiving a detection signal which is a signal indicating a detection result of a detection device which optically detects polarization fluctuation in the optical transmission line; and
setting by deciding a setting regarding an update frequency or an update interval of the number of taps of the finite impulse response filter or an update frequency or an update interval of a tap coefficient of the finite impulse response filter, based on the detection result of the detection device.

* * * * *